US011115162B2

(12) United States Patent
Kim et al.

(10) Patent No.: US 11,115,162 B2
(45) Date of Patent: Sep. 7, 2021

(54) METHOD AND APPARATUS FOR IMPROVING CARRIER AGGREGATION IN NEXT-GENERATION MOBILE COMMUNICATION SYSTEM

(71) Applicant: Samsung Electronics Co., Ltd., Suwon-si (KR)

(72) Inventors: Donggun Kim, Suwon-si (KR); Soenghun Kim, Suwon-si (KR); Anil Agiwal, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/776,087

(22) Filed: Jan. 29, 2020

(65) Prior Publication Data

US 2020/0244410 A1 Jul. 30, 2020

(30) Foreign Application Priority Data

Jan. 29, 2019 (KR) .................. 10-2019-0011457
Feb. 14, 2019 (KR) .................. 10-2019-0017156

(51) Int. Cl.
*H04L 5/00* (2006.01)
*H04W 72/08* (2009.01)
(Continued)

(52) U.S. Cl.
CPC ....... *H04L 5/0035* (2013.01); *H04W 52/0206* (2013.01); *H04W 72/044* (2013.01); *H04W 72/085* (2013.01)

(58) Field of Classification Search
CPC ............ H04L 5/0035; H04W 52/0206; H04W 72/044; H04W 72/085
See application file for complete search history.

(56) References Cited

U.S. PATENT DOCUMENTS

2018/0368018 A1 12/2018 Kim et al.
2019/0021052 A1 1/2019 Kadiri et al.
2019/0208429 A1* 7/2019 Hong ................ H04W 16/32

FOREIGN PATENT DOCUMENTS

KR 10-2018-0137385 A 12/2018

OTHER PUBLICATIONS

Qualcomm Incorporated, "UE Adaptation to the Traffic and UE Power Consumption Characteristics", 3GPP TSG-RAN WG1 Ad-Hoc Meeting 1901, Jan. 21-25, 2019, R1-1900911, 24 pages.
(Continued)

*Primary Examiner* — Curtis B Odom

(57) ABSTRACT

Disclosed are a communication scheme and a system thereof for converging an IoT technology and a 5G communication system for supporting a high data transmission rate beyond that of a 4G system. The disclosure can be applied to intelligent services (for example, services related to a smart home, smart building, smart city, smart car, connected car, health care, digital education, retail business, security, and safety) based on 5G communication technology and IoT-related technology. Disclosed is a method of a user equipment (UE) in a wireless communication system. The method includes: receiving a message including secondary cell (SCell) configuration information from a base station; identifying whether a condition for transitioning the SCell to a dormant state is satisfied; and in case that the condition for transitioning the SCell to the dormant state is satisfied, releasing periodic transmission resources for the SCell configured in the UE.

20 Claims, 24 Drawing Sheets

(51) Int. Cl.
H04W 72/04 (2009.01)
H04W 52/02 (2009.01)

(56) References Cited

OTHER PUBLICATIONS

Nokia et al., "Corrections to euCA", Change Request, 3GPP TSG-RAN WG2 Meeting #104, Nov. 12-16, 2018, R2-1816591, 3 pages.
MediaTek Inc., "Adaptation Designs for NR UE Power Saving", 3GPP TSG RAN WG1 Ad-Hoc Meeting 1901, Jan. 21-25, 2019, R1-1900192, 12 pages.
LG Electronics, "Considerations on power saving for NR", 3GPP TSG RAN WG1 Ah-Hoc Meeting 1901, Jan. 21-25, 2019, R1-1900602, 5 pages.
International Search Report dated May 11, 2020 in connection with International Patent Application No. PCT/KR2020/001367, 3 pages.

* cited by examiner

FIG. 2I

| | $C_7$ | $C_6$ | $C_5$ | $C_4$ | $C_3$ | $C_2$ | $C_1$ | R | Oct 1 |

2i-05

| | $C_7$ | $C_6$ | $C_5$ | $C_4$ | $C_3$ | $C_2$ | $C_1$ | R | Oct 1 |
|---|---|---|---|---|---|---|---|---|---|
| | $C_{15}$ | $C_{14}$ | $C_{13}$ | $C_{12}$ | $C_{11}$ | $C_{10}$ | $C_9$ | $C_8$ | Oct 2 |
| | $C_{23}$ | $C_{22}$ | $C_{21}$ | $C_{20}$ | $C_{19}$ | $C_{18}$ | $C_{17}$ | $C_{16}$ | Oct 3 |
| | $C_{31}$ | $C_{30}$ | $C_{29}$ | $C_{28}$ | $C_{27}$ | $C_{26}$ | $C_{25}$ | $C_{24}$ | Oct 4 |

2i-10

| Cell ID | DL/UL | BWP ID | State |

2i-15

METHOD AND APPARATUS FOR IMPROVING CARRIER AGGREGATION IN NEXT-GENERATION MOBILE COMMUNICATION SYSTEM

CROSS-REFERENCE TO RELATED APPLICATIONS

This application is based on and claims priority under 35 U.S.C. 119 to Korean Patent Application Nos. 10-2019-0011457 & 10-2019-0017156, filed on Jan. 29, 2019 & Feb. 14, 2019, in the Korean intellectual Property Office, the disclosure of which is herein incorporated by reference in their entireties.

BACKGROUND

1. Field

The disclosure relates to a method and apparatus for improving carrier aggregation in a next-generation mobile communication system.

Further, the disclosure relates to a method and an apparatus for efficiently performing state transition in a next-generation mobile communication system.

2. Description of Related Art

In order to meet wireless data traffic demands that have increased after 4G communication system commercialization, efforts to develop an improved 5G communication system or a pre-5G communication system have been made. For this reason, the 5G communication system or the pre-5G communication system is called a beyond 4G network communication system or a post LTE system.

In order to achieve a high data transmission rate, an implementation of the 5G communication system in a mmWave band (for example, 60 GHz band) is being considered. In the 5G communication system, technologies such as beamforming, massive MIMO, Full Dimensional MIMO (FD-MIMO), array antenna, analog beam-forming, and large scale antenna are being discussed as means to mitigate a propagation path loss in the mm Wave band and increase a propagation transmission distance.

Further, the 5G communication system has developed technologies such as an evolved small cell, an advanced small cell, a cloud Radio Access Network (RAN), an ultra-dense network, Device to Device communication (D2D), a wireless backhaul, a moving network, cooperative communication, Coordinated Multi-Points (CoMP), and received interference cancellation to improve the system network. In addition, the 5G system has developed Advanced Coding Modulation (ACM) schemes such as Hybrid FSK and QAM Modulation (FQAM) and Sliding Window Superposition Coding (SWSC), and advanced access technologies such as Filter Bank Multi Carrier (FBMC), Non Orthogonal Multiple Access (NOMA), and Sparse Code Multiple Access (SCMA).

Meanwhile, the Internet has evolved from a human-oriented connection network in which humans generate and consume information to an Internet-of-Things (IoT) network in which information is exchanged between distributed components such as objects and the like. An Internet of Everything (IoE) technology in which a big data processing technology through a connection with a cloud server or the like is combined with the IoT technology has emerged. In order to implement IoT, technical factors such as a sensing technique, wired/wireless communication, network infrastructure, service-interface technology, and security technology are required, and research on technologies such as a sensor network, Machine-to-Machine (M2M) communication, Machine-Type Communication (MTC), and the like for connection between objects has recently been conducted. In an IoT environment, through collection and analysis of data generated in connected objects, an intelligent Internet Technology (IT) service to create a new value for peoples' lives may be provided. The IoT may be applied to fields, such as a smart home, smart building, smart city, smart car, connected car, smart grid, health care, smart home appliance, or high-tech medical service, through the convergence of the conventional Information Technology (IT) and various industries.

Accordingly, various attempts to apply the 5G communication to the IoT network are made. For example, the 5G communication technology, such as a sensor network, machine-to-machine (M2M) communication, and machine-type communication (MTC), has been implemented by a technique, such as beamforming, MIMO, and array antennas. The application of a cloud RAN as the big data processing technology may be an example of convergence of the 5G technology and the IoT technology.

The above information is presented as background information only to assist with an understanding of the disclosure. No determination has been made, and no assertion is made, as to whether any of the above might be applicable as prior art with regard to the disclosure.

SUMMARY

In a next-generation mobile communication system, carrier aggregation may be used to provide a service having a high data transmission rate and low transmission latency to a terminal. However, a method of preventing processing latency that may be generated when carrier aggregation is configured in a terminal having a connection with a network and carriers are activated or when carrier aggregation is used and then carriers are deactivated is needed.

In accordance with an aspect of the disclosure, a method of a user equipment (UE) in a wireless communication system is provided. The method includes: receiving a message including secondary cell (SCell) configuration information from a base station; identifying whether a condition for transitioning the SCell to a dormant state is satisfied; and in case that the condition for transitioning the SCell to the dormant state is satisfied, releasing periodic transmission resources for the SCell configured in the UE.

In accordance with another aspect of the disclosure, a user equipment (UE) in a wireless communication system is provided. The UE includes: a transceiver; and a controller configured to receive a message including secondary cell (SCell) configuration information through the transceiver, identify whether a condition for transitioning the SCell to a dormant state is satisfied, and release periodic transmission resources for the SCell configured in the UE in case that the condition for transitioning the SCell to the dormant state is satisfied.

The disclosure proposes a new dormant mode to allow a UE in an RRC-connected mode having a connection with a network to rapidly activate and deactivate carrier aggregation in a next-generation mobile communication system. The disclosure proposes a method of operating a new dormant mode in units of cells (cell-level) and a method of operating a dormant (or hibernation) mode in units of bandwidth parts (bandwidth-part level), thereby rapidly activating carrier aggregation and saving a UE battery.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the disclosure and its advantages, reference is now made to the following description taken in conjunction with the accompanying drawings, in which like reference numerals represent like parts:

FIG. 2I illustrates MAC control information indicating state transition to an active state, a dormant state, or an inactive state proposed by the disclosure;

DETAILED DESCRIPTION

FIGS. 1A through 2L, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Hereinafter, the operating principle of the disclosure will be described in detail with reference to the accompanying drawings. In describing the disclosure below, a detailed description of related known configurations or functions incorporated herein will be omitted when it is determined that the detailed description thereof may unnecessarily obscure the subject matter of the disclosure. The terms which will be described below are terms defined in consideration of the functions in the disclosure, and may be different according to users, intentions of the users, or customs. Therefore, the definitions of the terms should be made based on the contents throughout the specification.

In describing the disclosure below, a detailed description of related known configurations or functions incorporated herein will be omitted when it is determined that the detailed description thereof may unnecessarily obscure the subject matter of the disclosure. Hereinafter, embodiments of the disclosure will be described with reference to the accompanying drawings.

In the following description, terms for identifying an access node, terms referring to network entities, terms referring to messages, terms referring to interfaces between network entities, and terms referring to various pieces of identification information are used for convenience of description. Accordingly, the disclosure is not limited to the following terms and other terms having the same technical meaning may be used.

For convenience of description, the disclosure uses terms and names defined in a 3rd-Generation Partnership Project Long-Term Evolution (3GPP LTE) standard. However, the disclosure is not limited to the terms and names, and may be equally applied to a system according to another standard. In the disclosure, for convenience of description, the term "eNB" is interchangeable with "gNB". That is, a base station described as an &NB may indicate a gNB.

Figure 1A:
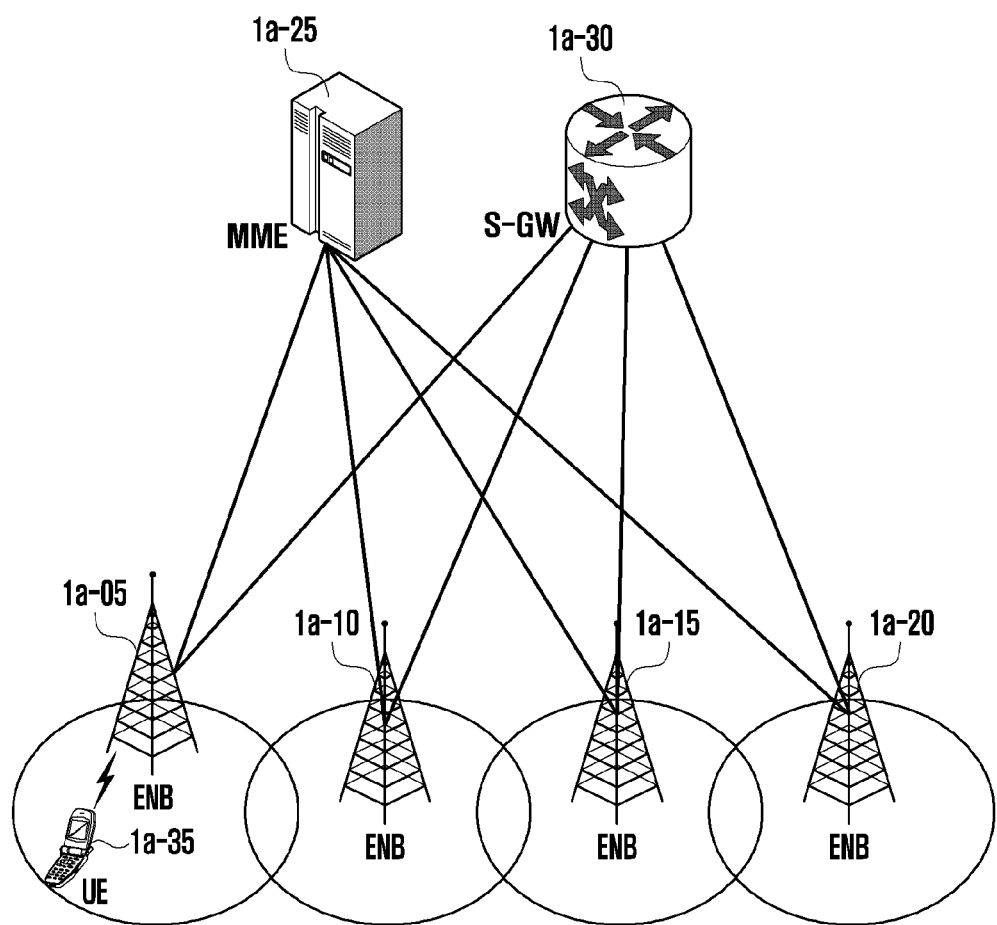
FIG. 1A illustrates the structure of an LTE system to which the disclosure can be applied.

FIG. 1A illustrates the structure of an LIE system to which the disclosure can be applied.

Referring to FIG. 1A, a radio access network of the LTE system includes next-generation base stations (evolved node Bs) (hereinafter, referred to as ENBs, Node Bs, or base stations) 1a-05, 1a-15, and 1a-20, a mobility management entity (MME) 1a-25, and a serving gateway (S-GW) 1a-30. A user terminal (user equipment) (hereinafter, referred to as a UE or a terminal) 1a-35 accesses an external network through the ENBs 1a-05 to 1a-20 and the S-GW 1a-30.

FIG. 1A, the ENBs 1a-05 to 1a-20 correspond to the existing node Bs of the UNITS system. The ENB is connected to the UE 1a-35 through a radio channel, and performs a more complicated role than a conventional node B. In the LTE system, since all user traffic including a real-time service such as a voice over IP (VoIP) via an Internet protocol are served through a shared channel, an apparatus for collecting and scheduling status information on buffer statuses of UEs, available transmission power status, and channel statuses is required, and the ENBs 1a-05 to 1a-20 serve as this apparatus.

One ENB generally controls a plurality of cells. For example, in order to implement a transmission rate of 100 Mbps, the LTE system uses orthogonal frequency-division multiplexing (OFDM) as a wireless access technology in a bandwidth of 20 MHz. Further, an adaptive modulation and coding (AMC) scheme of determining a modulation scheme and a channel-coding rate is applied depending on the channel status of the UE.

The S-GW 1a-30 is a device for providing a data bearer, and generates or removes the data bearer under the control of the MME 1a-25. The MME is a device for performing not only a function of managing mobility of the UE but also various control functions, and is connected to a plurality of ENBs.

Figure 1B:
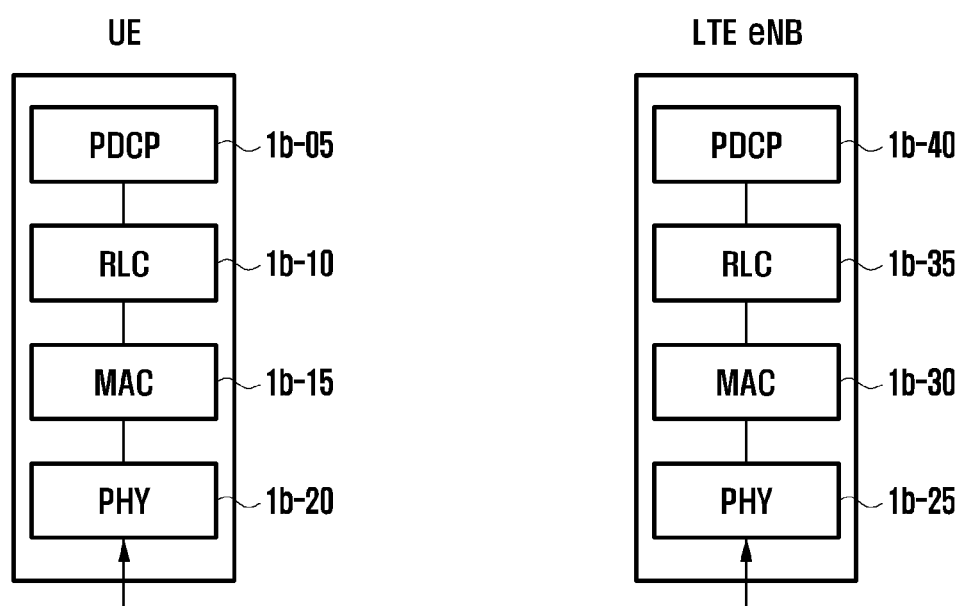
FIG. 1B illustrates the structure of a wireless protocol in the LTE system to which the disclosure can be applied.

FIG. 1B illustrates the structure of a wireless protocol in the LTE system to which the disclosure can be applied.

Referring to FIG. 1B, the UE and the ENB include packet data convergence protocols (PDCPs) 1b-05 and 1b-40, radio link controls (RLCs) 1b-10 and 1b-35, and medium access controls (MACs) 1b-15 and 1b-30, respectively, in the wireless protocol of the LTE system. The packet data convergence protocols (PDCPs) 1b-05 and 1b-40 perform an operation of compressing/reconstructing an IP header. The main functions of the PDCP are described below.

Header compression and decompression function (header compression and decompression: ROHC only)
User data transmission function (Transfer of user data)
Sequential delivery function (in-sequence delivery of upper-layer PDUs at PDCP reestablishment procedure for RLC AM)
Sequence rearrangement function (for split bearers in DC (only support for RLC AM): PDCP PDU routing for transmission and PDCP PDU reordering for reception)
Duplicate detection function (duplicate detection of lower-layer SDUs at PDCP reestablishment procedure for RLC AM)
Retransmission function (retransmission of PDCP SDUs at handover and, for split bearers in DC, of PDCP PDUs at PDCP data recovery procedure, for RLC AM)
Ciphering and deciphering function (ciphering and deciphering)
Timer-based SDU removal function (timer-based SDU discard in uplink)

Radio link controls (RLCs) 1b-10 and 1b-35 reconfigure a PDCP Packet Data Unit (PDU) to be the appropriate size and perform an automatic repeat request (ARQ) operation, The main functions of the RLC are described below.

Data transmission function (transfer of upper-layer PDUs)
ARQ function (error Correction through ARQ (only for AM data transfer))
Concatenation, segmentation, and reassembly function (concatenation, segmentation and reassembly of RLC SDUs (only for UM and AM data transfer))
Re-segmentation function (re-segmentation of RLC data PDUs (only for AM data transfer))
Reordering function (reordering of RLC data PDUs (only for UM and AM data transfer)
Duplication detection function (duplication detection (only for UM and AM data transfer))
Error detection function (protocol error detection (only for AM data transfer))
RLC SDU deletion function (RLC SDU discard (only for UM and AM data transfer))
RLC reestablishment function (RLC reestablishment)

The MACs 1b-15 and 1b-30 are connected with various RLC layer devices included in one UE, and perform an operation for multiplexing RLC PDUs to the MAC PDU and demultiplexing the RLC PDUs from the MAC PDU. The main functions of the MAC are described below Mapping function (mapping between logical channels and transport channels)

Multiplexing and demultiplexing function (multiplexing/demultiplexing of MAC SDUs belonging to one or multiple different logical channels into/from transport blocks (TB) delivered to/from the physical layer on transport channels)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The PHY layers 1b-20 and 1b-25 perform an operation for channel-coding and modulating higher-layer data to generate an OFDM symbol and transmitting the OFDM symbol through a radio channel or demodulating and channel-decoding the OFDM symbol received through a radio channel and transmitting the demodulated and channel-decoded OFDM symbol to a higher layer.

Figure 1C:
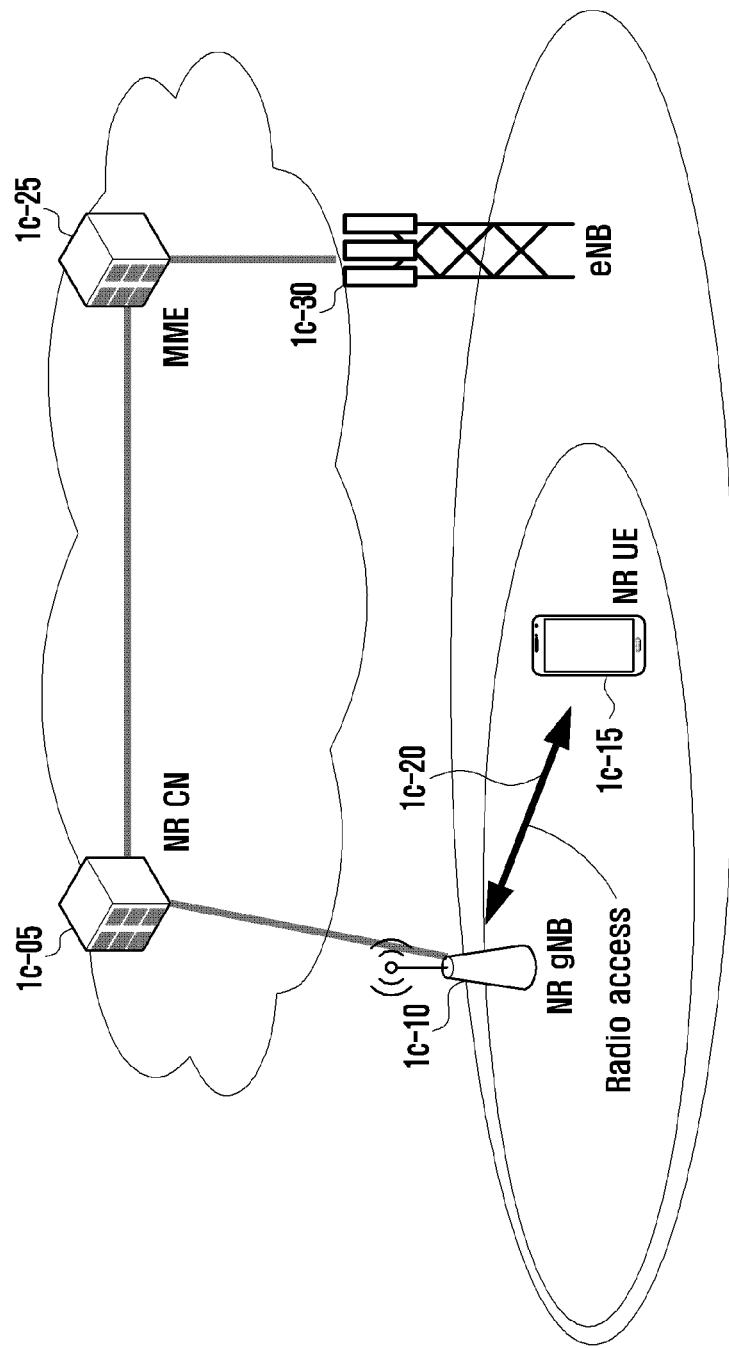
FIG. 1C illustrates the structure of a next-generation mobile communication system to which the disclosure can be applied.

FIG. 1C illustrates the structure of a next-generation mobile communication system to which the disclosure can be applied.

Referring to FIG. 1C, a radio access network of a next-generation mobile communication system (hereinafter, NR or 5G) includes a next-generation base station 1c-10 (new-radio node B) (hereinafter, referred to as an NR gNB, or an NR base station) and a new-radio core network (NR CN) 1c-05. A user terminal (new radio user equipment) (hereinafter, referred to as a NR UE or a UE 1c-15) accesses an external network through the NR gNB 1c-10 and the NR CN 1c-05.

In FIG. 1C, the NR gNB 1c-10 corresponds to an evolved Node B (eNB) of the conventional LTE system. The NR gNB may be connected to an NR UE 1c-15 through a radio channel and may provide better service than the conventional node B. Since all user traffic is served through a shared channel in the next-generation mobile communication system, a device for collecting and scheduling status information of buffer statuses, available transmission power statuses, and channel statuses of UEs is required, and corresponds to the NR NB 1c-10. One NR gNB generally controls a plurality of cells. The NR NB may have a bandwidth wider than the conventional maximum bandwidth in order to implement super-high-speed data transmission compared to conventional LTE, may apply orthogonal frequency-division multiplexing (OFDM) through radio-access technology, and may further apply beamforming technology.

Further, an adaptive modulation and coding (AMC) scheme of determining a modulation scheme and a channel-coding rate is applied depending on the channel status of the UE. The NR CN 1c-05 performs a function of supporting mobility, configuring a bearer, and configuring a QoS. The NR CN is a device for performing a function of managing the mobility of the UE and various control functions, and is connected to a plurality of gNBs. Further, the next-generation mobile communication system may be linked to the conventional LTE system, and the NR CN is connected to an MME 1c-25 through a network interface. The MME is connected to an eNB 1c-30, which is a conventional base station.

Figure 1D:
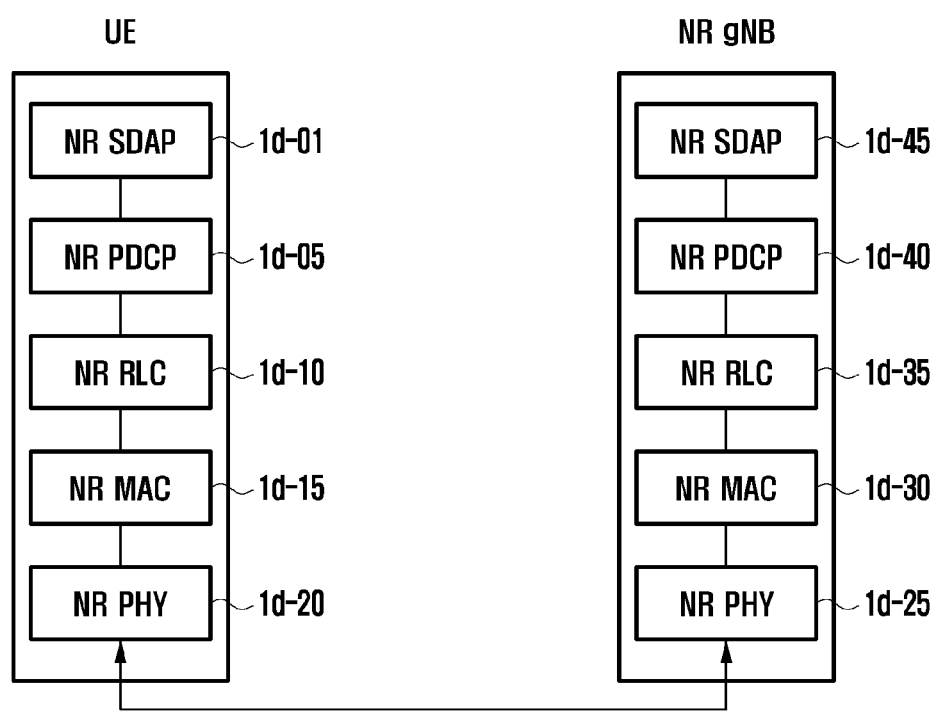
FIG. 1D illustrates the structure of a wireless protocol of the ext-generation mobile communication system to which the disclosure can be applied.

FIG. 1D illustrates the structure of a wireless protocol of the next-generation mobile communication system to which the disclosure can be applied.

Referring to FIG. 1D, the wireless protocol of the next-generation mobile communication system includes NR SDAPs 1d-01 and 1d-45, NR PDCPs 1d-05 and 1d-40, NR RLCs 1d-10 and 1d-35, and NR MACS 1d-15 and 1d-30 in the UE and the NR gNB.

The main functions of the NR SDAPs 1d-01 and 1d-45 may include some of the following functions.

User data transmission function (transfer of user-plane data)

Function of mapping QoS flow and a data bearer for uplink and downlink (mapping between a QoS flow and a DRB for both DL and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCP 1d-05 or 1d-40 may include some of the following functions.

Header compression and decompression function (header compression and decompression: ROHC only)

User data transmission function (transfer of user data)

Sequential delivery function (in-sequence delivery of upper-layer PDUs)

Non-sequential delivery function (out-of-sequence delivery of upper-layer PDUs)

Reordering function (PDCP PDU reordering for reception)

Duplicate detection function (duplicate detection of lower-layer SDUs)

Retransmission function (retransmission of PDCP SDUs)

Ciphering and deciphering function (ciphering and deciphering)

Timer-based SDU removal function (timer-based SDU discard in uplink)

The reordering function of the NR PDCP device is a function of sequentially reordering PDCP VDUs received by a lower layer on the basis of a PDCP Sequence Number (SN), and may include a function of sequentially transferring the reordered data to a higher layer, a function of directly transmitting the data without regard to the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 1d-10 or 1d-35 may include some of the following functions.

Data transmission function (transfer of upper-layer PDUs)

Sequential delivery function (in-sequence delivery of upper-layer PDUs)

Non-sequential delivery function (out-of-sequence delivery of upper-layer PDUs)

ARQ function (error correction through ARQ)

Concatenation, segmentation, and reassembly function (concatenation, segmentation and reassembly of RLC SDUs)

Re-segmentation function (re-segmentation of RLC data PDUs)

Reordering function (reordering of RLC data PDUs)

Duplicate detection function (duplicate detection)

Error detection function (protocol error detection)

RLC SDU deletion function (RLC SDU discard)

RLC reestablishment function (RLC reestablishment)

The sequential delivery function (In-sequence delivery) of the NR RLC device is a function of sequentially transferring PDCP PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RlX Sequence Number (SN) or a PDCP SN, a function of recording RLC PDUs lost due to the reordering, a function of reporting statuses of the lost RLC PDUs to a transmitting side, a function of making a request for retransmitting the lost PDCP PDUs, if there is a lost RLC SDU, a function of sequentially transferring only RLC SDUs preceding the lost RLC SDU to the higher layer, if a predetermined timer expires when there is a lost RLC SDU, a function of sequentially transferring all RLC SDUs received before the timer starts to the higher layer, or, if a predetermined timer expires when there is a lost RLC SDU, a function of sequentially transferring all RLC SDUs received up to that point in time to the higher layer. Further, the NR RLC device may process the RLC PDUs sequentially in an order of reception thereof (according to an arrival order, and regardless of a serial number or a sequence number) and may transfer the RLC PDUs to the PDCP device regardless of the sequence thereof (out-of-sequence delivery). In the case of segments, the NR RlX device may receive segments which are stored in the buffer or will be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 1d-15 and 1d-30 may be connected to a plurality of NR RLC layer devices configured in one UE, and the main functions of the NR MACs may include some of the following functions.

Mapping function (mapping between logical channels and transport channels)

Multiplexing and demultiplexing function (multiplexing/demultiplexing of MAC SDUs)

Scheduling information report function (scheduling information reporting)

HARQ function (error correction through HARQ)

Logical channel priority control function (priority handling between logical channels of one IJE)

UE priority control function (priority handling between UEs by means of dynamic scheduling)

MBMS service identification function (MBMS service identification)

Transport format selection function (transport format selection)

Padding function (padding)

The PHY layers 1d-20 and 1d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

The disclosure proposes a method of rapidly activating carrier aggregation and saving a UE battery in the next-generation mobile communication system.

The network or the gNB may configure a Spcell (Pcell or PScell) and a plurality of Scells in the UE. The Spcell refers to a Pcell when the UE communicates with one gNB and refers to a Pcell of a master gNB or a PScell of a secondary gNB when the UE communicates with two gNBs (the master gNB and the secondary gNB).

The Pcell and the Pscell are primary cells used by each MAC layer device for communication between the UE and the gNB, and correspond to cells for synchronizing timing, performing random access, transmitting HARQ ACK/NACK feedback through PUCCH transmission resources, and exchanging most control signals. A technology in which the gNB operates a plurality of Scells as well as the Spcell to increase uplink or downlink transmission resources is referred to as carrier aggregation.

Upon receiving the configuration of the Spcell and the plurality of Scells, the UE may receive a configuration of a mode for each Scell. The mode of the Scell may include an active mode and an inactive (deactivated mode).

In the active mode, the UE may transmit and receive uplink or downlink data to and from the gNB in the active-mode Scell (or an activated bandwidth part of the Scell). Further, the UE may monitor a PDCCH for identifying an indication of the gNB, measure a channel for the downlink of the active-mode Scell (or the activated bandwidth part of the Scell), periodically report measurement information to the gNB, and periodically transmit a pilot signal (sounding reference signal: SRS) to the gNB so that the gNB can measure an uplink channel.

However, in the inactive mode, the UE may not transmit or receive data to or from the gNB in the Scell, does not monitor a PDCCH for identifying an indication of the gNB, does not measure a channel, does not report the measurement, and does not transmit a pilot signal.

Accordingly, in order to activate Scells in the inactive mode, the gNB first configures measurement configuration information in the UE through an RRC message, and the UE measures a cell or a frequency on the basis of the measurement configuration information. Further, after receiving a cell or frequency measurement report from the UE, the gNB may activate the deactivated Scells on the basis of the frequency/channel measurement information. Accordingly, much latency is generated when the gNB activates carrier aggregation for the UE.

The disclosure proposes a dormant mode for the Scell (or bandwidth part) to reduce latency and save a UE battery.

In the dormant mode, the UE may not transmit or receive data to or from the gNB in a dormant Scell or a dormant bandwidth part (BWP), does not monitor a PDCCH for identifying an indication of the gNB, and does not transmit a pilot signal. However, the UE in the dormant mode may measure a channel and report a measurement result of the measured frequency/cell/channel periodically or when an event is generated according to a gNB configuration. Accordingly, the UE neither monitors the PDCCH nor transmits the pilot signal in the dormant Scell or the dormant BWP, thereby saving the battery compared to the active mode. Unlike in the inactive mode, the UE reports the channel measurement, and thus the gNB may rapidly activate the dormant Scell or the dormant BWP on the basis of the measurement report and use carrier aggregation.

Since a frequency of a notably high band can be used in the next-generation mobile communication system, a frequency bandwidth may also be very wide. However, in UE implementation, completely supporting the very wide bandwidth requires high implementation complexity, which causes high costs. Accordingly, the next-generation mobile communication system may introduce the concept of a bandwidth part (BWP), and thus a plurality of BWPs may be configured in one cell (Spcell or Scell) and the UE and the gNB may transmit and receive data in one or a plurality of BWPs according to a configuration of the gNB.

When the dormant mode proposed by the disclosure is introduced, the disclosure proposes a state transition (or switching) method and a detailed operation thereof in consideration of an Scell and a plurality of bandwidth parts configured in the Scell. Further, the disclosure proposes each of a method of managing the dormant mode in units of Scells (Scell-level) and transitioning the state and a method of managing the dormant mode in units of bandwidth parts (BWP-level) and transitioning the state, and proposes a detailed operation of the bandwidth part according to each mode (active, inactive, or dormant mode).

In the disclosure, the BWP may be used without any distinction between uplink and downlink, and the meaning thereof may be an uplink BWP or a downlink BWP according to the context.

Figure 1E:
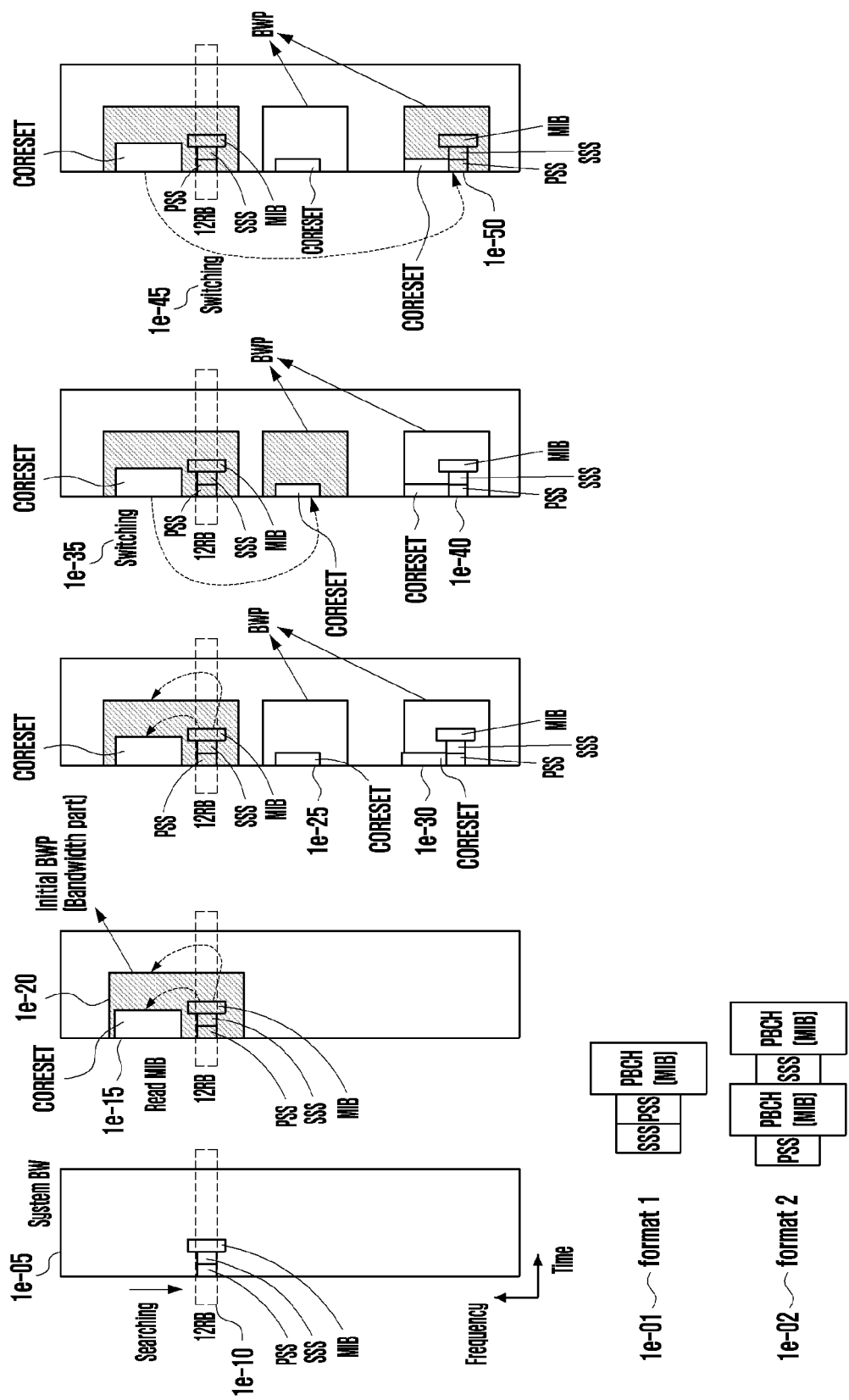
FIG. 1E illustrates a procedure of serving the UE by efficiently using a very wide frequency bandwidth in the next-generation mobile communication system according to the disclosure.

FIG. 1E illustrates a procedure of serving the UE by efficiently using a frequency bandwidth in the next-generation mobile communication system according to the disclosure.

In FIG. 1E, a method of providing service to UEs having different capabilities or categories by efficiently using a frequency bandwidth and saving a battery in the next-generation mobile communication system is described.

One cell provided by the NR gNB may serve a very wide frequency bandwidth 1e-05. However, in order to provide service to UEs having different capabilities, the wide frequency bandwidth may be divided into a plurality of bandwidth parts to manage one cell.

First, the turned-on UE may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks, as indicated by reference numeral 1e-10.

If the UE searches for the PSS/SSS 1e-01 or 1e-02 in units of resource blocks and then detects the signals, the UE may read the signals, analyze (decode) the signals, and identify a boundary between a subframe and a radio transmission resource frame (radio frame). Accordingly, the UE may identify subframes in units of 1 ms and synchronize a downlink signal with the NR gNB. The resource block (RB) is the size of a predetermined frequency resource and a predetermined time resource and may be defined as a two-dimensional unit. For example, the time resource may be defined in units of 1 ms, and the frequency resource may be defined as 12 subcarriers (1 carrier×15 kHz=180 kHz).

When the UE completes synchronization, the UE may identify information on a control resource set (CORESET) by checking a master system information block (MIB) or minimum system information (MSI) and identify initial access bandwidth part (BWP) information, as indicated by reference numerals 1e-15 and 1e-20.

CORESET information refers to resources through which a control signal is transmitted from the NR gNB, and may be, for example, the location of resources through which a PDCCH channel is transmitted. That is, the CORESET information is information indicating resources through which first system information (system information block 1: SIB 1) is transmitted, and indicates frequency/time resources through which a PDCCH is transmitted.

The UE may identify information on an initial bandwidth part (BWP) by reading the first system information. As described above, if the UE completes synchronization of the downlink signal with the NR gNB and is able to receive a control signal, the UE may perform a random-access procedure in an initial bandwidth part (BWP) of a cell on which the UE camps, make a request for configuring an RRC connection, receive an RRC message, and make an RRC connection configuration.

In the RRC connection configuration, a plurality of bandwidth parts may be configured in every cell (Pcell, Pscell, Spcell, or Scell). A plurality of bandwidth parts may be configured for downlink within one cell, and separately, a plurality of bandwidth parts may be configured for uplink.

The plurality of bandwidth parts may be indicated and configured by BSP identifiers to be used as an initial BWP, a default BWP, or a first active BWP.

The initial BWP may be used as a cell-specific BWP, one of which exists per cell, and may be used as a BWP in which the UE initially accessing the cell may configure the connection in the cell through a random-access procedure or the UE configuring the connection may perform synchronization.

The NR gNB may configure an initial downlink BWP to be used in downlink and an initial uplink BWP to be used in uplink for each cell.

Configuration information of the initial BWP may be broadcasted through first system information (system information 1: SIB 1) indicated by the CORESET, and may be configured again in the UE accessing the NR gNB through an RRC message.

The initial BWP may be used while being designated with BWP identifier number 0 in each of the uplink and the downlink. That is, all UEs accessing the same cell may equally designate the same initial BWP to BWP identifier number 0. This confers an advantage of easily performing a contention-based random-access procedure because the NR gNB can transmit a random-access response (RAR) message in the initial BWP which all UEs can read during the random-access procedure.

The first active BWP may be configured to be UE-specific, and may be designated to and indicated by the identifier of a BWP among a plurality of BWPs. The first active BWP may be configured for each of the downlink and the uplink, and may include a first active downlink BWP and a first active uplink BWP configured as respective BWP identifiers.

When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving information indicating activation of the Scell or the BWP through an RRC message, MAC control information, or DCI, the UE may perform an operation of switching the downlink BWP of the Scell to the BWP indicated by the RRC message (e.g., first active downlink BWP) to activate the downlink BWP and switching the uplink BWP to BWP indicated by the RRC message (e.g., the first active uplink BWP) to activate the uplink BWP. Alternatively, the UE may perform the operation when receiving an indication indicating transition of the Scell or the BWP to the dormant state through an RRC message, MAC control information, or DCI. This is because the NR gNB can effectively use carrier aggregation by measuring and reporting a frequency/channel for the first active downlink/uplink BWP when a channel measurement report is transmitted in the dormant state, because the UE switches the downlink BWP to first active downlink BWP and actives the downlink BWP and switches the uplink BWP to first active uplink BWP and activates the uplink BWP when the Scell or the BWP is activated.

The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP among a plurality of downlink BWPs after a predetermined time.

For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP.

If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform NR gNB scheduling as the NR gNB allows the UE to receive an indication of the NR gNB (for example, DCI of a PDCCH) by falling back to the default BWP for each cell after a predetermined time. For example, if the NR gNB configures the default BWP of the UEs accessing one cell as the initial BWP, the NR gNB may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the Nr gNB, the default BWP may be defined and configured for the uplink and thus used, like the default BWP of the downlink.

Figure 1F:
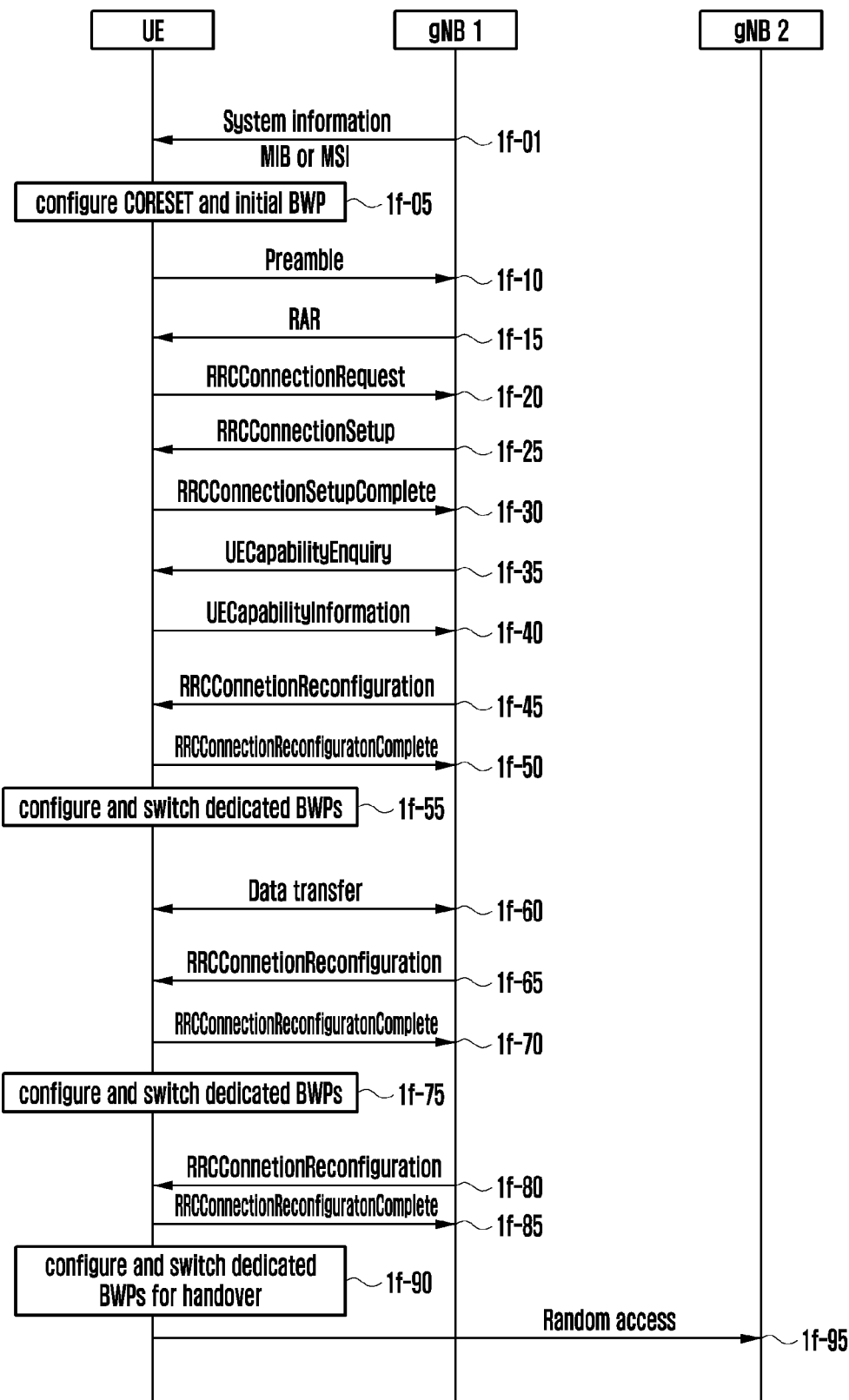
FIG. 1F illustrates a procedure in which a UE switches from an RRC-idle mode to an RRC-connected mode in a next-generation mobile communication system, which is a method of configuring a plurality of bandwidth parts (BWPs) and configuring a default BWP or a first active BWP.

FIG. 1F illustrates a procedure in which a UE switches from an RRC-idle mode to an RRC-connected mode in a next-generation mobile communication system, which is a method of configuring a plurality of bandwidth parts (BWPs) and configuring a default BWP or a first active BWP.

One cell to which the gNB provides service may serve a significantly wide frequency band. First, the UE may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks.

If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by checking a master system information block (MIB) or minimum system information (MSI) and identify initial access bandwidth part (BWP) information by reading system information in steps 1*f*-01 and 1*f*-05. CORESET information refers to the location of time/frequency transmission resources through which a control signal is transmitted from the gNB, and may be, for example, the location of resources through which a PDCCH channel is transmitted.

As described above, if the UE completes synchronization of the downlink signal with the gNB and is able to receive a control signal, the UE may perform a random-access procedure in the initial BWP, receive a random-access response, make a request for configuring an RRC connection, receive an RRC message, and configure the RRC connection in steps 1*f*-10, 1*f*-15, 1*f*-20, 1*f*-25, and 1*f*-30.

If the basic RRC connection is completely configured, the gNB may transmit an RRC message which enquires about a UE capability (UECapabilityEnquire) to the UE in order to identify the UE capability in 1*f*-35. In another method, the gNB may ask (or request) the MME or the AMF about the UE capability in order to identify the UE capability. This is because the MME or the AMF may have UE capability information if the MME or the AMF has accessed the UE. If there is no UE capability requested by the gNB, the gNB may make a request for UE capability to the UE. Alternatively, the gNB may store UE capability information, in which case step 1*f*-35 may be omitted.<0

The reason why the gNB transmits the RRC message to the UE to identify the UE capability is to identify the UE capability, for example, information indicating a frequency band that the UE can read or the area of the frequency band that the UE can read. After identifying the UE capability, the gNB may configure an appropriate BWP in the UE.

If the UE receives the RRC message which enquires about the UE capability, the UE may transmit information containing information indicating the range of bandwidth that the UE supports, indicate an offset from a reference center frequency to indicate a range of bandwidth supported in the current system bandwidth, information directly indicating a start point and an end point of the supported frequency bandwidth, or information indicating a center frequency and a bandwidth in step 1f-40.

The BWP may be configured through an RRCSetup message or an RRCResume message of the RRC connection configuration in step 1f-25 or an RRCReconfiguration message in step 1f-45, the RRC message may include configuration information of a PCell, a Pscell, or a plurality of Scells, and a plurality of BWPs may be configured for each cell (PCell, Pscell, or Scell).

When the plurality of BWPs is configured for each cell, a plurality of BWPs to be used in the downlink of each cell may be configured. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

Information for configuring BWPs of each cell (PCell, Pscell, or Scell) may include at least one piece of the following information.
Downlink BWP configuration information of the cell
Initial downlink BWP configuration information
A plurality of pieces of BWP configuration information and BWP IDs corresponding to the respective BWPs
A BWP ID indicating a first active downlink BWP
A BWP ID indicating a default BWP
BWP inactive timer configuration and a timer value
Uplink BWP configuration information of the cell
Initial uplink BWP configuration information
A plurality of pieces of BWPS configuration information and BWP IDs corresponding to the respective BWPs
A BWP ID indicating a first active uplink BWP The configured initial BWP, default BWP, or first active BWP may be used for the following purpose, and may be operated so as to suit the purpose.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization.

The NR gNB may configure an initial downlink BWP to be used in downlink and an initial uplink BWP to be used in uplink for each cell.

Configuration information of the initial BWP may be broadcasted through first system information (system information 1: SIB 1) indicated by the CORESET, and may be configured again in the UE to which the NR gNB is connected through an RRC message.

The initial BWP may be used while being designated with BWP identifier number 0 in each of the uplink and the downlink. That is, all UEs accessing the same cell may equally designate the initial BWP with the same BWP identifier number 0. This confers an advantage of easily performing a contention-based random-access procedure because the NR gNB can transmit a random-access response (RAR) message in the initial BWP which all UEs can read during the random-access procedure.

The first active BWP may be configured to be UE-specific, and may be designated to and indicated by the identifier of a BWP among a plurality of BWPs. The first active BWP may be configured for each of the downlink and the uplink, and a first active downlink BWP and a first active uplink BWP may be configured using respective BWP identifiers.

When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving an indication indicating activation of the Scell or the BWP an RRC message, MAC control information, or DCI, the UE may perform the operation of switching the downlink BWP of the Scell to first active downlink BWP (configured or indicated by the RRC message) and activating the downlink BWP and switching the uplink BWP to the first active uplink BWP and activating the uplink BWP. Further, the UE may perform the operation when receiving an indication indicating transition of the Scell or the BWP to the dormant state through an RRC message, MAC control information, or DCI. This is because the NR gNB can effectively use carrier aggregation by measuring and reporting a frequency/channel for the first active downlink/uplink BWP when a channel measurement report is transmitted in the dormant state, because the UE switches the downlink BWP to the first active downlink BWP (configured or indicated by the RRC message) to activate the downlink BWP and switches the uplink BWP to the first active uplink BWP to activate the uplink BWP when the Scell or the BWP is activated.

The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP among a plurality of downlink BWPs after a predetermined time.

For example, a BWP inactivity timer may be configured for each cell or each BWP through an RRC message, and the timer may start or restart when data transmission/reception is generated in an activated BWP rather than the default BWP, or may start or restart when the active BWP is switched to another BWP.

If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform NR gNB scheduling, because the NR gNB allows the UE to receive an indication of the NR gNB (for example, DCI of a PDCCH) by falling back to the default BWP for each cell after a predetermined time. For example, if the NR gNB configures the default BWP of the UEs accessing one cell as the initial BWP, the NR gNB may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the Nr gNB, the default BWP may be defined and configured for the uplink and thus used, like the default BWP of the downlink.

Further, the UE may configure a state transition timer through an RRC setup message of the RRC connection configuration, an RRCResume message of step 1*f*-25, or an RRCReconfiguration message of step 1*f*-45 to make the UE configure the state transition by itself even though the UE does not receive an indication from the NR gNB through an RRC message, MAC control information, or DCI of a PDCCH.

For example, if a cell deactivation timer (ScellDeactivationTimer) is configured for each Scell and the cell deactivation timer expires, the Scell may transition to the inactive state.

If a cell hibernation timer (ScellHibernationTimer) is configured for each Scell and the cell hibernation timer expires, the Scell may transition to the dormant state. When the cell hibernation timer expires, only the Scell in the active state transitions to the dormant state, but the Scell in the inactive state or the dormant state does not transition to the dormant state.

A dormant-state cell deactivation timer may be configured for each Scell, and the Scell in the dormant state may transition to the inactive state. When the dormant-state cell deactivation timer expires, only the Scell in the dormant state transitions to the inactive state, but the Scell in the active state or the inactive state does not transition to the inactive state.

If the cell deactivation timer (ScellDeactivationTimer) and the cell hibernation timer (ScellHibernationTimer) are configured together, the cell hibernation timer (ScellHibernationTimer) is prioritized. That is, if the cell hibernation timer (ScellHibernationTimer) is configured, the corresponding Scell may not be deactivated even if the cell deactivation timer (ScellDeactivationTimer) expires. In other words, if the cell hibernation timer (ScellHibernationTimer) is configured, the Scell first transitions from the active state to the dormant state due to expiration of the cell hibernation timer, and the cell having transitioned to the dormant state transitions to the inactive state due to expiration of the dormant-state cell deactivation timer. Accordingly, if the cell hibernation timer is configured, the cell deactivation timer does not influence the Scell state transition, and if the cell hibernation timer is configured even though the cell deactivation timer expires, the Scell may not transition to the inactive state.

If the cell deactivation timer is not configured in the RRC message, the UE may consider the cell deactivation timer to be set to an infinite value.

Further, the NR gNB may configure frequency measurement configuration information and frequency measurement gap information through an RRC setup message of the RRC connection configuration, the RRCResume message of step 1*f*-25, or the RRCReconfiguration message of step 1*f*-45, and the message may include information on a target for which a frequency is to be measured (measurement object).

The measurement object may include information on a BWP in which a reference signal (RS)/synchronization signal (SS) for measurement is configured, and may also include a center frequency, a bandwidth corresponding to a BWP, and a time pattern that should be applied during measurement.

The measurement report gap information may include a measurement gap length corresponding to the time for which measurement is performed, a measurement gap period, and measurement gap start time information. The RS is a signal of the NR gNB having a partial a time/frequency pattern in transmission resources of a subframe in which a control signal or a data signal is transmitted, and may be used to determine the strength of a signal of the corresponding BWP or the corresponding cell. The SS is a periodically transmitted synchronization signal such as a PSS or an SSS, and may be used to determine the strength of a signal of the corresponding BWP or the corresponding cell.

As described above, when the RRC connection configuration is completed, the UE may configure a plurality of BWPs according to the indication configured through the RRC message. Further, in order to save a battery, the UE may activate one or a small number of BWPs among the plurality of configured BWPs. For example, the NR gNB may indicate one BWP to be activated.

The NR gNB may indicate activation of a BWP through an RRC message, MAC control information (MAC CE), or L1 signaling WHY layer control signal such as a PDCCH) (for example, may indicate whether to perform activation or deactivation through bitmap information) to indicate switching from the initial access BWP to a new BWP. Since there are many new accessing in the initial access BWP, it may be more advantageous to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information (in order to reduce signaling overhead).

Hereinafter, the disclosure proposes a dormant state in the next-generation mobile communication system and proposes a method of supporting transition between three states in units of cells.

Figure 1G:
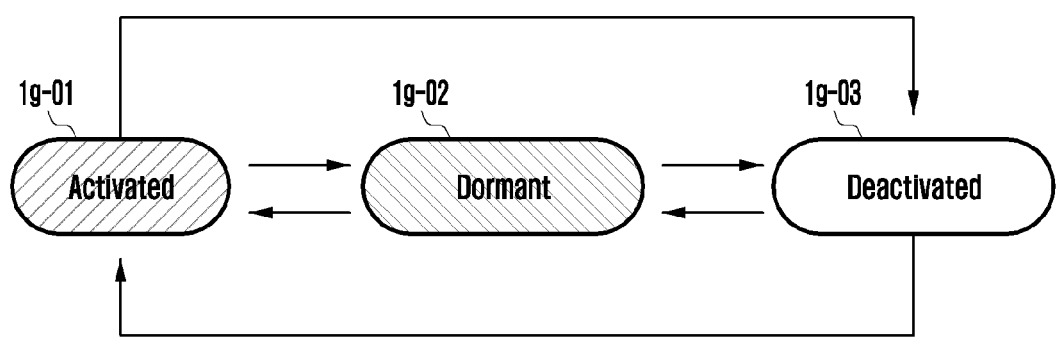
FIG. 1G illustrates a state transition procedure of a cell or a BWP proposed by the disclosure.

FIG. 1G illustrates a state transition procedure of a cell or a BWP proposed by the disclosure.

In FIG. 1G, each cell or BWP of the UE may have an active state 1*g*-01, an inactive state 1*g*-03, or a dormant state 1*g*-02, and may perform state transition due to an indication through configuration information of an RRC message, MAC control information, or DCI of a PDCCH.

A state transition operation (active, inactive, or dormant state) of the Scell proposed by the disclosure may be performed as follows.

The case in which an Scell state is configured through an RRC message

The case in which Scell activation and deactivation MAC CEs are received

The case in which an Scell dormant MAC CE is received

The case in which a cell hibernation timer is not configured in an active-state Scell and a configured cell deactivation timer expires The case in which a cell hibernation timer configured in an active-state Scell expires The case in which a dormant-state-Scell deactivation timer configured in a dormant-state Scell expires Further, the state transition operation proposed by the disclosure may have the following features.

An Spcell (Pcell or Pscell) cannot transition to a dormant state, and is always in an active state. The Spcell performs synchronization with the UE, is used to transmit and receive a primary control signal, and the connection with the NR gNB is released if the Spcell is dormant or inactive, so the Spcell should always remain in the active state.

If a PUCCH is configured, even an Scell cannot transition to the dormant state. The Scell should be in the active state since there may be another cell which should transmit feedback of HARQ ACK/NACK through the PUCCH.

Due to such a feature, if a cell deactivation timer (ScellDeactivationTimer) is not applied to the Spcell or to the Scell in which the PUCCH is configured, the cell deactivation timer may operate only for other Scells.

A cell hibernation timer (ScellHibernationTimer) is prioritized over the cell deactivation timer (ScellDeactivationTimer). If one value is set as a timer value through the RRC message, the same value may be applied to all cells. In another method, the NR gNB may apply different timer values for Scells or BWPs in consideration of the characteristics of each Scell or BWP.

If the Scell is not indicated as being active or dormant through the RRC message, the Scell may basically operate in the inactive state initially.

A first embodiment of the disclosure proposes a first embodiment corresponding to the operation of each cell (Scell) and a BWP according to each state when an active state, an inactive state, or a dormant state proposed by the disclosure is applied in the next-generation mobile communication system using a BWP.

In the first embodiment of the disclosure, the active state, the inactive state, or the dormant state are operated, and the state transition is performed in units of Scells. When the state transition is performed in units of Scells, one of a plurality of BWPs belonging to the Scell (a predetermined BWP (for example, a first active BWP), a BWP which has been activated, or a most recently used BWP) performs the state transition according to the state transition of the Scell.

For example, if the Scell transitions from the active state to the dormant state, a first active uplink/downlink BWP among a plurality of BWPs belonging to the Scell may transition to the dormant state. This is because the first active uplink/downlink BWP configured through RRC is activated when a BWP in the inactive state or the dormant state transitions to the active state, and thus it is efficient to transmit a channel measurement report of the dormant state in the first active uplink/downlink BWP.

Figure 1H:
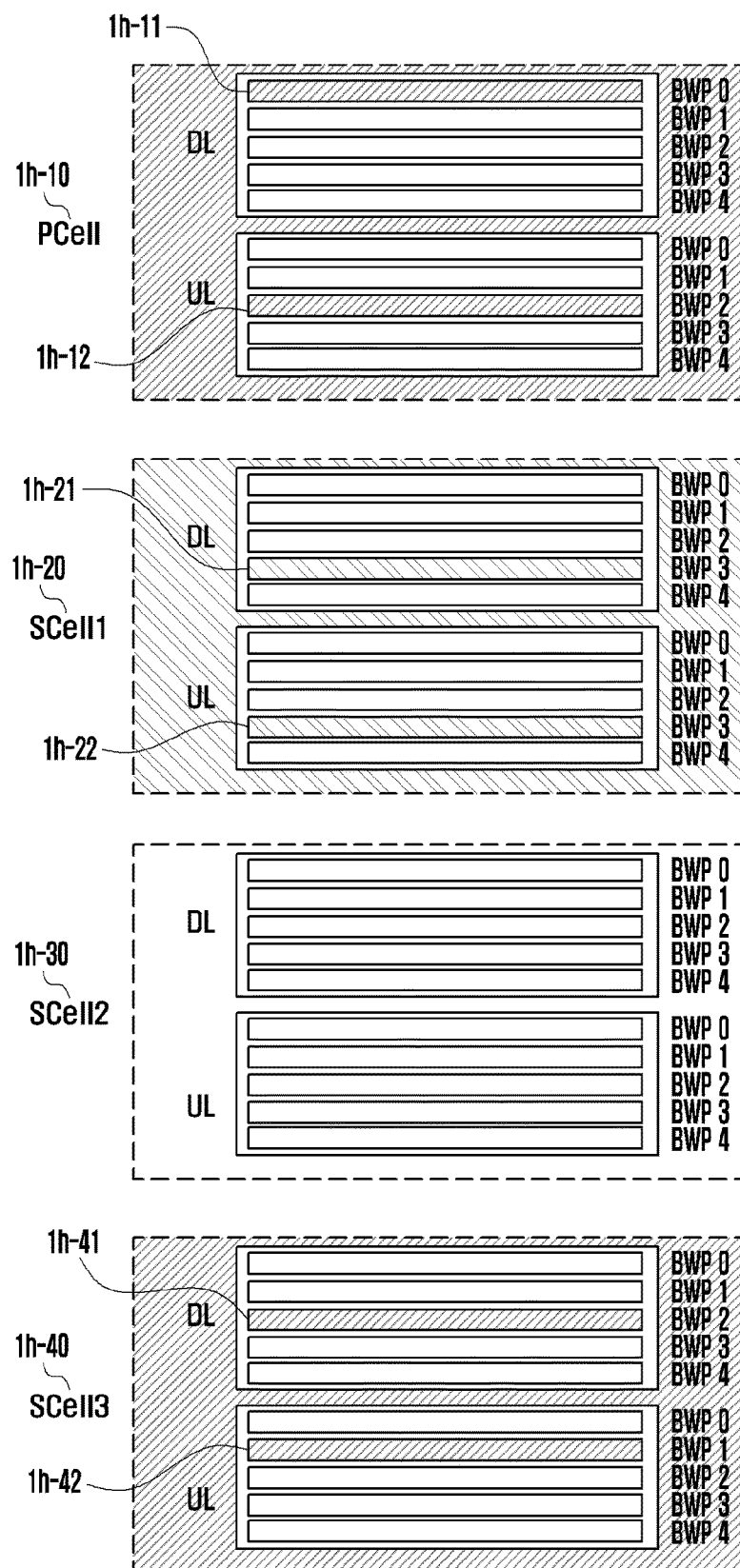
FIG. 1H illustrates a method of transitioning a state of a BWP through state transition in units of Scells proposed by the disclosure.

FIG. 1H illustrates a method of transitioning the state of a BWP through state transition in units of Scells proposed by the disclosure.

In the first embodiment of the disclosure, the active state, the inactive state, or the dormant state are operated in units of Scells and the state transition is performed as illustrated in FIG. 1H. When the state transition is performed in units of Scells, one of a plurality of BWPs belonging to the Scell (a predetermined BWP (for example, a first active BWP), a BWP that has been activated, or the most recently used BWP) performs the state transition according to the state transition of the Scell.

As illustrated in FIG. 1H, a Pcell 1h-10 may always maintain an active state to prevent the release of a wireless connection between the NR gNB and the UE. In the case of an FDD system, each cell (Pcell or each of Scells) may distinguish frequencies for the downlink and the uplink, and a plurality of BWPs may be configured for each of the downlink and the uplink.

In the disclosure, only one BWP may have an active state or a dormant state for each of the downlink and the uplink in each Scell, and the remaining BWPs may be in an inactive state. That is, even though the state transition is performed in units of Scells, only one BWP may perform the state transition according to the state transition of the Scell for each of the uplink and the downlink and perform a BWP operation corresponding thereto.

For example, as illustrated in FIG. 1H, the NR gNB may configure a first Scell 1j-20, a second Scell 1h-30, and a third Scell 1h-40 in the UE.

If the NR gNB transitions the first Scell 1h-20 to the dormant state through an RRC message or a MAC CE, the UE may transition one BWP 1h-21 among a plurality of BWPs configured for the downlink in the first Scell (for example, a first active downlink BWP) to the dormant state, and may operate the remaining downlink BWPs in the inactive state. The UE may transition one BWP 1h-22 among a plurality of BWPs configured for the uplink in the first Scell (for example, a first active uplink BWP) to the dormant state, and may operate the other uplink BWPs in the inactive state.

If the NR gNB transitions the second Scell 1h-30 to the inactive state through an RRC message or a MAC CE, the UE may transition one BWP 1h-31 among a plurality of BWPs configured for the downlink in the second Scell (for example, a BWP which was previously in the active state or the dormant state) to the inactive state, and may operate the other downlink BWPs in the inactive state. The UE may transition one BWP 1h-32 among a plurality of BWPs configured for the uplink in the second Scell (for example, a BWP which was previously in the active state or the dormant state) to the inactive state, and may operate the other uplink BWPs in the inactive state.

If the NR gNB transitions the third Scell 1h-40 to the active state through an RRC message or a MAC CE, the UE may transition one BWP 1h-41 among a plurality of BWPs configured for the downlink in the third Scell (for example, a first active downlink BWP) to the active state, and may operate the other downlink BWPs in the inactive state. The UE may transition one BWP 1h-42 among a plurality of BWPs configured for the uplink in the third Scell (for example, a first active uplink BWP) to the active state, and may operate the other uplink BWPs in the inactive state.

Hereinafter, the disclosure proposes a state transition operation for the Scell when the NR gNB indicates the state transition in units of Scells to the UE and a state transition operation of a downlink or uplink BWP belonging to the Scell.

If a (Scell activation/BWP activation) MAC layer device receives a MAC CE or an RRC message indicating activation of any Scell, some or all of a plurality of the following operations may be performed.

The Scell is activated, and the downlink BWP and the uplink BWP among the plurality of BWPs of the Scell are activated.

A sounding reference signal (SRS) is transmitted to allow the NR gNB to measure a channel for the uplink in the Scell (or activated BWP). For example, the SRS may be periodically transmitted.

The UE may report a channel measurement result (CSI, CQI, PMI, RI, PTI, or CRI) for the downlink in the Scell (or activated BWP) according to a configuration of the NR gNB.

A PDCCH is monitored to read an indication of the NR gNB in the Scell (or activated BWP).

A PDCCH is monitored to read cross scheduling for the Scell (or activated BWP).

If a PUCCH is configured in the Scell (or activated BWP), the PUCCH is transmitted.

If the Scell is deactivated before an indication indicating activation of the Scell (or if the Scell is in the dormant state before an indication indicating activation of the Scell), a downlink (DL) BWP and an uplink (UL) BWP of the Scell are activated to a first active downlink BWP (indicated by a firstActiveDownlinkBWP-Id) and a first active uplink BWP (indicated by a firstActiveUplinkBWP-id) indicated through an RRC message.

A cell deactivation timer (sCellDeactivationTimer) starts or restarts for the Scell. In another method, the cell deactivation timer may start or restart only when a cell hibernation timer is not configured.

If there are suspended type 1 configuration transmission resources, the resources may be initialized according to a type 1 transmission resource configuration, or may be initialized again and used. The type 1 configuration transmission resources are (uplink or downlink) periodic transmission resources pre-allocated through an RRC message, which can be used after being activated through the RRC message.

If the cell hibernation timer (sCellHibernationTimer) is configured in the cell, the cell hibernation timer (sCellHibernationTimer) starts or restarts for the Scell.

A PHR is triggered for the Scell.

If a (Scell deactivation or BWP deactivation) MAC layer device receives a MAC CE or an RRC message indicating deactivation of any Scell deactivation, Alternatively, if a cell deactivation timer for the Scell expires and the cell hibernation timer is not configured. (If the cell hibernation timer is configured, the cell hibernation timer should be prioritized, and thus expiration of the cell deactivation timer is ignored. That is, if the cell hibernation timer is configured, the cell state should first transition from the active state to the dormant state and then from the dormant state to the inactive state.)

The UE may perform some or all of a plurality of the following operations.

The Scell (or a BWP of the Scell) is deactivated.

A cell deactivation timer configured in the Scell is stopped.

A BWP deactivation timer configured for the Scell is stopped.

If there is a BWP configured and activated in the Scell, the Scell is deactivated.

If there is a BWP configured and hibernating in the Scell, the Scell is deactivated.

Periodic Downlink transmission resources (DL SPS or configured downlink assignment) or periodic uplink transmission resources (UL SPS or configured uplink grant Type 2) configured in the Scell may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore. The periodic transmission resources may be called type 2 configuration transmission resources. Further, the operation of releasing (clearing) the periodic transmission resources may be performed only when the Scell transitions from the active state to the inactive state. This is because the releasing (clearing) operation is not needed when transitioning from the dormant state to the inactive state since there are no periodic transmission resources in the dormant state. In another method, the periodic transmission resources can be released (cleared) only when the periodic downlink transmission resources or the periodic uplink transmission resources are configured or exist.

The periodic transmission resources are released (cleared) if there are PUSCH transmission resources configured for periodic channel measurement information (semi-persistent CSI reporting) for the Scell.

The periodic uplink transmission resources (configured uplink grant Type 1 configured through RRC) configured in the Scell may be suspended. The term "suspend" means that transmission resource configuration information configured through the RRC message is stored in the UE but is not used anymore. The periodic transmission resources may be called type 1 configuration transmission resources.

All HARQ buffers configured for the Scell are emptied.

If a PDCCH indicates that there is downlink data (downlink assignment) in any activated Scell or allocates uplink transmission resources (uplink grant), or if a PDCCH indicates that there is downlink data (downlink assignment) for any activated Scell in a serving cell for scheduling the activated Scell or allocates uplink transmission resources (uplink grant), or, for the activated configured Scell, if any MAC PDU is transmitted through pre-configured downlink transmission resources (configured downlink assignment) or pre-configured uplink transmission resources (configured uplink grant), the UE restarts a cell deactivation timer for the Scell. In another method, the cell deactivation timer may be restarted only when cell hibernation is not configured.

If the cell hibernation timer is configured for the Scell, the cell hibernation timer restarts.

If any Scell or a BWP of the Scell is deactivated or is in an inactive state, the UE does not transmit an SRS for the Scell (or the BWP of the Scell).

the UE neither measures (CSI, CQI, PMI, RI, PTI, or CRI) nor reports a channel for the downlink in the Scell (or the BWP of the Scell).

uplink data is not transmitted through UL-SCH in the Scell (or the BWP of the Scell).

a random-access procedure is not performed for the Scell (or the BWP of the Scell).

the UE does not monitor a PDCCH in the Scell (or the BWP of the Scell).

the UE does not monitor a PDCCH for the Scell (or the BWP of the Scell). For example, in the case of cross scheduling, a PDCCH for the Scell is not monitored in a cell in which the scheduling is performed.

a PUCCH or an SPUCCH is not transmitted in the Scell.

If there is a random-access procedure being performed in the Scell during deactivation of the Scell, the random-access procedure is canceled.

A dormant state is not applied to an Spcell or an Scell in which a PUCCH is configured.

The MAC layer device may operate two timers to efficiently manage the dormant state of the Scell. The two timers are described below in detail.

Cell hibernation timer (sCellHibernationTimer): operates in an Scell configured in the UE but does not operate in an Scell in which a PUCCH is configured.

If the cell hibernation timer expires, the MAC layer device transitions the Scell in an active state to a dormant state. The cell hibernation timer may be applied only to an active-state Scell. One value configured through RRC may be equally applied to the cell hibernation timer of each Scell.

The cell hibernation timer is prioritized over a cell deactivation timer. That is, if the cell hibernation timer is configured and is running, the Scell does not transition to the inactive state and the cell deactivation timer does not influence the Scell regardless of whether the cell deactivation timer is running or expires.

Dormant-state cell deactivation timer (dormantScellDeactivationTimer): operates in an Scell configured in the UE but does not operate in an Scell in which a PUCCH is configured. If the dormant-state cell deactivation timer expires, the MAC layer device transitions the Scell in a dormant state to an inactive state. One value configured through RRC may be equally applied to the dormant-state cell deactivation timer of each Scell. That is, the dormant-state cell deactivation timer is applied only to the Scell in the dormant state.

If there is an indication of the dormant state through an RRC message when the Scell is configured, the UE may transition the Scell to the dormant state. If the dormant state is indicated in an Scell state configuration of the RRC message even upon handover or SCG change, the UE may transition the Scell to the dormant state.

If the MAC layer device receives an indication of the dormant state of the Scell when the Scell is configured through an RRC message, or receives a MAC CE indicating state transition of the Scell to the dormant state, the UE may perform some or all of a plurality of the following operations.

- The Scell (or a BWP of the Scell) transitions to the dormant state.
- A cell deactivation timer configured or operated in the Scell (or a BWP of the Scell) is stopped.
- If a cell hibernation timer is configured in the Scell (or a BWP of the Scell), the cell hibernation timer is stopped.
- A dormant-state cell deactivation timer starts or restarts in the Scell (or a BWP of the Scell).
- A BWP deactivation timer configured for the Scell (or a BWP of the Scell) is stopped. This is to prevent an unnecessary BWP-switching procedure in the Scell.
- A downlink BWP of the Scell may be made to hibernate, and a channel measurement result may be reported. Further, an uplink BWP of the Scell may be deactivated and not used. This is because the channel is measured only for the downlink BWP in the dormant-state Scell and the measurement result is reported to the uplink BWP of the Spcell (Pcell or Pscell) or the Scell in which there is a PUCCH.
- A downlink (DL) BWP and an uplink (UL) BWP of the Scell are made to hibernate or switch to a first active downlink BWP (indicated by a firstActiveDownlinkBWP-Id) and a first active uplink BWP (indicated by a firstActiveUplinkBWP-id) indicated through an RRC message because the state transition of the Scell (or the BWP of the Scell) to the dormant state is indicated. This is because the first active uplink/downlink BWP configured through RRC is activated when a BWP in the inactive state or the dormant state transitions to the active state, and thus it is efficient to transmit a channel measurement report of the dormant state in the first active uplink/downlink BWP.

In another method, during the transition to the dormant state, only the downlink BWP may be switched and hibernated to the BWP indicated or configured by the RRC message (e.g., the first active downlink BWP). This is because the uplink BWP is also switched and activated to the BWP indicated or configured by the RRC message (e.g., the first active uplink BWP) when the Scell is activated. If the active-state BWP is originally the first active downlink or uplink BWP in the Scell before the indication of the dormant state, the BWP may be made to hibernate without the switching operation.

- Periodic Downlink transmission resources (DL SPS or configured downlink assignment) or periodic uplink transmission resources (UL SPS or configured uplink grant Type 2) configured in the Scell (or the BWP of the Scell) may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore.

The proposed method, that is, the operation of releasing (clearing) the configured periodic downlink transmission resources (DL SPS or configured downlink assignment) or the configured periodic uplink transmission resources (UL SPS or configured uplink grant) may be performed only when the Scell transitions from the active state to the dormant state. This is because there is no information on periodic transmission resources activated or indicated through L1 signaling when the Scell transitions from the inactive state to the dormant state.

In another method, the periodic transmission resources can be released (cleared) only when the periodic downlink transmission resources or the periodic uplink transmission resources are configured or when the periodic downlink transmission resources or the periodic uplink transmission resources exist.

- The periodic uplink transmission resources (configured uplink grant Type 1 configured through RRC) configured in the Scell (or the BWP of the SCell) may be suspended. The term "suspend" means that transmission resource configuration information configured through the RRC message is stored in the UE but is not used anymore.

The proposed method, that is, the operation of suspending the periodic uplink transmission resources (configured uplink grant Type 1), may be performed only when the Scell transitions from the active state to the dormant state. This is because the periodic transmission resources are not used when the Scell transitions from the inactive state to the dormant state. In another method, the periodic transmission resources can be released (cleared) only when the periodic downlink transmission resources or the periodic uplink transmission resources are configured or exist.

- All HARQ buffers configured in the Scell are emptied.
- If a cell hibernation timer expires in the activated Scell (or a BWP of the Scell),
- The UE transitions the Scell (or a BWP of the Scell) to the dormant state.
- The UE stops a cell deactivation tinier configured or operated in the Scell (or a BWP of the Scell).
- The UE stops a cell hibernation timer configured or operated in the Scell (or a BWP of the Scell).
- The UE starts or restarts a dormant-state cell deactivation timer in the Scell (or a BWP of the Scell).
- Periodic downlink transmission resources (DL SPS or configured downlink assignment) or periodic uplink transmission resources (UL SPS or configured uplink grant Type 2) configured in the Scell (or a BWP of the Scell) may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore.

The proposed method, that is, the operation of releasing (clearing) the configured periodic downlink transmission resources (DL SPS or configured downlink assignment) or the configured periodic uplink transmission resources (UL SPS or configured uplink grant), may be performed only when the Scell transitions from the active state to the dormant state. This is because there is no information on periodic transmission resources activated or indicated through L1 signaling when the Scell transitions from the inactive state to the dormant state.

In another method, the periodic transmission resources can be released (cleared) only when the periodic downlink transmission resources or the periodic uplink transmission resources are configured or when the periodic downlink transmission resources or the periodic uplink transmission resources exist.

If a dormant-state-cell deactivation timer configured in a dormant-state Scell expires, The Scell (or the BWP of the Scell) transitions to the inactive state.

The dormant-state-cell deactivation timer of the Scell (or a BWP of the Scell) is stopped.

If the Scell (or the BWP of the Scell) is in the dormant state,

The UE does not transmit an SRS for the Scell (or the BWP of the Scell).

The UI may measure (CSI, CQI, PMI, RI, PTI, or CRI) a channel for the downlink according to a configuration of the NR gNB in the Scell (or the BWP of the Scell) and report the measurement. For example, the UE may periodically report the channel or frequency measurement.

Uplink data may not be transmitted through UL-SCH in the Scell (or the BWP of the Scell).

A random-access procedure may not be performed for the Scell (or the BWP of the Scell).

The UE may not monitor a PDCCH in the Scell (or the BWP of the Scell).

The UE may not monitor a PDCCH for the Scell (or the BWP of the Scell). For example, in the case of cross scheduling, a PDCCH for the Scell may not be monitored in a cell in which the scheduling is performed.

A PUCCH or an SPUCCH may not be transmitted in the Scell (or the BWP of the Scell).

A downlink BWP of the Scell may be made to hibernate and a channel measurement result may be reported. Further, an uplink BWP of the Scell may be deactivated and not used. This is because the channel is measured only for the downlink BWP in the dormant-state Scell and the measurement result is reported to the uplink BWP of the Spcell (Pcell or Pscell) or the Scell in which there is a PUCCH.

A downlink (DL) BWP and an uplink (UL) BWP of the Scell are made to hibernate or switch to a the downlink BWP indicated or configured by the RRC message (e.g., first active downlink BWP (indicated by a firstActiveDownlinkBWP-Id)) and the uplink BWP indicated or configured by the RRC message (e.g., a first active uplink BWP (indicated by a firstActiveUplinkBWP-id)) because the transition of the Scell (or the BWP of the Scell) to the dormant state is indicated. This is because the first active uplink/downlink BWP configured through the RRC message is activated when an inactive-state or dormant-state BWP transitions to the active state, and thus it is efficient to transmit a channel measurement report of the dormant state in the first active uplink/downlink BWP.

In another method, during the transition to the dormant state, only the downlink BWP may be switched and hibernated to the downlink BWP indicated or configured by the RRC message (e.g., the first active downlink BWP). This is because the uplink BWP is also switched and activated to the first active uplink BWP when the Scell is activated. If the active-state BWP is originally the first active downlink or uplink BWP in the Scell before the indication of the dormant state, the BWP may be made to hibernate without the switching operation.

Periodic Downlink transmission resources (DL SPS or configured downlink assignment) or periodic uplink transmission resources (UL SPS or configured uplink grant Type 2) configured in the Scell (or the BWP of the Scell) may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore.

The proposed method, that is, the operation of releasing (clearing) the configured periodic downlink transmission resources (DL SPS or configured downlink assignment) or the configured periodic uplink transmission resources (UL SPS or configured uplink grant), may be performed only when the Scell transitions from the active state to the dormant state. This is because there is no information on periodic transmission resources activated or indicated through L1 signaling when the Scell transitions from the inactive state to the dormant state.

The periodic uplink transmission resources (configured uplink grant Type 1 configured through RRC) configured in the Scell may be suspended. The term "suspend" means that transmission resource configuration information configured through the RRC message is stored in the UE but is not used anymore.

The proposed method, that is, the operation of suspending the periodic uplink transmission resources (configured uplink grant Type 1), may be performed only when the Scell transitions from the active state to the dormant state. This is because the periodic transmission resources are not used when the Scell transitions from the inactive state to the dormant state.

If there is a random-access procedure being performed during transition of the Scell to the dormant state, the random-access procedure may be canceled.

Hereinafter, the disclosure proposes an operation of each cell (Scell) according to each state when the active state, the inactive state, or the dormant state proposed by the disclosure is applied in a system (for example, a UMTS or LTE system) using a fixed frequency bandwidth in each frequency band without using a BWP according to a second embodiment of the disclosure.

If a (Scell activation) MAC layer device receives a MAC CE indicating activation of any Scell or an RRC message indicating activation of the Scell, some or all of a plurality of the following operations may be performed.

The Scell may be activated.

A sounding reference signal (SRS) may be transmitted to allow the NR gNB to measure a channel for the uplink in the Scell. For example, the SRS may be periodically transmitted.

The UE may report a channel measurement result (CSI, CQI, PMI, RI, PTI, or CRI) for the downlink in the Scell according to a configuration of the NR gNB.

A PDCCH may be monitored in the Scell to read an indication of the NR gNB.

A PDCCH may be monitored to read cross scheduling for the Scell.

If a PUCCH may be configured in the Scell, the PUCCH is transmitted.

A cell deactivation timer (sCellDeactivationTimer) may start or restart for the Scell (in another method, the cell deactivation timer may start or restart only when the cell hibernation timer is not configured).

If the cell hibernation timer (sCellHibernationTimer) is configured in the cell, the cell deactivation timer (sCellDeactivationTimer) starts or restarts for the Scell.

A PHR may be triggered for the Scell.

If a (Scell deactivation) MAC layer device receives a MAC CE indicating deactivation of any Scell or an RRC message indicating deactivation thereof, or if a cell deactivation timer for the Scell expires and the cell hibernation timer is not configured (if the cell hibernation timer is configured, the cell hibernation timer should be prioritized, and thus expiration of the cell deactivation timer may be ignored. That is, if the cell hibernation timer is configured, the cell state should first transition from the active state to the dormant state and then from the dormant state to the inactive state), the UE may perform some or all of a plurality of the following operations.

The Scell may be deactivated.

A cell deactivation timer configured in the Scell may be stopped.

Periodic downlink transmission resources (DL SPS or configured downlink assignment) or periodic uplink transmission resources (UL SPS or configured uplink grant Type 2) configured in the Scell (or a BWP of the Scell) may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore.

Further, the operation of releasing (clearing) the periodic transmission resources may be performed only when the Scell transitions from the active state to the inactive state. This is because the releasing (clearing) operation is not needed when the transition is made from the dormant state to the inactive state because there are no periodic transmission resources in the dormant state. In another method, the periodic transmission resources can be released (cleared) only when the periodic downlink transmission resources or the periodic uplink transmission resources are configured or exist.

The periodic transmission resources may be released (cleared) if there are PUSCH transmission resources configured for periodic channel measurement information (semi-persistent CSI reporting) for the Scell.

All HARQ buffers configured for the Scell may be emptied.

If any Scell may be deactivated or may be in the inactive state, the UE does not transmit an SRS for the Scell.

The UE neither measures (CSI, CQI, PMI, RI, PTI, or CRI) nor reports a channel for the downlink in the Scell.

Uplink data is not transmitted through UL-SCH in the Scell.

A random-access procedure is not performed for the Scell.

The UE does not monitor a PDCCH in the Scell.

The UE does not monitor a PDCCH for the Scell. For example, in the case of cross scheduling, a PDCCH for the Scell is not monitored in a cell in which the scheduling is performed.

A PUCCH or an SPUCCH is not transmitted in the Scell.

If a PDCCH indicates that there is downlink data (downlink assignment) in any activated Scell or allocates uplink transmission resources, or if a PDCCH indicates that there is downlink data (downlink assignment) for the activated Scell in a serving cell for scheduling the activated Scell or allocates uplink transmission resources (uplink grant), or, for the activated configured Scell, if any MAC PDU is transmitted through pre-configured downlink transmission resources (configured downlink assignment) or pre-configured uplink transmission resources (configured uplink grant), the UE may restart a cell deactivation timer for the Scell (in another method, the cell deactivation timer may be restarted only when cell hibernation is not configured).

If the cell hibernation timer is configured for the Scell, the cell hibernation timer may restart.

If there is a random-access procedure being performed in the Scell during deactivation of the Scell, the random-access procedure may be canceled.

The MAC layer device may operate two timers to efficiently manage the dormant state of the Scell.

Cell hibernation timer (sCellHibernationTimer): operates in an Scell configured in the UE but does not operate in an Scell in which a PUCCH is configured.

If the cell hibernation tinier expires, the MAC layer device may transition the Scell in an active state to a dormant state. That is, the cell hibernation timer may be applied only to an active-state Scell. One value configured through RRC may be equally applied to the cell hibernation timer of each Scell. The cell hibernation timer may be prioritized over the cell deactivation timer. That is, if the cell hibernation timer is configured and is running, the Scell does not transition to the inactive state regardless of whether the cell deactivation timer is running or expires, and the cell deactivation timer does not influence the Scell.

Dormant-state cell deactivation timer (dormantScellDeactivationTimer) operates in an Scell configured in the UE but does not operate in an Scell in which a PUCCH is configured, if the dormant-state cell deactivation timer expires, the MAC layer device may transition the Scell in a dormant state to an inactive state. One value configured through RRC may be equally applied to the dormant-state cell deactivation timer of each Scell. That is, the dormant-state cell deactivation timer may be applied only to the Scell in the dormant state.

If there is an indication of the dormant state through an RRC message when the Scell is configured, the UE may transition the Scell to the dormant state. If the dormant state is indicated even in the Scell state configuration of the RRC message for handover or SCG change, the UE may transition the Scell to the dormant state.

If the MAC layer device receives an indication of the dormant state of the Scell when the Scell is configured through an RRC message, or receives a MAC CE indicating state transition of the Scell to the dormant state, the UE may perform some or all of a plurality of the following operations.

The Scell may transition to the dormant state.

A cell deactivation timer configured or operated in the Scell may be stopped.

If a cell hibernation timer is configured in the cell, the cell hibernation timer may be stopped.

A dormant-state cell deactivation timer may start or restart in the Scell.

Periodic downlink transmission resources (DL SPS or configured downlink assignment) or periodic uplink transmission resources (UL SPS or configured uplink grant Type 2) configured in the Scell (or a BWP of the Scell) may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore.

The proposed method, that is, the operation of releasing (clearing) the configured periodic downlink transmission resources (DL SPS or configured downlink assignment) or configured periodic uplink transmission resources (UL SPS or configured uplink grant), may be performed only when the Scell transitions from the active state to the dormant state. This is because there is no information on periodic transmission resources activated or indicated through L1 signaling when the Scell transitions from the inactive state to the dormant state. In another method, the periodic transmission resources can be released (cleared) only when the periodic downlink transmission resources or the periodic uplink transmission resources are configured or when the periodic downlink transmission resources or the periodic uplink transmission resources exist.

All HARQ buffers configured in the Scell are emptied.

If the cell hibernation timer expires in the activated Scell, the UE may transition the Scell to the dormant state.

The UE may stop the cell deactivation timer configured or operated in the Scell.

The UE may stop the cell hibernation timer configured or operated in the Scell.

The UE may start or restart a dormant-state cell deactivation timer in the Scell.

Periodic downlink transmission resources (DL SPS or configured downlink assignment) or periodic uplink transmission resources (UL SPS or configured uplink grant Type 2) configured in the Scell (or a BWP of the Scell) may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore.

The proposed method, that is, the operation of releasing (clearing) the configured periodic downlink transmission resources (DL SPS or configured downlink assignment) or configured periodic uplink transmission resources (UL SPS or configured uplink grant), may be performed only when the Scell transitions from the active state to the dormant state. This is because there is no information on periodic transmission resources activated or indicated through L1 signaling when the Scell transitions from the inactive state to the dormant state.

In another method, the periodic transmission resources can be released (cleared) only when the periodic downlink transmission resources or the periodic uplink transmission resources are configured or when the periodic downlink transmission resources or the periodic uplink transmission resources exist.

If the dormant-state cell deactivation timer configured in the dormant state cell expires, the Scell transitions to the dormant state.

the dormant-state cell deactivation timer of the Scell may be stopped.

If the Scell is in the dormant state, the UE does not transmit an SRS for the Scell.

the UE may measure a channel (CIS, CQI, PMI, RI, PTI, or CRT) for the downlink in the Scell according to the configuration of the NR gNB and report the measurement. For example, the UE may periodically report the channel or frequency measurement, uplink data is not transmitted through UL-SCH in the Scell.

a random-access procedure is not performed for the Scell.

the UE does not monitor a PDCCH in the Scell.

the UE does not monitor a PDCCH for the Scell. For example, in the case of cross scheduling, a PDCCH for the Scell is not monitored in a cell in which the scheduling is performed.

a PUCCH or an SPUCCH is not transmitted in the Scell.

periodic downlink transmission resources (DL SPS or configured downlink assignment) or periodic uplink transmission resources (UL SPS or configured uplink grant Type 2) configured in the Scell (or a BWP of the Scell) may be released (cleared). The term "release (clear)" means that configuration information such as periodicity information configured through the RRC message is stored in the UE but information on periodic transmission resources activated or indicated through L1 signaling (for example, DCI) is removed (cleared or released) and is not used anymore.

The proposed method, that is, the operation of releasing (clearing) the configured periodic downlink transmission resources (DL SPS or configured downlink assignment) or configured periodic uplink transmission resources (UL SPS or configured uplink grant) may be performed only when the Scell transitions from the active state to the dormant state. This is because there is no information on periodic transmission resources activated or indicated through L1 signaling when the Scell transitions from the inactive state to the dormant state.

If there is a random-access procedure being performed during transition of the Scell to the dormant state, the random-access procedure is canceled, The dormant state is not applied to an Spcell or an Scell in which a PUCCH is configured.

Hereinafter, the disclosure proposes state transition MAC control information (MAC control element: MAC CE) indicating the active state, the dormant state, or the inactive state of each Scell.

Figure 1I:
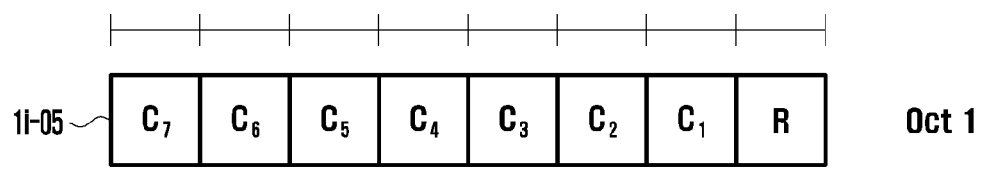
FIG. 1I illustrates MAC control information indicating state transition to an active state, a dormant state, or an inactive state proposed by the disclosure.
Figure 1I:
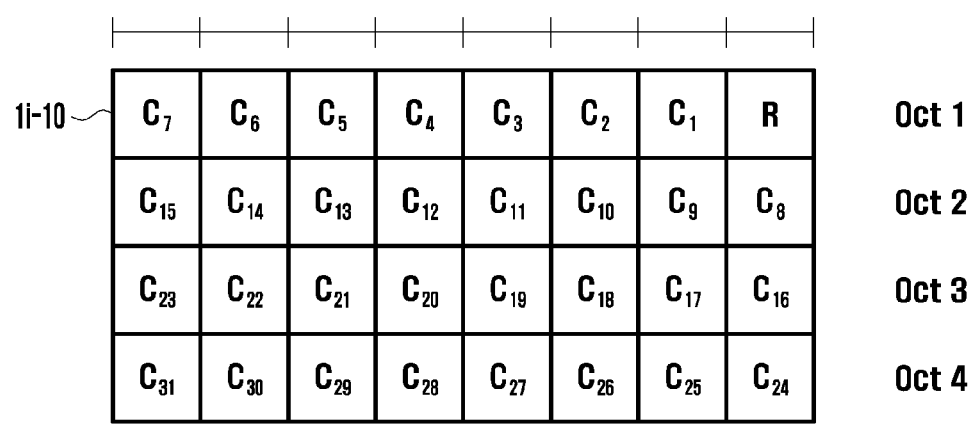

FIG. 1I illustrates MAC control information indicating the state transition to the active state, the dormant state, or the inactive state proposed by the disclosure.

Active and inactive MAC CEs proposed by the disclosure are merely an embodiment, may have the format illustrated in FIG. 1I, and may be divided into a MAC CE format 1*i*-05 having the size of 1 byte supporting 7 Scells and a MAC CE format 1*i*-10 having the size of 4 bytes supporting 31 Scells. Further, the MAC CEs have the following characteristics.

In the case in which a dormant MAC CE is not received and only active and inactive MAC CEs are received, the UE operates as described below.

Each field of the active and inactive MAC CEs indicates a corresponding Scell identifier, and a value corresponding to each field may indicate whether the Scell is activated or deactivated. If a value of the indicator for the Scell indicated by the Scell indicator is 1, the Scell is activated only when the state of the Scell is the inactive state. However, if the state of the Scell is a state other than the inactive state, the indicator value may be ignored.

If a value of an indicator for the Scell indicated by the Scell indicator is 0, the Scell may be deactivated. That is, if the value of the indicator for the Scell is 0, the Scell may be deactivated regardless of the state of the Scell.

The active and inactive MAC CEs proposed by the disclosure are merely an embodiment, and may have the format illustrated in FIG. 1I, and may be divided into a MAC CE format 1*i*-05 having the size of 1 byte supporting 7 Scells and a MAC CE format 1*i*-10 having the size of 4 bytes supporting 31 Scells. Further, the MAC CEs have the following characteristics.

In the case in which the active and inactive MAC CEs are not received and only the dormant MAC CE is received, the UE operates as described below.

Each field of the dormant MAC CE indicates a corresponding Scell identifier, and a value corresponding to each field may indicate whether the Scell is activated or deactivated.

If a value of an indicator for the Scell indicated by the Scell indicator is 1, the Scell may be made to hibernate. That is, the Scell may be made to hibernate if the value of the indicator for the Scell is 1 regardless of the state of the Scell.

If a value of the indicator for the Scell indicated by the Scell indicator is 0, the Scell may be activated only when the state of the Scell is the dormant state. However, if the state of the Scell is a state other than the dormant state, the indicator value may be ignored.

In the case in which the active and inactive MAC CEs and the dormant MAC CE are received by one MAC layer device, the UE operation is as described below.

Each field of the active and inactive MAC CEs and the dormant MAC CE indicates a corresponding Scell identifier, and a combination of values corresponding to the fields may indicate state transition of the Scell to the active, dormant, or inactive state.

The active and inactive MAC CEs and the dormant MAC CE may be received by one MAC layer device along with MAC CEs having the size of 1 byte or MAC CEs having the size of 4 bytes. If two types of MAC CEs are received together, the state transition of each Scell indicated by the MAC CE may be determined according to a combination of indication values of the MAC CEs as shown in the following table. However, the following table is only an embodiment of the disclosure.

| Hibernation MAC control element $C_i$ | Activation/Deactivation MAC control element $C_i$ | SCell shall be |
|---|---|---|
| 0 | 0 | Deactivated |
| 0 | 1 | Activated |
| 1 | 0 | Reserved MAC control element combination |
| 1 | 1 | Dormant |

Figure 1J:
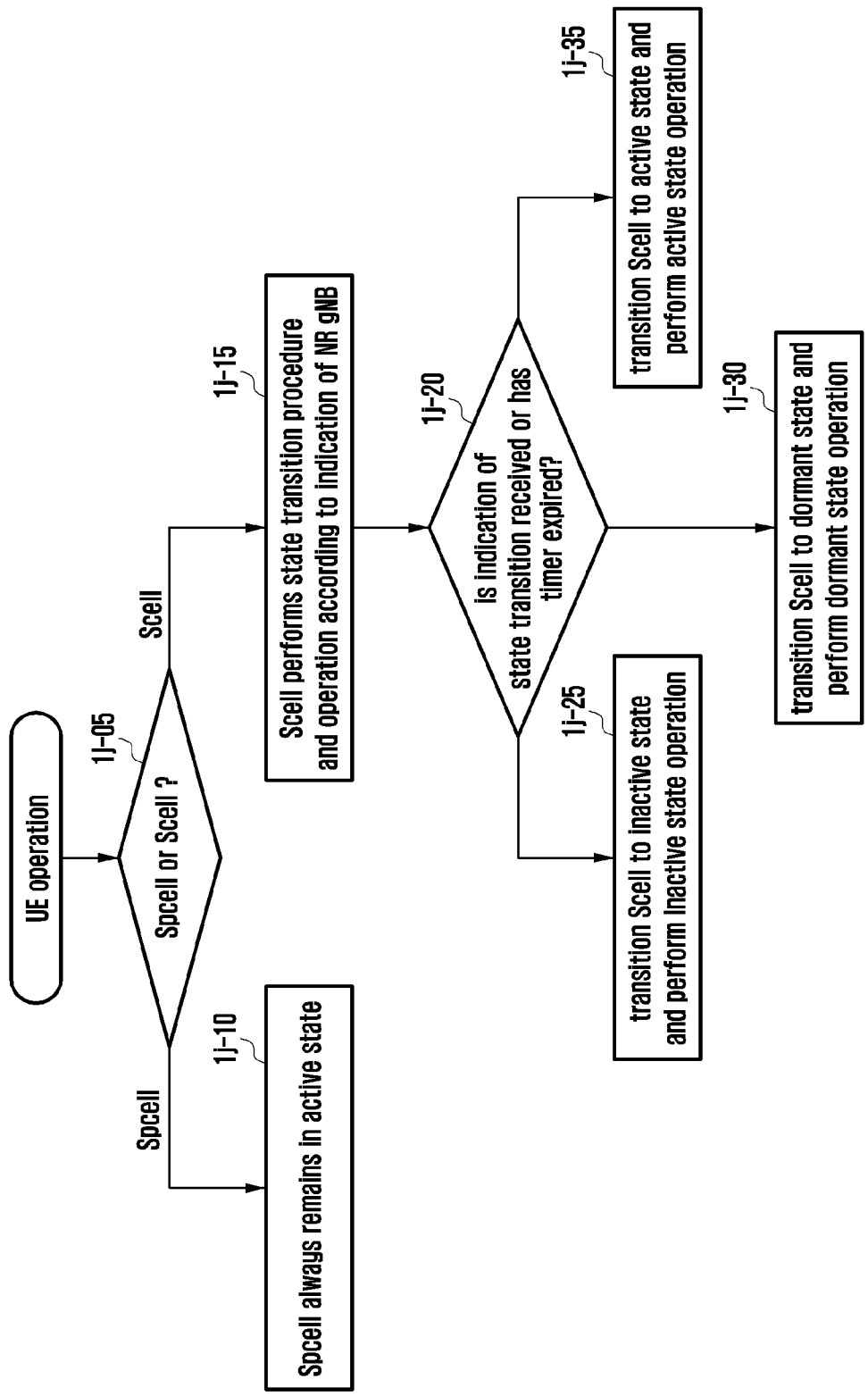
FIG. 1J illustrates a UE operation for performing state transition for a cell configured in the UE according to the disclosure.

FIG. 1J illustrates a UE operation for transitioning the state of a cell configured in the LIE according to the disclosure.

In FIG. 1J, the NR gNB may configure a plurality of Scells together with an Spcell (Pcell or Pscell) in the UE.

If the configured cell is the Spcell in step 1*j*-05, the UE may always maintain the Spcell in the active state with an indication of the NR gNB in step 1*j*-10. If the configured cell is the Scell in step 1*j*-05, the UE may transition the state according to the indication of the NR gNB or expiration of a timer configured in the cell. For example, if the NR gNB indicates the state transition of the Scell through an RRC message or a MAC CE or if a timer configured by the NK gNB expires and thus a state transition operation of the Scell is triggered, the UE may transition the state of the Scell to the active state, the dormant state, or the inactive state and perform operations suitable for the respective states proposed by the disclosure in steps 1*j*-25, 1*j*-30, and 1*j*-35. Since a detailed description thereof is the same as that made above, the detailed description will be omitted.

Figure 1K:
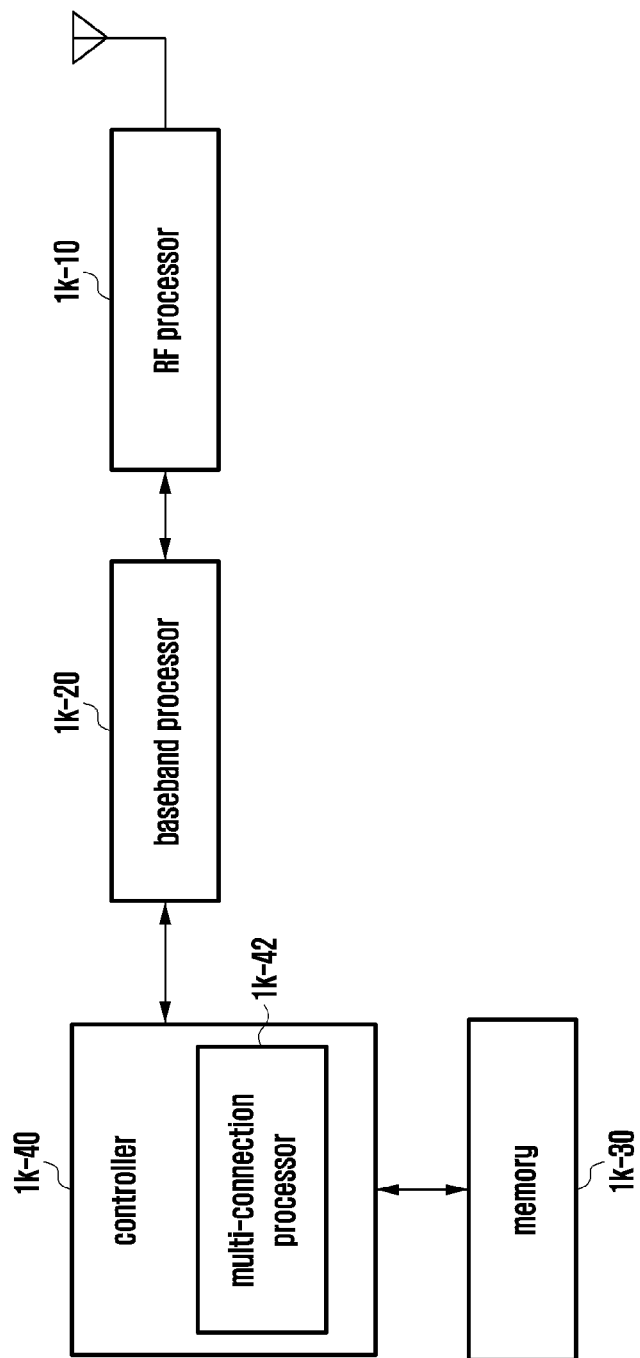
FIG. 1K illustrates the structure of a UE to which an embodiment of the disclosure can be applied.

FIG. 1K illustrates the structure of the UE to which an embodiment of the disclosure can be applied.

Referring to FIG. 1K, the UE may include a radio-frequency (RE) processor 1*k*-10, a baseband processor 1*k*-20, a memory 1*k*-30, and a controller 1*k*-40.

The RF processor 1*k*-10 performs a function for transmitting and receiving a signal through a radio channel, such as band conversion and amplification of a signal. That is, the RF processor 1*k*-10 up-converts a baseband signal provided from the baseband processor 1*k*-20 into an RF band signal, transmits the RF band signal through an antenna, and then down-converts the RF band signal received through the antenna into a baseband signal. For example, the RF processor 1*k*-10 may include a transmission filter, a reception filter, an amplifier, a mixer, an oscillator, a digital-to-analog convertor (DAC), an analog-to-digital convertor (ADC), and the like. Although FIG. 1K illustrates only one antenna, the UE may include a plurality of antennas. The RF processor 1*k*-10 may include a plurality of RF chains. Further, the RF processor 1*k*-10 may perform beamforming. For the beamforming, the RF processor 1*k*-10 may control the phase and size of each signal transmitted/received through a plurality of antennas or antenna elements. Further, the RF processor may perform MIMO and may receive a plurality of layers during the MIMO operation. The RF processor 1*k*-10 may perform reception beam sweeping by appropriately configuring a plurality of antennas or antenna elements according to the control of the controller, or may adjust a reception beam direction and a beam width to make the reception beam correspond to a transmission beam.

The baseband processor 1*k*-20 performs a function for conversion between a baseband signal and a bitstream according to a physical layer standard of the system. For example, in data transmission, the baseband processor 1*k*-20 generates complex symbols by encoding and modulating a transmission bitstream. Further, in data reception, the baseband processor 1*k*-20 reconstructs a reception bitstream by demodulating and decoding a baseband signal provided from the RF processor 1*k*-10. For example, in an orthogonal frequency-division multiplexing (OFDM) scheme, when data is transmitted, the baseband processor 1*k*-20 generates complex symbols by encoding and modulating a transmission bitstream, mapping the complex symbols to subcarriers, and then configures OFDM symbols through an IFFT (inverse fast Fourier transform) operation and a CP (cyclic prefix) insertion. Further, in data reception, the baseband processor 1*k*-20 divides the baseband signal provided from the RF processor 1*k*-10 in units of OFDM symbols, reconstructs the signals mapped to the subcarriers through a fast Fourier transform (FFT) operation, and then reconstructs a reception bitstream through demodulation and decoding.

The baseband processor 1*k*-20 and the RF processor 1*k*-10 may transmit and receive signals as described above. Accordingly, each of the baseband processor 1*k*-20 and the RF processor 1*k*-10 may be referred to as a transmitter, a receiver, a transceiver, or a communication unit. Further, at least one of the baseband processor 1*k*-20 and the RF processor 1*k*-10 may include a plurality of communication modules for supporting a plurality of different radio-access technologies. At least one of the baseband processor 1*k*-20 and the RF processor 1*k*-10 may include different communication modules for processing signals in different bands. For example, the different radio-access technologies may include an LTE network and an NR network. Further, the different frequency bands may include a super-high frequency (SHF) (for example, 2.5 GHz and 5 GHz) band and a millimeter (mm)-wave (for example, 60-GHz) band.

The memory 1*k*-30 stores data such as a basic program for the operation of the UE, an application, and configuration information. The memory 1*k*-30 provides stored data according to a request from the controller 1*k*-40.

The controller 1*k*-40 controls the overall operation of the UE. For example, the controller 1*k*-40 transmits and receives a signal through the baseband processor 1*k*-20 and the RF processor 1*k*-10. The controller 1*k*-40 records data in the memory 1*k*-40 and reads the data. To this end, the controller 1*k*-40 may include at least one processor. For example, the controller 1*k*-40 may include a CP (communications processor) that performs control for communication, and an AP (application processor) that controls higher layers such as an application layer.

Figure 1L:
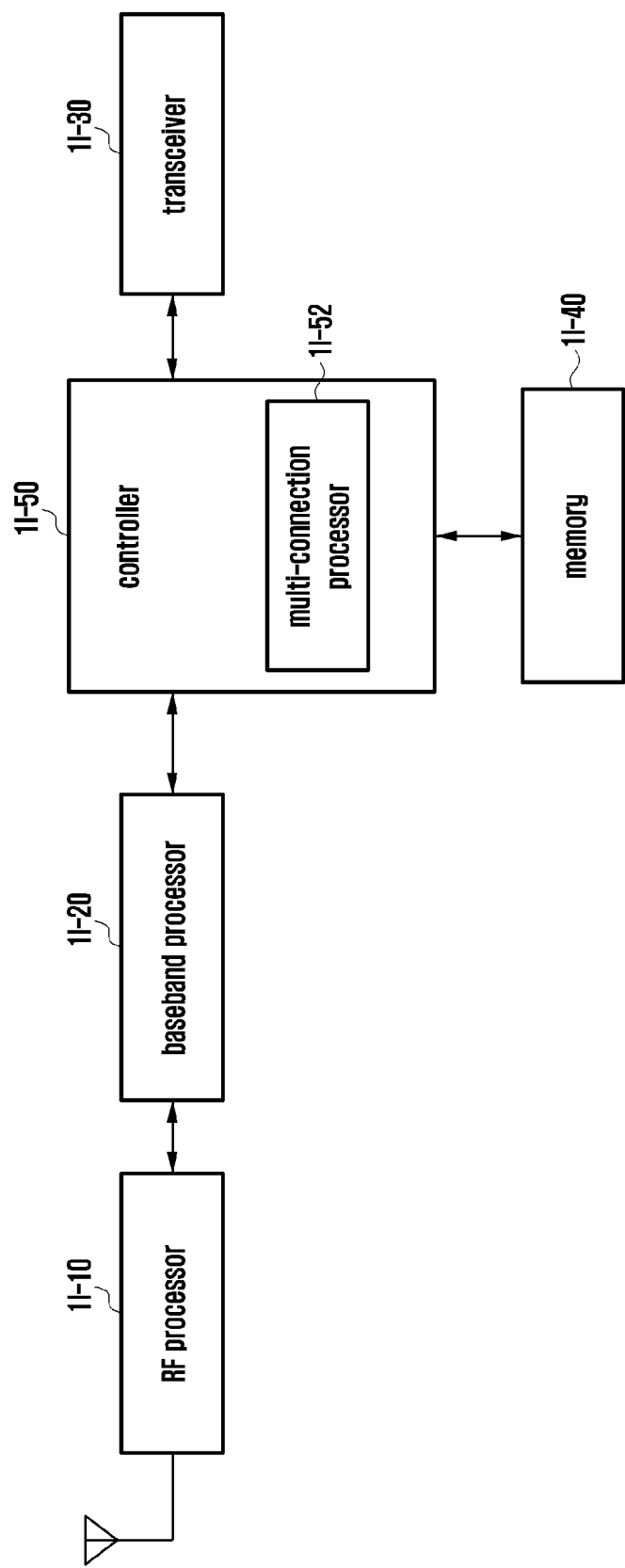
FIG. 1L illustrates a block diagram of a TRP in a wireless communication system to which an embodiment of the disclosure can be applied.

FIG. 1L illustrates a block diagram of a TRP in a wireless communication system to which an embodiment of the disclosure can be applied.

As illustrated in FIG. 1L, the NR gNB includes an RF processor 1*l*-10, a baseband processor 1*l*-20, a backhaul communication unit 1*l*-30, a memory 1*l*-40, and a controller 1*l*-50.

The RF processor 1*l*-10 performs a function for transmitting and receiving a signal through a radio channel, such as band conversion and amplification of a signal. That is, the RF processor 1*l*-10 up-converts a baseband signal provided from the baseband processor 1*l*-20 into an RF band signal and then transmits the converted signal through an antenna, and down-converts an RF band signal received through the antenna into a baseband signal. For example, the RF processor 1*l*-10 may include a transmission filter, a reception filter, an amplifier, a mixer, an oscillator, a DAC, and an ADC. Although FIG. 1L illustrates only one antenna, the first access node may include a plurality of antennas. The RF processor 1*l*-10 may include a plurality of RF chains. Further, the RF processor 1*l*-10 may perform beamforming. For the beamforming, the RF processor 1*l*-10 may control the phase and size of each of the signals transmitted and received through a plurality of antennas or antenna elements. The RF processor may perform a downlink MIMO operation by transmitting one or more layers.

The baseband processor 1*l*-20 performs a function of performing conversion between a baseband signal and a bitstream according to a physical-layer standard of the first radio-access technology. For example, in data transmission, the baseband processor 1*l*-20 generates complex symbols by encoding and modulating a transmission bitstream. Further, in data reception, the baseband processor 1*l*-20 reconstructs a reception bitstream by demodulating and decoding a baseband signal provided from the RF processor 1*l*-10. For example, in an OFDM scheme, when data is transmitted, the baseband processor 1*l*-20 may generate complex symbols by encoding and modulating the transmission bitstream, map the complex symbols to subcarriers, and then configure OFDM symbols through an IFFT operation and CP insertion. In addition, in data reception, the baseband processor 1*l*-20 divides a baseband signal provided from the RF processor 1*l*-10 in units of OFDM symbols, recovers signals mapped with sub-carriers through an FFT operation, and then recovers a reception bit string through demodulation and decoding. The baseband processor 1*l*-20 and the RF processor 1*l*-10 may transmit and receive signals as described above. Accordingly, the baseband processor 1*l*-20 or the RF processor 1*l*-10 may be referred to as a transmitter, a receiver, a transceiver, a communication unit, or a wireless communication unit.

The communication unit 1*l*-30 provides an interface for communicating with other nodes within the network.

The memory 1*l*-40 stores data such as a basic program for the operation of the MeNB, an application, and configuration information. Particularly, the memory 1*l*-40 may store information on a bearer allocated to the accessed LIE and a measurement result reported from the accessed UE. Further, the memory 1*l*-40 may store information that is a reference for determining whether to provide multiple connections to the UE or stopping the connections. The memory 1*l*-40 provides stored data according to a request from the controller 1*l*-50.

The controller 1*l*-50 controls the overall operation of the MeNB. For example, the controller 1*l*-50 transmits and receives a signal through the baseband processor 1*l*-20 and the RF processor 1*l*-10 or through the backhaul communication unit 1*l*-30. Further, the controller 1*l*-50 records data in the memory 1*l*-40 and reads the data. To this end, the controller 1*l*-50 may include at least one processor.

Figure 2A:
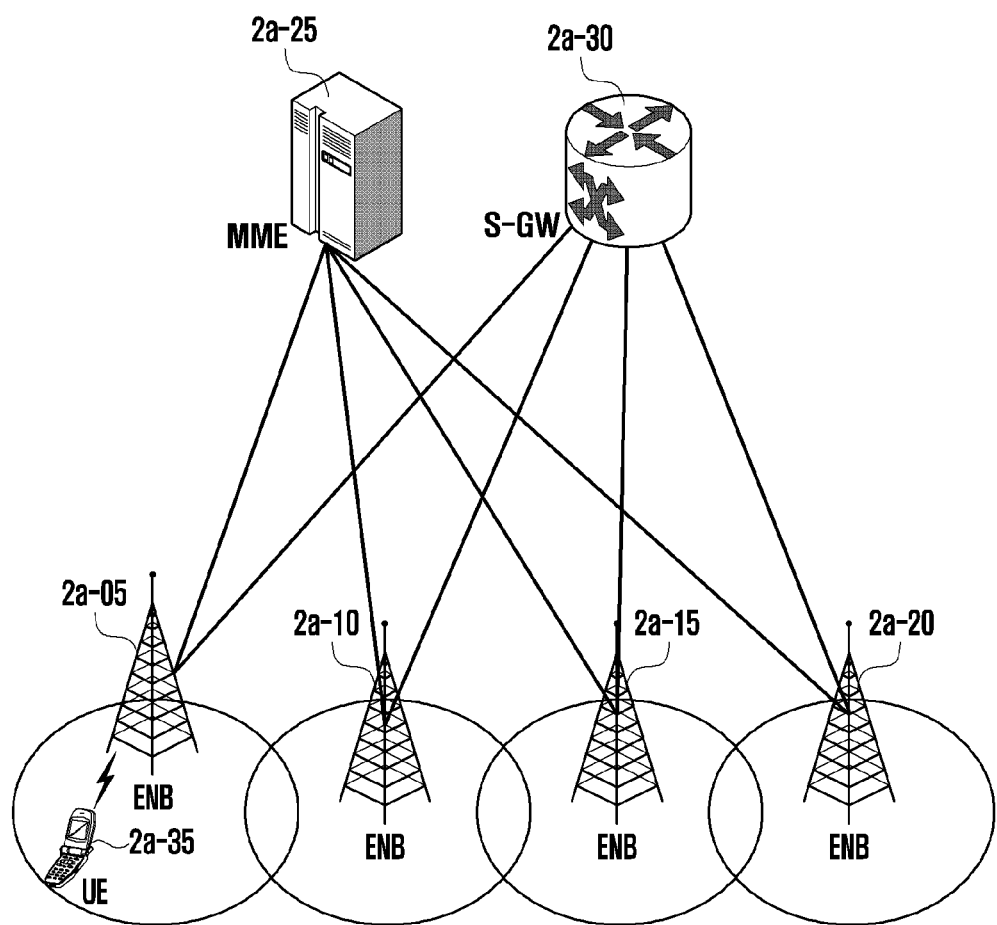
FIG. 2A illustrates a structure of an LTE system to which the disclosure can be applied.

FIG. 2A illustrates the structure of an LTE system to which the disclosure can be applied.

Referring to FIG. 2A, a radio access network of the LTE system includes next-generation base stations (hereinafter, referred to as evolved node Bs (ENBs), Node Bs, or base stations) 2*a*-05, 2*a*-10, 2*a*-15, and 2*a*-20, a mobility management entity (MME) 2*a*-25, and a serving gateway (S-GW) 2*a*-30. A user terminal (user equipment) (hereinafter, referred to as a UE or a terminal) 2*a*-35 accesses an external network through the ENBs 2*a*-20 to 2*a*-20 and the S-GW 2*a*-30.

In FIG. 2A, the ENBs 2*a*-05 to 2*a*-20 may correspond to the existing node Bs of the UMTS system. The ENB is connected to the UE 2*a*-35 through a radio channel, and performs a more complicated role than that of a conventional node B. In the LTE system, since all user traffic including a real-time service such as voice over IP (VoIP) via an Internet protocol are served through a shared channel, an apparatus for collecting and scheduling status information on buffer statuses of UEs, available transmission power status, and channel statuses is required, and the ENBs 2a-05 to 2a-20 may serve as this apparatus.

In general, one ENB may control a plurality of cells. For example, in order to implement a transmission rate of 100 Mbps, the LTE system may use orthogonal frequency-division multiplexing (OFDM) as a wireless access technology in a bandwidth of 20 MHz. Further, an adaptive modulation and coding (AMC) scheme of determining a modulation scheme and a channel-coding rate may be applied depending on the channel status of the UE.

The S-GW 2a-30 is a device for providing a data bearer, and generates or removes the data bearer under the control of the MMF 2a-25. The MME is a device for performing not only a function of managing the mobility of the UE but also various control functions, and may be connected to a plurality of ENBs.

Figure 2B:
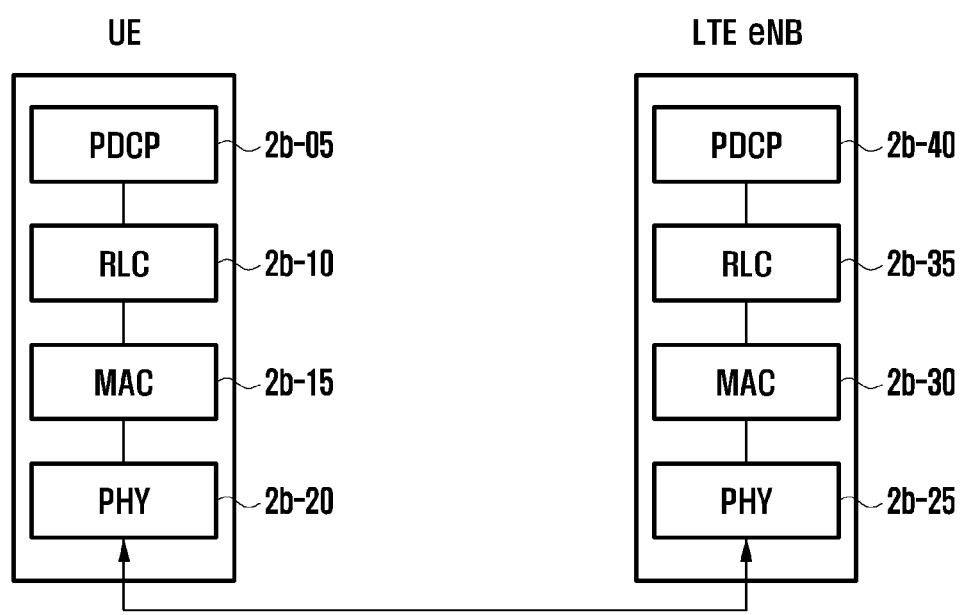
FIG. 2B illustrates the structure of a wireless protocol in the LTE system to which the disclosure can be applied.

FIG. 2B illustrates the structure of a wireless protocol in the LTE system to which the disclosure can be applied.

Referring to FIG. 2B, the UE and the ENB include packet data convergence protocols (PDCPs) 2b-05 and 2h-40, radio link controls (RLCs) 2b-10 and 2b-35, and medium access controls (MACS) 2b-15 and 2b-30, respectively, in the wireless protocol of the LTE system. The packet data convergence protocols (PDCPs) 2b-05 and 2b-40 perform an operation of compressing/reconstructing an IP header. The main functions of the PDCP are described below.

Header compression and decompression function (header compression and decompression: ROHC only)
    User data transmission function (transfer of user data)
    Sequential delivery function (in-sequence delivery of upper-layer PDUs at PDCP reestablishment procedure for RLC AM)
    Sequence rearrangement function (for split bearers in DC (only support for RLC AM): PDCP PDU routing for transmission and PDCP PDU reordering for reception)
    Duplicate detection function (duplicate detection of lower-layer SDUs at PDCP reestablishment procedure for RLC AM)
    Retransmission function (retransmission of PDCP SDUs at handover and, for split bearers in DC, of PDCP PDUs at PDCP data recovery procedure, for RLC AM)
    Ciphering and deciphering function (ciphering and deciphering)
    Timer-based SDU removal function (timer-based SDU discard in uplink)

Radio link controls (RLCs) 2b-10 and 2b-35 reconfigure a PDCP packet data unit (PDU) to be the appropriate size and perform an automatic repeat request (ARQ) operation. The main functions of the RLC are described below.

Data transmission function (transfer of upper-layer PDUs)
    ARQ function (error Correction through ARQ (only for AM data transfer))
    Concatenation, segmentation, and reassembly function (concatenation, segmentation and reassembly of RLC SDUs (only for UM and AM data transfer))
    Re-segmentation function (re-segmentation of RLC data PDUs (only for AM data transfer))
    Reordering function (reordering of RLC data PDUs (only for UM and AM data transfer))
    Duplication detection function (duplicate detection for UM and AM data transfer))
    Error detection function (protocol error detection (only for AM data transfer))
    RLC SDU deletion function (RLC SDU discard (only for UM and AM data transfer))
    RLC reestablishment function (RLC reestablishment)

The MACs 2b-15 and 2b-30 are connected with various RLC layer devices included in one UE, and perform operations of multiplexing RLC PDUs to the MAC PDU and demultiplexing the RLC PDUs from the MAC PDU. The main functions of the MAC are described below.

Mapping function (mapping between logical channels and transport channels)
    Multiplexing and demultiplexing function (multiplexing/demultiplexing of MAC SDUs belonging to one or multiple different logical channels into/from transport blocks (TB) delivered to/from the physical layer on transport channels)
    Scheduling information report function (scheduling information reporting)
    HARQ function (error correction through HARQ)
    Logical channel priority control function (priority handling between logical channels of one UE)
    UE priority control function (priority handling between UEs by means of dynamic scheduling)
    MBMS service identification function (MBMS service identification)
    Transport format selection function (transport format selection)
    Padding function (padding)

The PHY layers 2b-20 and 2b-25 perform an operation for channel-coding and modulating higher-layer data to generate an OFDM symbol and transmitting the OFDM symbol through a radio channel or demodulating and channel-decoding the OFDM symbol received through a radio channel and transmitting the demodulated and channel-decoded OFDM symbol to a higher layer.

Figure 2C:
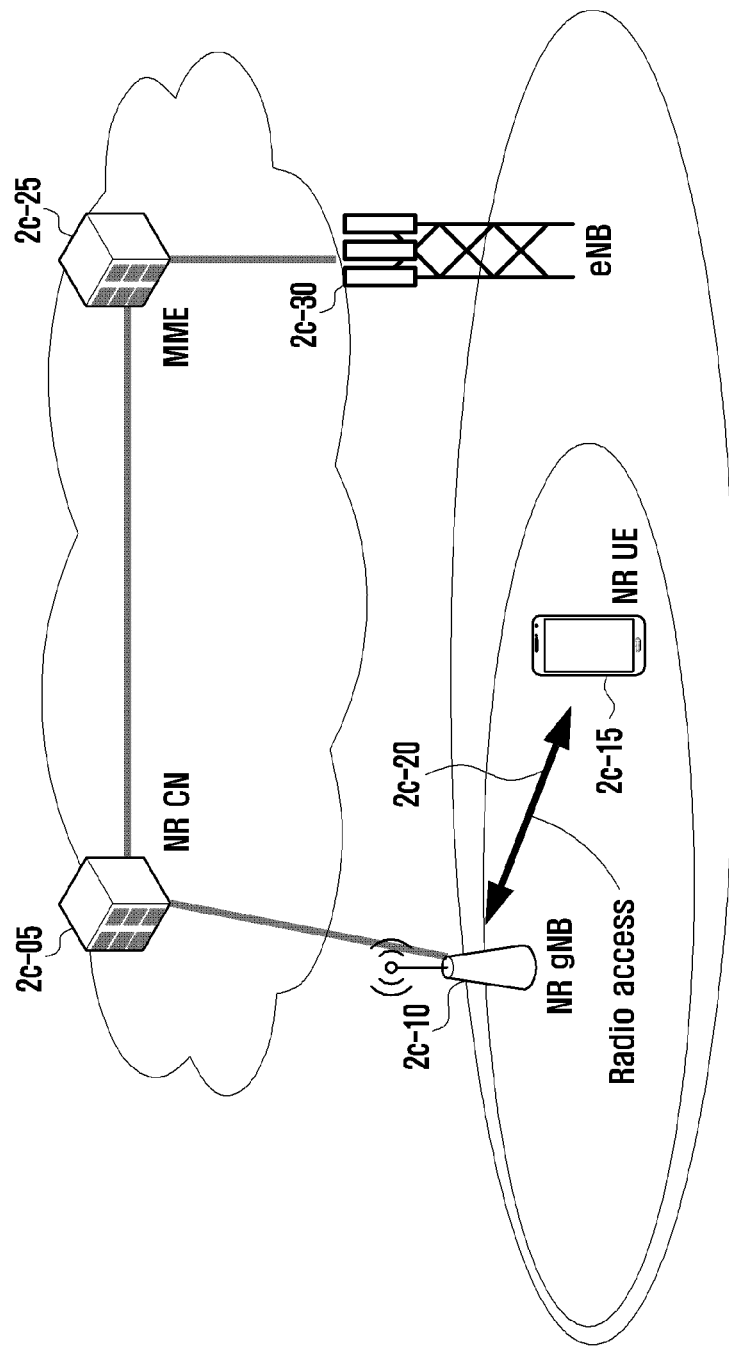
FIG. 2C illustrates the structure of a next-generation mobile communication system to which the disclosure can be applied.

FIG. 2C illustrates the structure of a next-generation mobile communication system to which the disclosure can be applied.

Referring to FIG. 2C, a radio access network of a next-generation mobile communication system (hereinafter, NR or 5G) includes a next-generation base station 2c-10 (hereinafter, referred to as a new-radio node B, an NR gNB, or an NR base station) and a new-radio core network (NR CN) 2c-05. A user terminal 2c-15 (new radio user equipment) (hereinafter, referred to as a NR UE or a UE) accesses an external network through the NR gNB 2c-10 and the NR CN 2c-05.

In FIG. 2C, the NR gNB 2c-10 corresponds to an evolved Node B (eNB) of a conventional LTE system. The NR gNB may be connected to an NR UE 2c-15 through a radio channel and may provide better service than a conventional node B. Since all user traffic is served through a shared channel in the next-generation mobile communication system, a device for collecting and scheduling status information of buffer statuses, available transmission power statuses, and channel statuses of UEs is required, and corresponds to the NR gNB 2c-10. One NR gNB generally controls a plurality of cells. The NR gNB may have a bandwidth wider than the conventional maximum bandwidth in order to implement super-high-speed data transmission compared to conventional LTE, may apply orthogonal frequency-division multiplexing (OFDM) through radio-access technology, and may further apply beamforming technology.

Further, an adaptive modulation and coding (AMC) scheme of determining a modulation scheme and a channel-coding rate is applied depending on the channel status of the NR UE. The NR CN 2c-05 performs a function of supporting mobility, configuring a bearer, and configuring a QoS. The NR CN is a device for performing a function of managing the mobility of the NR UE and various control functions, and is connected to a plurality of NR gNBs. Further, the next-generation mobile communication system may be linked to the conventional LTE system, and the NR CN is connected to an MME 2c-25 through a network interface. The MME is connected to an eNB 1c-30, which is a conventional base station.

Figure 2D:
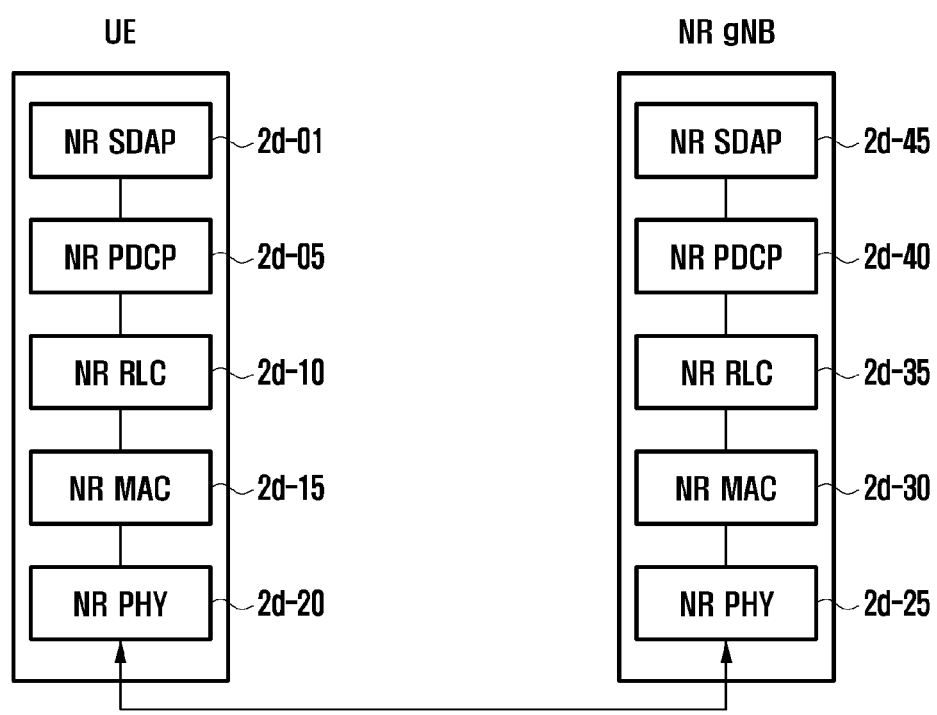
FIG. 2D illustrates a wireless protocol structure of a next-generation mobile communication system to which the disclosure can be applied.

FIG. 2D illustrates a wireless protocol structure of a next-generation mobile communication system to which the disclosure can be applied.

Referring to FIG. 2D, the wireless protocol of the next-generation mobile communication system includes NR SDAPs 2d-01 and 2d-45, NR PDCPs 2d-05 and 2d-40, NR RLCs 2d-10 and 2d-35, and NR MACs 2d-15 and 2d-30 in the UE and the NR gNB.

The main functions of the NR SDAPs 2d-01 and 2d-45 may include some of the following functions.

User data transmission function (transfer of user-plane data)
 Function of mapping QoS flow and a data bearer for uplink and downlink (mapping between a QoS flow and a DRB for both DL and UL)
 Function of marking a QoS flow ID for uplink and downlink (marking QoS flow ID in both DL and UL packets)
 Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

The main functions of the NR PDCPs 2d-05 and 2d-40 may include some of the following functions.

Header compression and decompression function (header compression and decompression: ROHC only)
 User data transmission function (transfer of user data)
 Sequential delivery function (in-sequence delivery of upper-layer PDUs)
 Non-sequential delivery function (out-of-sequence delivery of upper-layer PDUs)
 Reordering function (PDCP PDU reordering for reception)
 Duplicate detection function (duplicate detection of lower-layer SDUs)
 Retransmission function (retransmission of PDCP SDUs)
 Ciphering and deciphering function (ciphering and deciphering)
 Timer-based SDU removal function (timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

The main functions of the NR RLC 2d-10 or 2d-35 may include some of the following functions.

Data transmission function (transfer of upper-layer PDUs)
 Sequential delivery function (in-sequence delivery of upper-layer PDUs)
 Non-sequential delivery function (out-of-sequence delivery of upper-layer PDUs)
 ARQ function (error correction through ARQ)
 Concatenation, segmentation, and reassembly function (concatenation, segmentation and reassembly of RLC SDUs)
 Re-segmentation function (re-segmentation of RLC data PDUs)
 Reordering function (reordering of RLC data PDUs)
 Duplicate detection function (duplicate detection)
 Error detection function (protocol error detection)
 RLC SDU deletion function (RLC SDU discard)
 RLC reestablishment function (RLC reestablishment)

The sequential delivery function (in-sequence delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs 2d-15 and 2d-30 may be connected to a plurality of NR RLC layer devices configured in one UE, and the main functions of the NR MACs may include some of the following functions.

Mapping function (mapping between logical channels and transport channels)

Multiplexing and demultiplexing function (multiplexing/demultiplexing of MAC SDUs)

Scheduling information report function (scheduling information reporting)

HARQ function (error correction through HARQ)

Logical channel priority control function (priority handling between logical channels of one UE)

UE priority control function (priority handling between UEs by means of dynamic scheduling)

MBMS service identification function (MBMS service identification)

Transport format selection function (transport format selection)

Padding function (padding)

The NR PHY layers 2d-20 and 2d-25 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

The disclosure proposes a method of rapidly activating carrier aggregation and saving a UE battery in the next-generation mobile communication system.

The network or the base station may configure a Spcell (Pcell and PScell) and a plurality of Scells in the UE. The Spcell refers to a Pcell when the UE communicates with one base station, and refers to a Pcell of a master base station or a PScell of a secondary base station when the UE communicates with two base stations (the master base station and the secondary base station).

The Pcell and the Pscell are primary cells used by each MAC layer device for communication between the UE and the base station, and correspond to cells for synchronizing timing, performing random access, transmitting HARQ ACK/NACK feedback through PUCCH transmission resources, and exchanging most control signals. A technology in which the NR gNB operates a plurality of Scells as well as the Spcell to increase uplink or downlink transmission resources is referred to as carrier aggregation.

Upon receiving the configuration of the Spcell and the plurality of Scells, the UE may receive a configuration of a mode for each Scell. The mode of the Scell may include an active mode and a deactivated mode.

In the active mode, the UE may transmit and receive uplink or downlink data to and from the NR gNB in the active-mode Scell (or an activated BWP of the Scell). Further, the UE may monitor a PDCCH to identify an indication of the NR gNB, measure a channel for the downlink of the active-mode Scell (or the activated BWP of the Scell), periodically report measurement information to the NR gNB, and periodically transmit a pilot signal (sounding reference signal: SRS) to the NR gNB to allow the NR gNB to measure an uplink channel.

However, in the inactive mode, the UE may not transmit or receive data to or from the NR gNB in the Scell, may not monitor a PDCCH to identify an indication of the NR may not measure a channel, may not report measurement, and may not transmit a pilot signal.

Accordingly, in order to activate Scells in the inactive mode, the NR gNB first configures measurement configuration information in the UE through an RRC message, and the UE measures a cell or a frequency on the basis of the measurement configuration information. After receiving the cell or frequency measurement report of the UE, the NR gNB may activate the deactivated Scells on the basis of the frequency/channel measurement information. Accordingly, much latency is generated when the NR gNB activates carrier aggregation for the UE.

The disclosure proposes a dormant mode for the Scell (or BWP) to reduce latency and save a UE battery.

In the dormant mode, the UE may not transmit or receive data to or from the NR gNB in the dormant Scell or the dormant BWP, may not monitor a PDCCH to identify an indication of the NR gNB, and may not a pilot signal. However, the UE in the dormant mode may measure a channel and report a measurement result for the measured frequency/cell/channel periodically or when an event is generated according to the configuration of the NR gNB. Accordingly, the UE neither monitors the PDCCH nor transmits the pilot signal in the dormant Scell or the dormant BWP, thereby saving the battery compared to the active mode. Unlike the inactive mode, the channel measurement report is transmitted, and thus the NR gNB may use carrier aggregation by rapidly activating the dormant Scell or the dormant BWP on the basis of the measurement report.

Since a frequency of a notably high band can be used in the next-generation mobile communication system, a frequency bandwidth may also be very wide. However, in UE implementation, completely supporting the very wide bandwidth requires high implementation complexity, which incurs high costs. Accordingly, the next-generation mobile communication system may introduce the concept of a bandwidth part (BWP), and thus a plurality of BWPs may be configured in one cell (Spcell or Scell) and the UE and the NR gNB may transmit and receive data in one or a plurality of BWPs according to a configuration of the NR gNB.

When the dormant mode proposed by the disclosure is introduced, the disclosure proposes a state transition method and a detailed operation thereof in consideration of an Scell and a plurality of BWPs configured in the Scell. Further, the disclosure proposes each of a method of managing the dormant mode in units of Scells (Scell-level) and transitioning the state and a method of managing the dormant mode in units of bandwidth parts (BWP-level) and transitioning the state, and proposes a detailed operation of the bandwidth part according to each mode (active, inactive, or dormant).

In addition, one or a plurality of BWPs may be configured as the active or dormant state in one cell (Spcell, Pcell, Pscell, or Scell) in the disclosure. That is, it is possible to increase a data transmission rate through a method similar to carrier aggregation by transitioning a plurality of BWPs to the active state for one cell. The UE may measure a channel for a plurality of BWPs by transitioning the plurality of BWPs in one cell to the dormant state and report a channel measurement result. Further, it is possible to save the UE battery by transitioning a plurality of BWPs in one cell to the inactive state.

An indication of the state transition of a plurality of BWPs for each cell may be configured through an RRC message, a MAC CE, or downlink control information (DCI) of a PDCCH.

In the disclosure, the BWP may be used without distinction between the uplink and the downlink, and the meaning thereof may be each of an uplink BWP and a downlink BWP according to the context.

Figure 2E:
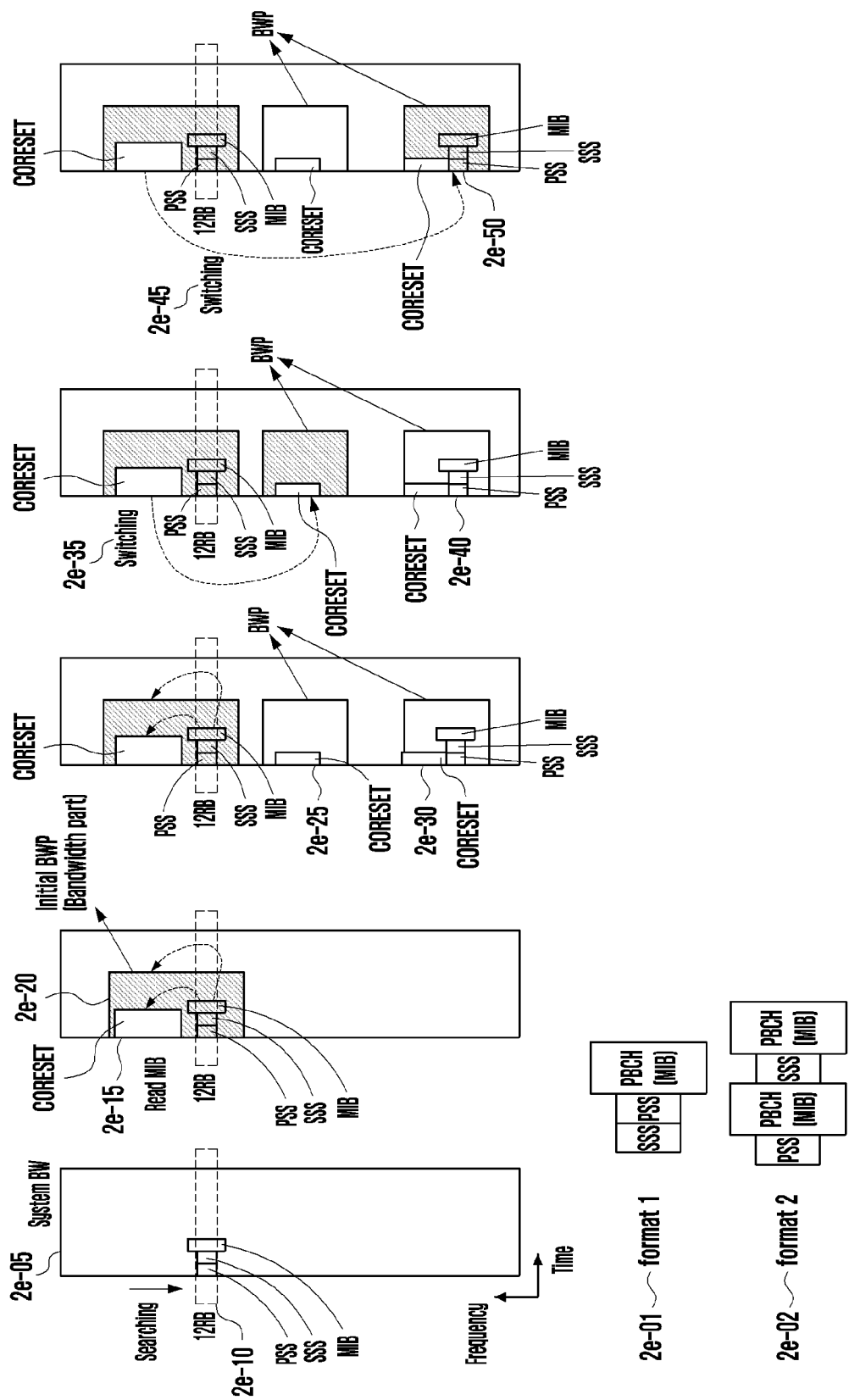
FIG. 2E illustrates a procedure of serving the UE by efficiently using a frequency bandwidth in the next-generation mobile communication system according to the disclosure.

FIG. 2E illustrates a procedure of serving the UE by efficiently using a frequency bandwidth in the next-generation mobile communication system according to the disclosure.

In FIG. 2E, a method of providing a service to UEs having different capabilities or categories by efficiently using a frequency bandwidth and saving a battery in the next-generation mobile communication system is described.

One cell to which the NR gNB provides a service may serve a very wide frequency band 2e-05. However, in order to provide service to UEs having different capabilities, the wide frequency bandwidth may be divided into a plurality of BWPs to manage one cell.

First, the UE, when power thereof is initially turned on, may search the entire frequency band provided by a service provider (PLMN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks, as indicated by reference numeral 2e-10.

If the UE searches for the PSS/SSS 2e-01 or 2e-02 in units of resource blocks and then detects the signals, the UE may read the signals, analyze (decode) the signals, and identify a boundary between a subframe and a radio transmission resource frame (radio frame). Accordingly, the UE may identify subframes in units of 1 ms and synchronize a downlink signal with the NR gNB. The resource block (RB) is the size of a predetermined frequency resource and a predetermined time resource, and may be defined as a two-dimensional unit. For example, time resources may be defined in units of 1 ms, and frequency resources may be defined as 12 subcarriers (1 carrier×15 kHz=180 kHz).

If the UE completes synchronization, the UE may identify information on a control resource set (CORESET) by checking a master system information block (MIB) or minimum system information (MSI) and identify initial access bandwidth part (BWP) information as indicated by reference numerals 2e-15 and 2e-20.

CORESET information refers to the location of time/frequency transmission resources through which a control signal is transmitted from the NR gNB, and may be, for example, the location of resources through which a PDCCH channel is transmitted. That is, the CORESET information is information indicating resources through which first system information (system information block 1: SIB 1) is transmitted and indicates frequency/time resources through which a PDCCH is transmitted.

The UE may identify information on an initial BWP by reading the first system information. As described above, if the UE completes synchronization of the downlink signal with the NR gNB and is able to receive a control signal, the UE may perform a random-access procedure in an initial BWP of a cell on which the UE camps, make a request for configuring an RRC connection, receive an RRC message, and make an RRC connection configuration.

In the RRC connection configuration, a plurality of BWPs may be configured in every cell (Pcell, Pscell, Spcell, or Scell). A plurality of BWPs may be configured for the downlink within one cell, and separately, a plurality of BWPs may be configured for the uplink.

The plurality of BWPs may be indicated and configured by BWP identifiers to be used as an initial BWP, a default BWP, or a first active BWP.

The initial BWP may be used as a cell-specific BWP, one of which exists per cell, and may be used as a BWP in which the UE initially accessing the cell may configure the connection in the cell through a random-access procedure or the UE configuring the connection may perform synchronization.

The NR gNB may configure an initial downlink BWP to be used in downlink and an initial uplink BWP to be used in uplink for each cell.

Configuration information of the initial BWP may be broadcasted through first system information (system information 1: SIB 1) indicated by the CORESET, and may be configured again in the UE to which the NR gNB is connected through an RRC message.

The initial BWP may be used in the state of being designated with BWP identifier number 0 in each of the uplink and the downlink. That is, all UEs accessing the same cell may equally designate the same initial BWP to BWP identifier number 0. This confers an advantage of easily performing a contention-based random-access procedure because the NR gNB can transmit a random-access response (RAR) message in the initial BWP which all UEs can read during the random-access procedure.

The first active BWP may be configured to be UE specific and may be designated and indicated by a BWP identifier among a plurality of BWPs. The first active BWP may be configured for each of the downlink and the uplink, and a first active downlink BWP and a first active uplink BWP may be configured using respective BWP identifiers.

When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving an indication indicating activation of the Scell or the BWP from the inactive state to the active state through an RRC message, MAC control information, or DCI, the UE may perform the operation of switching the downlink BWP of the Scell to the downlink BWP indicated or configured by the RRC message (e.g., the first active downlink BWP) to activate the downlink BWP and switching the uplink BWP to the uplink BWP indicated or configured by the RRC message (e.g., the first active uplink BWP) to activate the uplink BWP. Further, the UE may perform the operation when receiving an indication indicating transition of the Scell or the BWP to the dormant state through an RRC message, MAC control information, or DCI. This is because the NR gNB can effectively use carrier aggregation by measuring and reporting a frequency/channel for the first active downlink/uplink BWP when a channel measurement report is transmitted in the dormant state since the UE switches the downlink BWP to first active downlink BWP and activates the downlink BWP and switches the uplink BWP to the first active uplink BWP and activates the uplink BWP when the Scell or the BWP is activated.

The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP among a plurality of downlink BWPs after a predetermined time.

For example, a BWP inactivity timer may be configured for each cell or each BWP through an RRC message, and the timer may start or restart when data transmission/reception is generated in an activated BWP rather than the default BWP, or may start or restart when the active BWP is switched to another BWP.

If the timer expires, the UE may perform fallback or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP used only for the downlink is to make it easy to perform NR gNB scheduling, because the NR gNB allows the UE to receive an indication of the NR gNB (for example, DCI of a PDCCH) by falling back to the default BWP for each cell after a predetermined time. For example, if the NR gNB configures the default BWP of the UEs accessing one cell as the initial BWP, the NR gNB may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase freedom of implementation of the Nr gNB, the default BWP may be defined and configured for the uplink and thus used, like the default BWP of the downlink.<

Figure 2F:
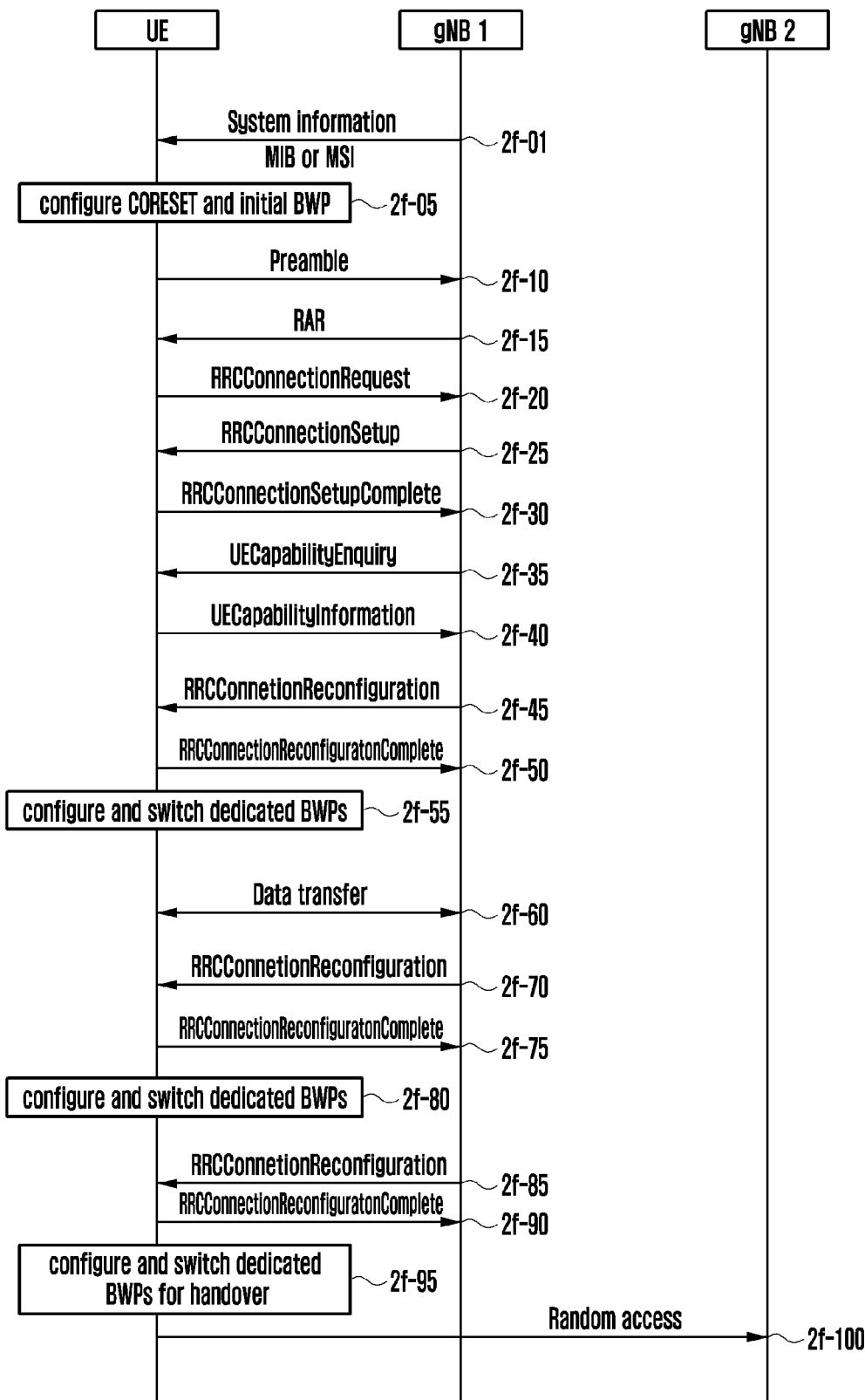
FIG. 2F illustrates a procedure in which a UE switches from an RRC-idle mode to an RRC-connected mode in a next-generation mobile communication system, which is a method of configuring a plurality of bandwidth parts (BWPs) and configuring a default IMP or a first active BWP.

FIG. 2F illustrates a procedure in which the UE switches from an RRC-idle mode to an RRC-connected mode in the next-generation mobile communication system, which is a method of configuring a plurality of BWPs and configuring a default BWP or a first active BWP.

One cell to which the gNB provides service may serve a very wide frequency band. First, the UE may search the entire frequency band provided by a service provider (PLAN) in units of predetermined resource blocks (for example, in units of 12 resource blocks (RBs)). That is, the UE may start discovering a primary synchronization sequence (PSS)/secondary synchronization sequence (SSS) in the entire system bandwidth in units of resource blocks.

If the UE searches for the PSS/SSS in units of resource blocks and then detects the signals, the UE may read the signals, analyze (decode) the signals, and identify a boundary between a subframe and a radio transmission resource frame (radio frame). If the UE completes synchronization, the UE may read system information of a cell on which the UE currently camps. That is, the UE may identify information on a control resource set (CORESET) by checking a master system information block (MIB) or minimum system information (MSI) and identify initial access bandwidth part (BWP) information by reading system information in steps 2*f*-01 and 2*f*-05. CORESET information refers to the location of time/frequency transmission resources through which a control signal is transmitted from the NR gNB, and may be, for example, the location of resources through which a PDCCH channel is transmitted.

As described above, if the UE completes synchronization of the downlink signal with the NR gNB and is able to receive a control signal, the UE may perform a random-access procedure in the initial BWP, receive a random-access response, make a request for configuring an RRC connection, receive an RRC message, and configure the RRC connection in steps 2*f*-10, 2*f*-15, 2*f*-20, 2*f*-25, and 2*f*-30.

When the basic RRC connection is completely configured, the NR gNB may transmit an RRC message which enquires about a UE capability to the UE (UECapability-Enquire) in order to identify the UE capability in 2*f*-35. In another method, the NR gNB may ask (request) the MME or the AMF about the UE capability in order to identify the UE capability. This is because the MME or the AMF may have UE capability information if the UE previously accessed the MME or the AMF. If there is no UE capability required by the NR gNB, the NR gNB may make a request for UE capability to the UE. Alternatively, the NR gNB may store UE capability information, in which case step 2*f*-35 may be omitted The reason why the NR gNB transmits the RRC message to the UE to identify the UE capability is to identify the UE capability, for example, information indicating a frequency band that the UE can read or an area of the frequency band that the UE can read. After identifying the LIE capability, the NR gNB may configure an appropriate BWP in the UE.

If the UE receives the RRC message which enquires about the UE capability, the UE may transmit information containing information indicating the range of bandwidth that the UE supports, indicate an offset from a reference center frequency to indicate a range of bandwidth supported in the current system bandwidth, information directly indicating a start point and an end point of the supported frequency bandwidth, or information indicating a center frequency and a bandwidth in step 2*f*-40.

The BWP may be configured through an RRC Setup message or an RRCResume message of the RRC connection configuration in step 2*f*-25 or an RRCReconfiguration message in step 2*f*-45, the RRC message may include configuration information of a PCell, a Pscell, or a plurality of Scells, and a plurality of BWPs may be configured for each cell (PCell, Pscell, or Scell).

When a plurality of BWPs is configured for each cell, a plurality of BWPs to be used in the downlink of each cell may be configured. In the case of an FDD system, a plurality of BWPs to be used in the uplink of each cell may be configured to be distinguished from downlink BWPs. In the case of a TDD system, a plurality of BWPs to be used in common in the downlink and the uplink of each cell may be configured.

Information for configuring BWPs of each cell (PCell, Pscell, or Scell) may include at least one piece of the following information.

Downlink BWP configuration information of the cell
    Initial downlink BWP configuration information
    A plurality of pieces of BWP configuration information and BWP IDs corresponding to the respective BWPs
    Initial state configuration information of each BWP for a plurality of BWPs (for example, active state, dormant state, or inactive state)
    A BWP ID indicating a first active uplink BWP
    A BWP ID indicating a default BWP
    BWP inactive timer configuration and a timer value
    Uplink BWP configuration information of the cell
    Initial uplink BWP configuration information
    A plurality of pieces of BWP configuration information and BWP IDs corresponding to the respective BWPs
    Initial state configuration information of each BWP for a plurality of BWPs (for example, an active state, dormant state, or inactive state)
    A BWP ID indicating a first active uplink BWP The configured initial BWP, default BWP, or first active BWP may be used for the following purpose, and may be operated so as to suit the purpose.

The initial BWP may be used as a cell-specific BWP, one of which exists per cell, and may be used as a BWP in which the UE initially accessing the cell may configure the connection in the cell through a random-access procedure or in which the UE configuring the connection may perform synchronization.

The NR gNB may configure an initial downlink BWP to be used in downlink and an initial uplink BWP to be used in uplink for each cell.

Configuration information of the initial BWP may be broadcasted through first system information (system information 1: SIB 1) indicated by the CORSET, and may be configured again in the UE which accesses the NR gNB through an RRC message.

The initial BWP may be used while being designated with BWP identifier number 0 in each of the uplink and the downlink. That is, all UEs accessing the same cell may equally designate the same initial BWP to BWP identifier number 0 use the initial BWP. This confers an advantage of easily performing a contention-based random-access procedure because the NR gNB can transmit a random-access response (RAR) message in the initial BWP, which all UEs can read, during the random-access procedure.

The first active BWP may be configured to be UE specific and may be designated and indicated by a BWP identifier among a plurality of BWPs. The first active BWP may be configured for each of the downlink and the uplink, and a first active downlink BWP and a first active uplink BWP may be configured using respective BWP identifiers.

When a plurality of BWPs is configured in one cell, the first active BWP may be used to indicate which BWP is to be activated and used first. For example, when a Pcell or Pscell and a plurality of Scells are configured in the UE and a plurality of BWPs is configured in each Pcell or Pscell or each Scell, if the Pcell, the Pscell, or the Scell is activated, the UE may activate and use a first active BWP among the plurality of BWPs configured in the Pcell, Pscell, or Scell. That is, the first active downlink BWP may be activated and used for the downlink, and the first active uplink BWP may be activated and used for the uplink.

Upon receiving an indication of activation of the Scell or the BWP through an RRC message, MAC control information, or DCI, the UE may perform the operation of switching the downlink BWP of the Scell to the downlink BWP indicated or configured by the RRC message (e.g., the first active downlink BWP) and activating the downlink BWP and switching the uplink BWP to the uplink BWP indicated or configured by the RRC message (e.g., the first active uplink BWP) and activating the uplink BWP. Further, the UE may perform the operation when receiving an indication indicating transition of the Scell or the BWP to the dormant state through an RRC message, MAC control information, or DCI. This is because the NR gNB can effectively use carrier aggregation by measuring and reporting a frequency/channel for the first active downlink/uplink BWP when a channel measurement report is transmitted in the dormant state since the UE switches the downlink BWP to the first active downlink BWP to the activate the downlink BWP and switches the uplink BWP to the first active uplink BWP to activate the uplink BWP when the Scell or the BWP is activated.

The default BWP may be configured to be UE-specific, and may be designated to and indicated by the identifier of a BWP among a plurality of BWPs. The default BWP may be configured only for the downlink. The default BWP may be used as a BWP on which to fall back from the activated BWP, among a plurality of downlink BWPs, after a predetermined time. For example, a BWP inactivity timer may be configured for each cell or each BWP through an RRC message, and the timer may start or restart when data transmission/reception is generated in an activated BWP rather than the default BWP, or may start or restart when the activated BWP is switched to another BWP.

If the timer expires, the UE may fall back or switch the downlink BWP activated in the cell to the default BWP. The switching may be a procedure of deactivating the currently activated BWP and activating the BWP to which to switch, and may be triggered through an RRC message, MAC control information (MAC control element), or L1 signaling (downlink control information (DCI) of a PDCCH). The switching may be triggered through an indication of the BWP to be activated or switched to, and the BWP may be indicated by a BWP identifier (for example, 0, 1, 2, 3, or 4).

The reason why the default BWP is used only for the downlink is to make it easy to perform NR gNB scheduling because the NR gNB allows the UE to receive an indication of the NR gNB (for example, DCI of a PDCCH) by falling back to the default BWP for each cell after a predetermined time. For example, if the NR gNB configures the default BWP of the UEs accessing one cell as the initial BWP, the NR gNB may continuously transmit a scheduling indication only in the initial BWP after a predetermined time. If the default BWP is not configured through the RRC message, the default BWP may fall back to the initial BWP by considering the initial BWP as the default BWP when the BWP inactivity timer expires.

In another method, in order to increase implementation freedom of the Nr gNB, the default BWP may be defined and configured for the uplink and thus used like the default BWP of the downlink.<

In an RRC setup message of the RRC connection configuration, an RRCResume message of step 2f-25, or an RRCReconfiguration message of step 2f-45, the UE may configure a state transition timer to make the UE transition the state by itself even if the UE does not receive an indication from the NR gNB through an RRC message, MAC control information, or DCI of a PDCCH. For example, if a cell deactivation timer (ScellDeactivationTimer) or a BWP deactivation timer (BwpDeactivationTimer) is configured for each Scell or BWP and the cell deactivation timer or the BWP deactivation timer expires, the Scell or the BWP may transition to the inactive state. If a cell hibernation timer (ScellHibernationTimer) or a BWP hibernation timer (BwpHibernationTimer) is configured for each Scell or BWP and the cell hibernation timer or the BWP hibernation timer expires, the Scell or the BWP may transition to the dormant state.

When the cell hibernation timer or the BWP hibernation timer expires, only the Scell or BWP in the active state transitions to the dormant state, but the Scell or BWP in the inactive state or the dormant state does not transition to the dormant state. Further, the Scell or BWP in the dormant state may transition to the inactive state by configuring a dormant-state cell deactivation timer (dormantScellDeactivationTimer) or a dormant-state BWP deactivation timer (dormantBwpDeactivationTimer) for each Scell or BWP.

When the dormant-state cell deactivation timer or the dormant-state BWP deactivation timer expires, only the Scell or BWP in the dormant state transitions to the inactive state, but the Scell or BWP in the active state or the inactive state does not transition to the inactive state. If the cell deactivation timer (ScellDeactivationTimer) (or the BWP deactivation timer) and the cell hibernation timer (ScellHibernationTimer) (or the BWP hibernation timer) are configured together, the cell hibernation timer (ScellHibernationTimer) (or the BWP hibernation timer) is prioritized. That is, if the cell hibernation timer (ScellHibernationTimer) (or the BWP hibernation timer) is configured, the corresponding Scell or the MVP is not deactivated even though the cell deactivation timer (ScellDeactivationTimer) (or the BWP deactivation timer) expires. In other words, if the cell hibernation timer (or the BWP hibernation timer) is configured, the Scell or the BWP first transitions from the active state to the dormant state due to expiration of the cell hibernation timer, and the cell having transitioned to the dormant state transitions to the inactive state due to expiration of the dormant-state cell deactivation timer. Accordingly, if the cell hibernation timer is configured, the cell deactivation timer does not influence the Scell or BWP state transition, and if the cell hibernation timer is configured even though the cell deactivation timer expires, the Scell or BWP does not transition to the inactive state.

If the cell deactivation timer (or the BWP deactivation timer) is not configured in the RRC message, the UE may consider the cell deactivation timer (or the BWP deactivation timer) to be set to an infinite value.

The NR gNB may configure frequency measurement configuration information and/or frequency measurement gap information through the RRC setup message of the RRC connection configuration, the RRCResume message of step 2f-25, or the RRCReconfiguration message of step 2f-45, and the message may include frequency measurement object information.

The frequency measurement object may include information on a BWP in which a reference signal (RS)/synchronization signal (SS) for measurement is configured, and may also include a center frequency, a bandwidth corresponding to a BWP, and a time pattern that should be applied during measurement.

The measurement report gap information may include at least one of a measurement gap length corresponding to the time for which measurement is performed, a measurement gap period, and measurement gap start time information. The RS is a signal of the NR gNB transmitted according to a partial time/frequency pattern in transmission resources of a subframe in which a control signal or a data signal is transmitted, and may be used to determine the strength of a signal of the corresponding BWP or the corresponding cell. The SS is a periodically transmitted synchronization signal such as a PSS or an SSS, and may be used to determine the strength of a signal of the corresponding BWP or the corresponding cell.

As described above, when the RRC connection configuration is completed, the UE may configure a plurality of BWPs according to the indication configured through the RRC message. Further, in order to save a battery, the UE may activate one or a small number of BWPs among the plurality of configured BWPs. For example, the NR gNB may indicate one BWP to be activated.

The NR gNB may indicate activation of a BWP through an RRC message, MAC control information (MAC CE), or L1 signaling (PHY layer control signal such as a PDCCH) (for example, may indicate whether to perform activation or deactivation through bitmap information) to indicate switching from the initial access BWP to a new BWP. Since there are many new accessing users in the initial access BWP, it may be more advantageous for scheduling to allocate a new BWP and separately manage the connected users. This is because the initial access BWP may be shared and used by all UEs in common rather than being configured in a UE-specific manner. Further, the default BWP may be dynamically indicated through the MAC control information, L1 signaling, or system information (in order to reduce signaling overhead).

Hereinafter, the disclosure proposes a dormant state in the next-generation mobile communication system and proposes a method of supporting transition between three states in units of BWPs.

Figure 2G:
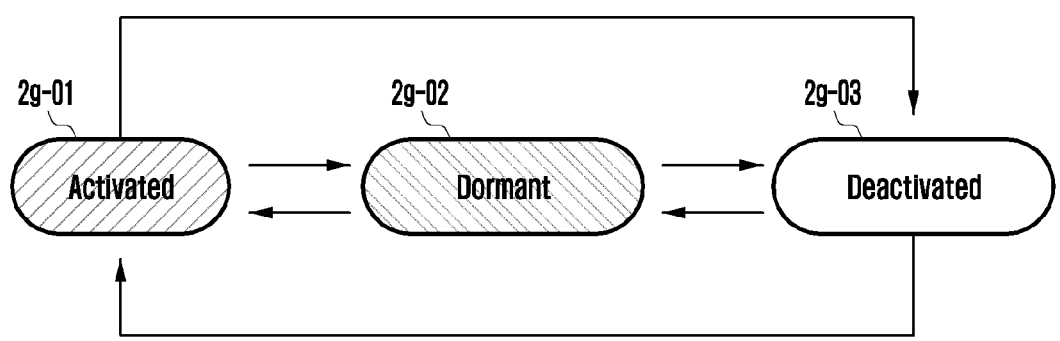
FIG. 2G illustrates a state transition procedure of a cell or a BWP proposed by the disclosure.

FIG. 2G illustrates a state transition procedure of a cell or a BWP proposed by the disclosure.

In FIG. 2G, each cell or BWP of the UE may have an active state 2g-01, an inactive state 2g-03, or a dormant state 2g-02, and may perform state transition due to an indication by configuration information of an RRC message, MAC control information, or DCI of a PDCCH.

A state transition operation (to an active, inactive, or dormant state) of the Scell or the BWP proposed by the disclosure may be performed as follows.

The case in which an Scell state or a BWP is configured through an RRC message

The case in which Scell activation and deactivation MAC CEs are received

The case in which BWP activation, deactivation, and dormant MAC CEs are received The case in which an Scell dormant MAC CE is received The case in which a cell hibernation timer is not configured in an active-state Scell and a configured cell deactivation timer expires The case in which a BWP hibernation timer is not configured in an active-state BWP and a configured BWP deactivation timer expires The case in which a cell hibernation timer configured in an active-state Scell expires The case in which a BWP hibernation timer configured in an active-state BWP expires The case in which a dormant-state-Scell deactivation timer configured in a dormant-state Scell expires The case in which a dormant-state BWP deactivation timer configured in a dormant-state BWP expires Further, the state transition operation proposed by the disclosure may have the following characteristics.

An Spcell (Pcell or Pscell) (or a BWP of the cell) cannot transition to a dormant state and is always in an active state. The Spcell performs synchronization with the UE, is used to transmit and receive a primary control signal, and the connection with the NR gNB is released if the Spcell is dormant or inactive, so the Spcell should always remain in the active state.

If a PUCCH is configured, even an Scell cannot transition to the dormant state The Scell should be in the active state since there may be another cell that should transmit feedback of HARQ ACK/NACK through the PUCCH.

Due to this feature, if a cell deactivation timer (ScellDeactivationTimer) is not applied to the Spcell or to the Scell in which the PUCCH is configured, the cell deactivation timer may operate only for other Scells.

A cell hibernation timer (ScellHibernationTimer) may be prioritized over the cell deactivation timer (ScellDeactivationTimer). If one value is set as a timer value through the RRC message, the same value may be applied to all cells. In another method, the NR gNB may configure different timer values for Scells or BWPs in consideration of the characteristics of each Scell or BWP.

If the Scell is not indicated as being active or dormant through the RRC message, the Scell may basically operate in the inactive state initially.

A first embodiment of the disclosure proposes a first embodiment corresponding to an operation of each cell (Scell) and a BWP according to each state when an active state, an inactive state, or a dormant state proposed by the disclosure is applied in the next-generation mobile communication system using a BWP.

In the first embodiment of the disclosure, the active state, the inactive state, or the dormant state are operated, and the state transition is performed in units of BWPs. When the state transition is performed in units of BWPs, a BWP of which the state transition is indicated performs the state transition according to an indication of the state transition. For example, if the BWP transitions from the active state to the dormant state, the BWP may transition to the dormant state.

Figure 2H:
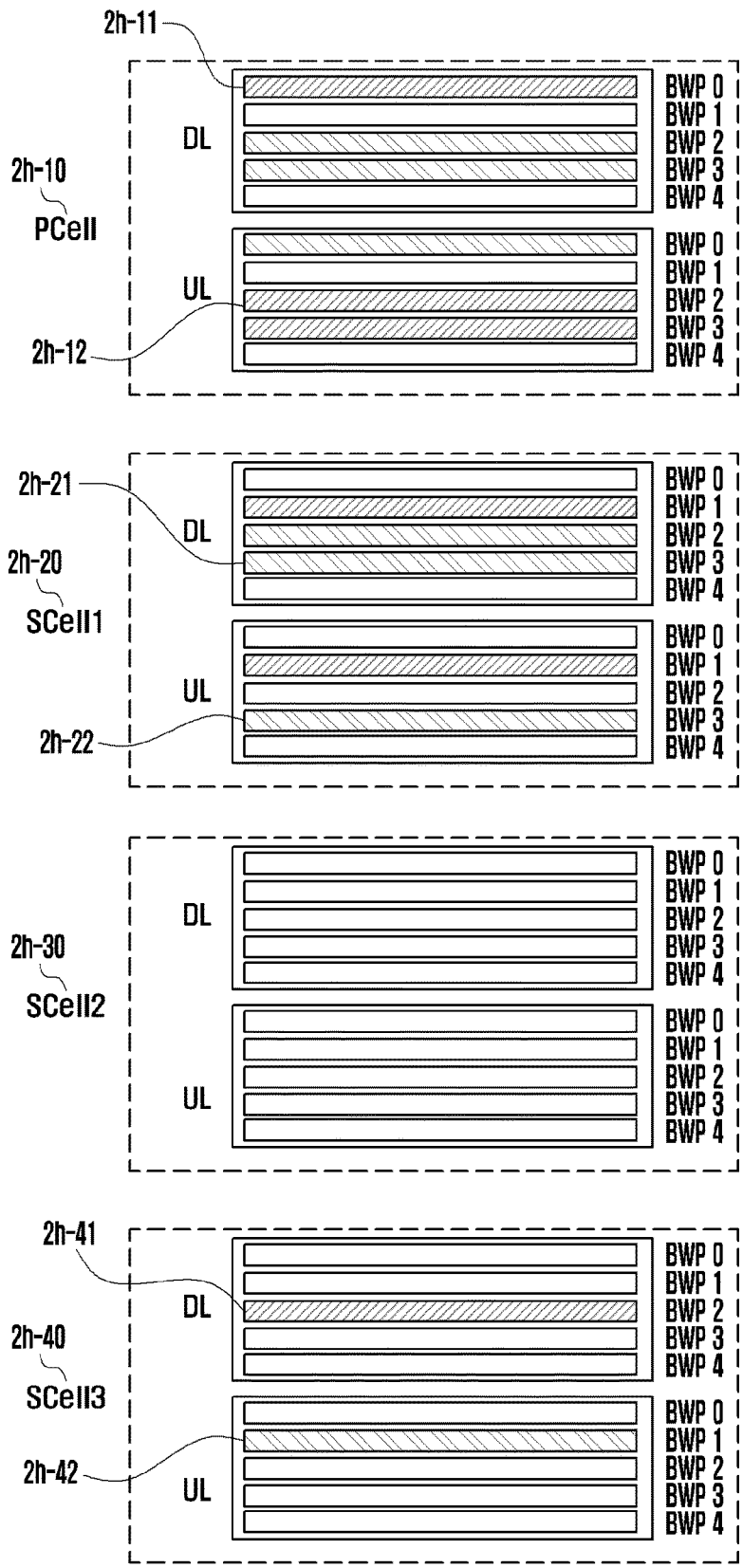
FIG. 2H illustrates a method of transitioning a IMP state through state transition in units of BWPs proposed by the disclosure.

FIG. 2H illustrates a method of transitioning the state of a BWP through state transition in units of BWPs proposed by the disclosure.

In the first embodiment of the disclosure, the active state, the inactive state, or the dormant state are operated as illustrated in FIG. 2H, and the state transition is performed in units of BWPs. When the state transition is performed in units of BWPs, one BWP of a plurality of BWPs belonging to the Scell is indicated, and the BWP performs the state transition.

As illustrated in FIG. 2H, a Pcell 2h-10 may always maintain an active state to prevent the release of a wireless connection between the NR gNB and the UE. In the case of an FDD system, each cell (Pcell or each of Scells) may distinguish frequencies for the downlink and the uplink, and a plurality of BWPs may be configured for each of the downlink and the uplink. In the case of a TDD system, frequencies may not be distinguished between the downlink and the uplink, and a plurality of BWPs may be configured without distinction between the downlink and the uplink.

In the disclosure, a plurality of BWPs may have an active state or a dormant state for each of the downlink and the uplink in each Scell, and the remaining BWPs are in an inactive state. That is, it is possible to increase the amount of transmitted data through carrier aggregation by increasing the amount of transmission resources for transmitting data in a plurality of active BWPs, and to efficiently perform scheduling and reduce UE power by receiving a channel measurement report on a plurality of BWPs using a plurality of dormant BWPs.

For example, as illustrated in FIG. 2H, the NR gNB may configure a first Scell 2h-20, a second Scell 2h-30, and a third Scell 2h-40 in the UE.

If the NR gNB transitions any BWP of the first Scell 2h-20 to the dormant state through an RRC message or a MAC CE, the UE may transition the indicated BWP, among a plurality of BWPs configured in the first Scell, to the dormant state.

If the NR gNB transitions any BWP of the second Scell 2h-30 to the inactive state through an RRC message or a MAC CE, the UE may transition the indicated BWP, among a plurality of BWPs configured in the second Scell, to the inactive state.

If the NR gNB transitions any BWP of the third Scell 2h-40 to the active state through an RRC message or a MAC CE, the UE may transition the indicated BWP, among a plurality of BWPs configured in the third Scell, to the active state.

Hereinafter, the disclosure proposes a state transition operation of a BWP when the NR gNB indicates the state transition in units of BWPs to the UE as described above.

If a (BWP activation) MAC layer device receives a MAC CE an RRC message indicating activation of any BWP, some or all of a plurality of the following operations may be performed.

The BWP is activated.

A sounding reference signal (SRS) is transmitted to allow the NR gNB to measure a channel for the uplink in the activated BWP. For example, the SRS may be periodically transmitted.

The UE may report a channel measurement result (CSI, CQI, PMI, RI, PTI, or CRI) for the downlink in the activated BWP according to the configuration of the NR gNB.

A PDCCH may be monitored to read an indication of the NR gNB in the activated BWP.

A PDCCH may be monitored to read cross scheduling in the activated BWP.

If a PUCCH is configured in the activated BWP, the PUCCH is transmitted.

A BWP deactivation timer may start or restart for the BWP. In another method, the BWP deactivation timer may start or restart only when a BWP hibernation timer is not configured.

If there are suspended type 1 configuration transmission resources, the resources may be initialized according to a type 1 transmission resource configuration, or may be initialized again and used. The type 1 configuration transmission resources are periodic (uplink or downlink) transmission resources pre-allocated through an RRC message, which can be used after being activated through the RRC message.

If a BWP hibernation timer is configured in the BWP, a BWP hibernation timer may start or restart for the BWP, A PHR for the BWP may be triggered.

If a (BWP deactivation) MAC layer device receives a MAC CE indicating deactivation of any BWP or an RRC message indicating deactivation thereof, or if a BWP deactivation timer for the Scell expires and the BWP hibernation timer is not configured (if the BWP hibernation timer is configured, the BWP hibernation timer should be prioritized, and thus expiration of the BWP deactivation timer may be ignored. That is, if the BWP hibernation timer is configured, the BWP state should first transition from the active state to the dormant state and then from the dormant state to the inactive state), the UE may perform some or all of a plurality of the following operations.

A BWP of the Scell may be deactivated.

A BWP deactivation timer configured in the BWP may be stopped.

A BWP deactivation timer configured for the BWP may be stopped.

Periodic downlink transmission resources (DL SPS or configured downlink assignment) or periodic uplink transmission resources (UL SPS or configured uplink grant Type 2) configured in the BPW may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore. The periodic transmission resources may be called type 2 configuration transmission resources.

The periodic transmission resources may be released (cleared) if there are PUSCH transmission resources configured for periodic channel measurement information semi-persistent CSI reporting) for the BWP.

The periodic uplink transmission resources (configured uplink grant Type 1 configured through RRC) configured in the BWP may be suspended. The term "suspend" means that transmission resource configuration information configured through the RRC message is stored in the UE but is not used anymore. The periodic transmission resources may be called type 1 configuration transmission resources.

All HARQ buffers configured for the BWP are emptied.

If a PDCCH indicates that there is downlink data (downlink assignment) any activated BWP or allocates uplink transmission resources, or if a PDCCH indicates that there is downlink data (downlink assignment) for the activated BWP in a serving cell for scheduling any activated BWP or allocates uplink transmission resources (uplink grant), or, for the activated configured BWP, if any MAC PDU is transmitted through pre-configured downlink transmission resources (configured downlink assignment) or pre-configured uplink transmission resources (configured uplink grant), the UE may restart a BWP deactivation timer for the BWP. In another method, the BWP deactivation timer may be restarted only when BWP hibernation is not configured.

If a BWP hibernation timer is configured for the BWP, the BWP hibernation timer may restart.

If the BWP of the Scell is deactivated or is in an inactive state, the UE does not transmit an SRS for the BWP for the SCell.

The UE neither measures (CSI, CQI, PMI, RI, PTI, or CRI) nor reports a channel for the downlink in the BWP of the Scell.

Uplink data is not transmitted through UL-SCH in the BWP of the Scell.

A random-access procedure is not performed for the BWP of the Scell,

The UE does not monitor a PDCCH in the BWP of the Scell.

The UE does not monitor a PDCCH in the BWP of the Scell. For example, in the case of cross scheduling, a PDCCH for the Scell is not monitored in a cell in which the scheduling is performed.

A PUCCH or an SPUCCH is not transmitted in the BWP.

If there is a random-access procedure being performed in the BWP during deactivation of the BWP, the random-access procedure may be canceled.

The dormant state is not applied to an Spcell or an Scell in which a PUCCH is configured.

The MAC layer device may operate two timers to efficiently manage the dormant state of the Scell.

BWP hibernation timer (BWPHibernationTimer): operates in the BWP configured in the UE but does not operate in the Scell in which a PUCCH is configured. If the BWP hibernation timer expires, the MAC layer device may transition the BWP in the active state to the dormant state. That is, the cell hibernation timer may be applied only to an active-state Scell. One value configured through RRC may be equally applied to the cell hibernation timer of each Scell. The cell hibernation timer may be prioritized over the cell deactivation timer. That is, if the cell hibernation timer is configured and is running, the cell hibernation timer does not transition to the inactive state even though the cell deactivation timer is running or expires, and the cell deactivation timer does not influence the Scell.

Dormant-state-BWP deactivation timer (dormantBWPDeactivationTimer): operates in an Scell configured in the UE but does not operate in an Scell in which a PUCCH is configured. If the dormant-state-BWP deactivation timer expires, the MAC layer device may transition the BWP in the dormant state to the inactive state. One value configured through RRC may be equally applied to the dormant-state cell deactivation timer of each BWP. That is, the dormant-state-BWP deactivation timer may be applied only to the BWP in the dormant state.

If the dormant state is indicated through the RRC message when the BWP is configured, the UE may transition the BWP to the dormant state. If the dormant state is indicated in a BWP state configuration of the RRC message even in handover or SCG change, the UE may transition the BWP to the dormant state.

If the MAC layer device receives an indication of the dormant state when the BWP is configured through an RRC message, or receives a MAC CE indicating state transition of the BWP to the dormant state, the UE may perform some or all of a plurality of the following operations.

The BWP of the Scell may transition to the dormant state.

A cell deactivation timer configured or operated in the BWP of the Scell may be stopped.

If a BWP hibernation timer s configured in the BWP of the Scell, the BWP hibernation timer may be stopped.

A dormant-state-BWP deactivation timer may start or restart in the BWP of the Scell.

A BWP deactivation timer configured for the BWP of the Scell may be stopped. This is to prevent an unnecessary BWP-switching procedure in the Scell.

Periodic downlink transmission resources (DL SPS or configured downlink assignment) or periodic uplink transmission resources (UL SPS or configured uplink grant Type 2) configured in the BPW of the Scell may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore. The proposed method, that is, the operation of releasing (clearing) the configured periodic downlink transmission resources (DL SPS or configured downlink assignment) or the configured periodic uplink transmission resources (UL SPS or configured uplink grant) may be performed only when the BWP transitions from the active state to the dormant state. This is because there is no information on periodic transmission resources activated or indicated through L1 signaling when the BWP transitions from the inactive state to the dormant state.

The periodic uplink transmission resources (configured uplink grant Type 1 configured through RRC) configured in the BWP of the Scell may be suspended. The term "suspend" means that transmission resource configuration information configured through the RRC message is stored in the UE but is not used anymore. The proposed method, that is, the operation of suspending the periodic uplink transmission resources (configured uplink grant Type 1), may be performed only when the BWP transitions from the active state to the dormant state. This is because periodic transmission resources are not used when the BWP transitions from the inactive state to the dormant state.

All HARQ buffers configured in the BWP are emptied.

If a BWP hibernation timer expires in the activated BWP of the Scell, the UE may transition the BWP of the Scell to the dormant state.

The UE may stop a BWP deactivation timer configured or operated in the BWP of the Scell.

The UE may stop a BWP hibernation timer configured or operated in the BWP of the Scell.

The UE may start or restart a dormant-state-BWP deactivation timer in the BWP of the Scell.

If the dormant-state-BWP deactivation timer configured in a dormant-state BWP expires, the BWP of the Scell may transition to the inactive state.

The dormant-state-BWP deactivation timer of the BWP of the Scell may be stopped.

If the BWP of the Scell is in the dormant state, the UE does not transmit an SRS for the BWP for the SCell.

The UE measures a channel (CSI, CQI, PMI, RI, PTI, or CRI) for the downlink in the BWP of the Scell according to the configuration of the NR gNB and reports the measurement. For example, the UE may periodically report the channel or frequency measurement.

Uplink data is not transmitted through UL-SCH in the BWP of the Scell.

A random-access procedure is not performed for the BWP of the Scell.

The UE does not monitor a PDCCH in the BWP of the Scell.

The UE does not monitor a PDCCH in the BWP of the Scell. For example, in the case of cross scheduling, a PDCCH for the Scell is not monitored in a cell in which the scheduling is performed.

A PUCCH or an SPUCCH is not transmitted in the BWP of the Scell.

A downlink BWP may be made to hibernate, and a channel measurement result may be reported. Further, an uplink BWP of the Scell may be deactivated and not used. This is because the channel is measured only for the downlink BWP in the dormant-state Scell and the measurement result is reported to the uplink BWP of the Spcell (Pcell or Pscell) or the Scell in which there is a PUCCH.

A downlink (DL) BWP and an uplink (UL) BWP of the Scell are made to hibernate or switch to the downlink BWP indicated or configured by the RRC message (e.g., a first active downlink BWP (indicated by a firstActiveDownlinkBWP-Id)) and the uplink BWP indicated or configured by the RRC message (e.g., a first active uplink BWP (indicated by a firstActiveUplinkBWP-id)) since the transition of the BWP of the Scell to the dormant state is indicated. This is because the first active uplink/downlink BWP configured through the RRC message is activated when an inactive-state or dormant-state BWP transitions to the active state, and thus it is efficient to transmit a channel measurement report of the dormant state in the first active uplink/downlink BWP.

In another method, during the transition to the dormant state, only the downlink BWP may be switched and made to hibernate to the downlink BWP indicated or configured by the RRC message (e.g., the first active downlink BWP). This is because the uplink BWP is also switched and activated to the first active uplink BWP when the BWP is activated. If the active-state BWP is originally the first active downlink or uplink BWP in the BWP before the indication of the dormant state, the BWP may be made to hibernate without the switching operation.

Periodic downlink transmission resources (DL SPS or configured downlink assignment) or periodic uplink transmission resources (UL SPS or configured uplink grant Type 2) configured in the BPW of the Scell may be released (cleared).

The term "release (clear)" means that configuration information such as periodicity information configured through the RRC message is stored in the UE but information on periodic transmission resources activated or indicated through L1 signaling (for example, DCI) is removed (cleared or released) and is not used anymore.

The proposed method, that is, the operation of releasing (clearing) the configured periodic downlink transmission resources (DL SPS or configured downlink assignment) or the configured periodic uplink transmission resources (UL SPS or configured uplink grant), may be performed only when the BWP transitions from the active state to the dormant state. This is because there is no information on periodic transmission resources activated or indicated through L1 signaling when the BWP transitions from the inactive state to the dormant state.

The periodic uplink transmission resources (configured uplink grant Type 1 configured through RRC) configured in the BWP of the Scell may be suspended. The term "suspend" means that transmission resource configuration information configured through the RRC message is stored in the UE but is not used anymore.

The proposed method, that is, the operation of suspending the periodic uplink transmission resources (configured uplink grant Type 1), may be performed only when the BWP transitions from the active state to the dormant state. This is because periodic transmission resources are not used when the BWP transitions from the inactive state to the dormant state.

If there is a random-access procedure being performed during transition of the BWP to the dormant state, the random-access procedure may be canceled.

Hereinafter, the disclosure proposes state transition MAC control information (MAC control element: MAC CE) indicating the active state, the dormant state, or the inactive state of each BWP.

FIG. 2I illustrates MAC control information indicating the state transition to the active state, the dormant state, or the inactive state proposed by the disclosure.

The active and inactive MAC CEs proposed by the disclosure may have the format illustrated in FIG. 2I in an embodiment, and may be divided into a MAC CE format 2$i$-05 supporting 7 Scells, a MAC CE format 2$i$-10 supporting 31 Scells, or one Scell. Further, the MAC CEs may have the following characteristics.

In the MAC CE format 2$i$-05 or 2$i$-10, a group of bits indicating each cell may be defined, the group may be defined as a field Ci, and an indicator i of the field Ci may indicate a cell identifier. The field Ci corresponding to each Scell may include an identifier indicating the uplink or the downlink, a BWP identifier, and an indicator indicating the state of the BWP (active state, dormant state, or inactive state). Accordingly, in the MAC CE format, a specific cell may be indicated, the downlink or the uplink of the indicated cell may be indicated, a BWP of the indicated downlink or uplink of the indicated cell may be indicated, and state transition of the BWP of the indicated downlink or uplink of the indicated cell may be indicated.

The MAC CE format 2*i*-15 may include an identifier corresponding to one cell, an indicator indicating the uplink or the downlink, a BWP identifier, and an indicator indicating the state of the BWP (active state, dormant state, or inactive state). Accordingly, in the MAC CE format, a specific cell may be indicated, the downlink or the uplink of the indicated cell may be indicated, a BWP of the indicated downlink or uplink of the indicated cell may be indicated, and state transition of the BWP of the indicated downlink or uplink of the indicated cell may be indicated.

Various MAC CE formats based on the proposed characteristics may be expanded to an embodiment, and the characteristics proposed by the disclosure correspond to an indication of state transition of a downlink or uplink BWP of each cell through the MAC CE and switching of a downlink or uplink BWP of each cell through the MAC CE.

Figure 2J:
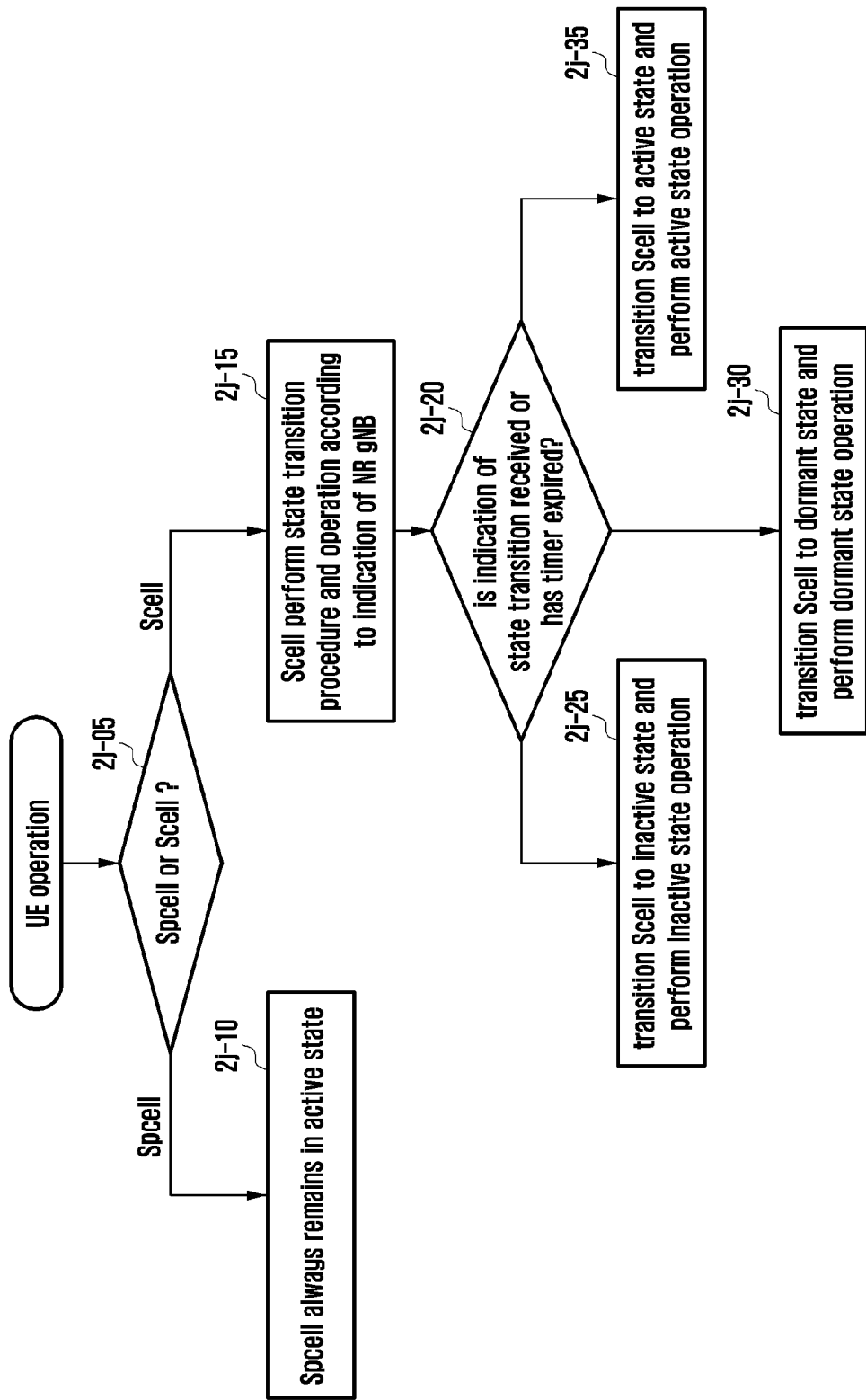
FIG. 2J illustrates a UE operation for performing state transition for a cell configured in the UE according to the disclosure.

FIG. 2J illustrates a UE operation for transitioning a state of a cell configured in the UE according to the disclosure.

In FIG. 2J, the NR gNB may configure a plurality of Scells together with an Spcell (Pcell or Pscell) in the UE.

If the configured cell is the Spcell in step 2*j*-05, the UE may always maintain the Spcell in the active state with an indication of the NR gNB in step 2*j*-10. If the configured cell is the Scell in step 2*j*-05, the UE may transition the state according to the indication of the NR gNB or expiration of a timer configured in the cell. For example, if the NR gNB indicates the state transition of the Scell through an RRC message or a MAC CE or if a timer configured by the NR gNB expires and thus a state transition operation of the BWP of the Scell is triggered, the UE may transition the state of the BWP of the Scell to the active state, the dormant state, or the inactive state and perform operations suitable for the respective states of the BWP proposed by the disclosure in steps 2*j*-25, 2*j*-30, and 2*j*-35. Since a detailed description is the same as that made above, the detailed description will be omitted.

Figure 2K:
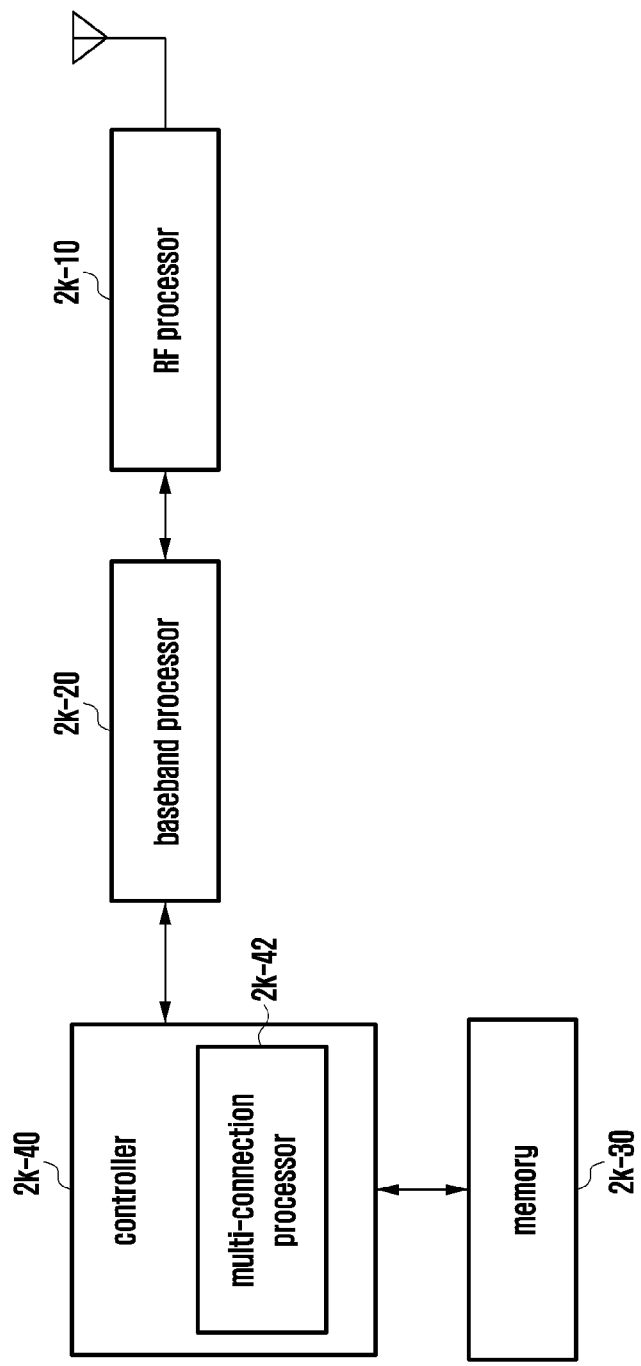
FIG. 2K illustrates the structure of a UE to which an embodiment of the disclosure can be applied.

FIG. 2K illustrates a structure of a UE to which an embodiment of the disclosure can be applied.

Referring to FIG. 2K, the UE may include a radio-frequency (RE) processor 2*k*-10, a baseband processor 2*k*-20, a memory 2*k*-30, and a controller 2*k*-40.

The RF processor 2*k*-10 performs a function for transmitting and receiving a signal through a radio channel, such as band conversion and amplification of a signal. That is, the RF processor 2*k*-10 up-converts a baseband signal provided from the baseband processor 2*k*-20 into an RF band signal, transmits the RF band signal through an antenna, and then down-converts the RF band signal received through the antenna into a baseband signal. For example, the RF processor 2*k*-10 may include a transmission filter, a reception filter, an amplifier, a mixer, an oscillator, a digital-to-analog convertor (DAC), an analog-to-digital convertor (ADC), and the like. Although FIG. 2K illustrates only one antenna, the UE may include a plurality of antennas. Further, the RF processor 2*k*-10 may include a plurality of RF chains. Moreover, the RE processor 2*k*-10 may perform beamforming. For the beamforming, the RF processor 2*k*-10 may control the phase and size of each signal transmitted/received through a plurality of antennas or antenna elements. The RF processor may perform MIMO and receive a plurality of layers when performing the MIMO operation. The RF processor 2*k*-10 may perform reception beam sweeping by appropriately configuring a plurality of antennas or antenna elements according to the control of the controller, or may control the direction of the reception beam and a beam width so that the reception beam and the transmission beam work together.

The baseband processor 2*k*-20 performs a function for conversion between a baseband signal and a bitstream according to a physical-layer standard of the system. For example, in data transmission, the baseband processor 2*k*-20 generates complex symbols by encoding and modulating a transmission bitstream. Further, in data reception, the baseband processor 2*k*-20 reconstructs a reception bitstream by demodulating and decoding a baseband signal provided from the RF processor 2*k*-10. For example, in an orthogonal frequency-division multiplexing (OFDM) scheme, when data is transmitted, the baseband processor 2*k*-20 generates complex symbols by encoding and modulating a transmission bitstream, maps the complex symbols to subcarriers, and then configures OFDM symbols through an inverse fast Fourier transform (IFFT) operation and a cyclic prefix (CP) insertion. Further, in data reception, the baseband processor 2*k*-20 divides the baseband signal provided from the RF processor 2*k*-10 in units of OFDM symbols, reconstructs the signals mapped to the subcarriers through a fast Fourier transform (FFT) operation, and then reconstructs a reception bitstream through demodulation and decoding.

The baseband processor 2*k*-20 and the RF processor 2*k*-10 transmit and receive a signal as described above. Accordingly, each of the baseband processor 2*k*-20 and the RF processor 2*k*-10 may be referred to as a transmitter, a receiver, a transceiver, or a communication unit. Further, at least one of the baseband processor 2*k*-20 and the RF processor 2*k*-10 may include a plurality of communication modules for supporting a plurality of different radio-access technologies. In addition, at least one of the baseband processor 2*k*-20 and the RF processor 2*k*-10 may include different communication modules for supporting signals in different frequency bands. For example, the different radio-access technologies may include an LTE network and an NR network. Further, the different frequency bands may include a super-high-frequency (SHF) (for example, 2.5 GHz and 5 GHz) band and a millimeter (mm)-wave (for example, 60-GHz) band.

The memory 2*k*-30 stores data such as a basic program, an application, and setting information for the operation of the UE. The memory 2*k*-30 provides the stored data according to a request from the controller 2*k*-40.

The controller 2*k*-40 controls the overall operation of the UE. For example, the controller 2*k*-40 transmits and receives a signal through the baseband processor 2*k*-20 and the RF processor 2*k*-10. Further, the controller 2*k*-40 records data in the memory 2*k*-30 and reads the data. To this end, the controller 2*k*-40 may include at least one processor. For example, the controller 2*k*-40 may include a communications processor (CP) that performs control for communication and an application processor (AP) that controls a higher layer such as an application layer.

Figure 2L:
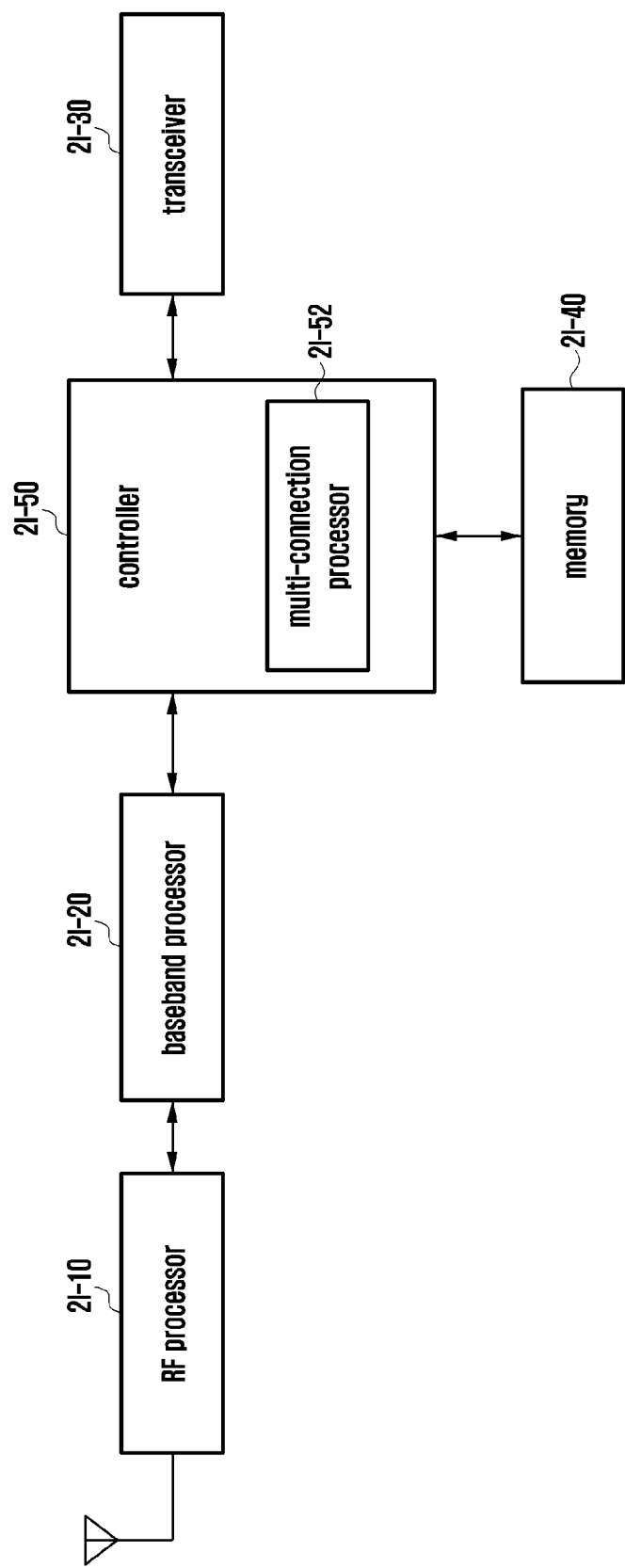
FIG. 2L illustrates a block diagram of a TRP in a wireless communication system to which an embodiment of the disclosure can be applied.

FIG. 2L illustrates a block diagram of a TRP in a wireless communication system to which an embodiment of the disclosure can be applied.

As illustrated in FIG. 2L, the NR NB includes an RF processor 2*l*-10, a baseband processor 2*l*-20, a backhaul communication unit 2*l*-30, a memory 2*l*-40, and a controller 2*l*-50.

The RF processor 2*l*-10 performs a function for transmitting and receiving a signal through a radio channel, such as band conversion and amplification of a signal. That is, the RF processor 2*l*-10 up-converts a baseband signal provided from the baseband processor 2*l*-20 into an RF band signal and then transmits the converted signal through an antenna, and down-converts an RF band signal received through the antenna into a baseband signal. For example, the RF processor 2*l*-10 may include a transmission filter, a reception filter, an amplifier, a mixer, an oscillator, a DAC, and an ADC. Although FIG. 2L illustrates only one antenna, the first access node may include a plurality of antennas. In addition, the RF processor 2*l*-10 may include a plurality of RF chains. The RF processor 2*l*-10 may perform beamforming. For the beamforming, the RF processor 2*l*-10 may control the phase and size of each of the signals transmitted and received through a plurality of antennas or antenna elements. The RF processor may perform a downlink MIMO operation by transmitting one or more layers.

The baseband processor 2*l*-20 performs a function of conversion between a baseband signal and a bitstream according to a physical-layer standard of the first radio-access technology. For example, when transmitting data, the baseband processor 2*l*-20 generates complex symbols by encoding and modulating a transmission bitstream. Further, when receiving data, the baseband processor 2*l*-20 reconstructs a reception bitstream by demodulating and decoding a baseband signal provided from the RF processor 2*l*-10. For example, in an OFDM scheme, when transmitting data, the baseband processor 2*l*-20 may generate complex symbols by encoding and modulating the transmission bitstream, map the complex symbols to subcarriers, and then configure OFDM symbols through an IFFT operation and CP insertion. In addition, in data reception, the baseband processor 2*l*-20 divides a baseband signal provided from the RF processor 2*l*-10 in units of OFDM symbols, recovers signals mapped with sub-carriers through an FFT operation, and then recovers a reception bit string through demodulation and decoding. The baseband processor 2*l*-20 and the RF processor 2*l*-10 transmit and receive a signal as described above. Accordingly, each of the baseband processor 2*l*-20 and the RF processor 2*l*-10 may be referred to as a transmitter, a receiver, a transceiver, a communication unit, or a wireless communication unit.

The communication unit 2*l*-30 provides an interface for communicating with other nodes within the network.

The memory 2*l*-40 stores data such as a basic program, an application, and setting information for the operation of the MeNB, Particularly, the memory 2*l*-40 may store information on a bearer allocated to the accessed UE and a measurement result reported from the accessed UE. Further, the memory 2*l*-40 may store information which is a reference for determining whether or not to allow multiple connections to the UE. The memory 2*l*-40 provides stored data in response to a request from the controller 2*l*-50.

The controller 2*l*-50 controls the overall operation of the MeNB. For example, the controller 2*l*-50 transmits and receives a signal through the baseband processor 2*l*-20 and the RF processor 2*l*-10 or through the backhaul communication unit 2*l*-30. Further, the controller 2*l*-50 records data in the memory 2*l*-40 and reads the data. To this end, the controller 2*l*-50 may include at least one processor.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements, Meanwhile, the exemplary embodiments disclosed in the specification and drawings are merely presented to easily describe technical contents of the disclosure and help the understanding of the disclosure and are not intended to limit the scope of the disclosure. That is, it is obvious to those skilled in the art to which the disclosure belongs that different modifications can be achieved based on the technical spirit of the disclosure. Further, if necessary, the above respective embodiments may be employed in combination. For example, parts of embodiments proposed in the disclosure may be combined to operate the bae station and the terminal. In addition, although above embodiments have been presented with reference to 5G/NR systems, other modifications based on the technical idea of the embodiments may also be implemented in connection with other systems such as LTE, LTE-A, and LTE-A-Pro systems.

In the above-described detailed embodiments of the disclosure, a component included in the disclosure is expressed in the singular or the plural according to a presented detailed embodiment. However, the singular form or plural form is selected for convenience of description suitable for the presented situation, and various embodiments of the disclosure are not limited to a single element or multiple elements thereof. Further, either multiple elements expressed in the description may be configured into a single element or a single element in the description may be configured into multiple elements.

Meanwhile, the sequence of description illustrated in the drawings for the method according to the disclosure does not necessarily correspond to the execution sequence, and the sequential relationship may be changed, or execution may be performed in parallel.

Additionally, the drawings illustrating the method of the disclosure may omit some elements, or may include only some elements without departing from the scope of the disclosure.

In the above-described detailed embodiments of the disclosure, a component included in the disclosure is expressed in the singular or the plural according to a presented detailed embodiment. However, the singular or plural expressions are selected to be suitable for proposed situations for convenience of description, and the disclosure is not limited to the singular or plural elements. An element expressed in a plural form may be configured in singular, or an element expressed in a singular form may be configured in plural.

Although the embodiment has been described in the detailed description of the disclosure, the disclosure may be modified in various forms without departing from the scope of the disclosure. Therefore, the scope of the disclosure should not be defined as being limited to the embodiments, but should be defined by the appended claims and equivalents thereof.

Although the present disclosure has been described with various embodiments, various changes and modifications may be suggested to one skilled in the art. It is intended that the present disclosure encompass such changes and modifications as fall within the scope of the appended claims.

What is claimed is:
1. A method performed by a user equipment (UE) in a wireless communication system, the method comprising:
 receiving, from a base station, a radio resource control (RRC) message including configuration information for a secondary cell (SCell), the configuration information including semi-persistent scheduling information for the SCell; and in case that a condition for transitioning the SCell into a dormant state is satisfied, clearing resources for the SCell associated with the semi-persistent scheduling information for the SCell, wherein the condition is satisfied in case that information indicating the dormant state of the SCell is included in the configuration information, a medium access control (MAC) control element (CE) for transitioning the SCell into the dormant state is received, or a hibernation timer associated with the SCell expires.

2. The method of claim 1, wherein in case that the MAC CE for transitioning the SCell into the dormant state is received, the SCell is to be in the dormant state.

3. The method of claim 1, wherein in case that the hibernation timer associated with the SCell expires, the SCell is to be in the dormant state, and
wherein the hibernation timer associated with the SCell is configured by the RRC message.

4. The method of claim 1, wherein in case that the information indicating the dormant state of the SCell is included in the configuration information, the SCell is to be in the dormant state.

5. The method of claim 1, further comprising:
in case that a cell deactivation timer is configured for the SCell, stopping the cell deactivation timer.

6. The method of claim 1, further comprising:
starting a hibernation-state deactivation timer for the SCell; and
in case that the hibernation-state deactivation timer expires, deactivating the SCell.

7. The method of claim 1, wherein, in case that the SCell is in the dormant state, a physical downlink control channel (PDCCH) for the SCell is not monitored, and data for the SCell is not transmitted or received.

8. The method of claim 1, further comprising, in case that the SCell is in the dormant state, periodically reporting a channel measurement result for the SCell.

9. The method of claim 8, wherein the channel measurement result includes at least one of channel state information (CSI), a channel quality indicator (CQI), a precoding matrix indicator (PMI), a precoding type indicator (PTI), or a CSI-RS resource indicator (CRI).

10. The method of claim 1, wherein, in case that the SCell is a special cell (Spcell), the dormant state is not applied.

11. A user equipment (UE) in a wireless communication system, the UE comprising:
a transceiver; and
a controller coupled with the transceiver and configured to:

receive, from a base station, a radio resource control (RRC) message including configuration information for a secondary cell (SCell), the configuration information including semi-persistent scheduling information for the SCell, and in case that a condition for transitioning the SCell into a dormant state is satisfied, clear resources for the SCell associated with the semi-persistent scheduling information for the SCell, wherein the condition is satisfied in case that information indicating the dormant state of the SCell is included in the configuration information, a medium access control (MAC) control element (CE) for transitioning the SCell into the dormant state is received, or a hibernation timer associated with the SCell expires.

12. The UE of claim 11, wherein in case that the MAC CE for transitioning the SCell into the dormant state is received, the SCell is to be in the dormant state.

13. The UE of claim 11, wherein in case that the hibernation timer associated with the SCell expires, the SCell is to be in the dormant state, and
wherein the hibernation timer associated with the SCell is configured by the RRC message.

14. The UE of claim 11, wherein in case that the information indicating the dormant state of the SCell is included in the configuration information, the SCell is to be in the dormant state.

15. The UE of claim 11, wherein in case that a cell deactivation timer is configured for the SCell, the controller is configured to stop the cell deactivation timer.

16. The UE of claim 11, wherein the controller is further configured to:
start a hibernation-state deactivation timer for the SCell and,
in case that the hibernation-state deactivation timer expires, deactivate the SCell.

17. The UE of claim 11, wherein, in case that the SCell is in the dormant state, a physical downlink control channel (PDCCH) for the SCell is not monitored, and does not transmit or receive data for the SCell is not transmitted or received.

18. The UE of claim 11, wherein the controller is configured to, in case that the SCell is in the dormant state, periodically report a channel measurement result for the SCell.

19. The UE of claim 18, wherein the channel measurement result includes at least one of channel state information (CSI), a channel quality indicator (CQI), a precoding matrix indicator (PMI), a precoding type indicator (PTI), or a CSI-RS resource indicator (CRI).

20. The UE of claim 11, wherein, in case that the SCell is a special cell (Spcell), the dormant state is not applied.

* * * * *